(12) United States Patent
Shimizu et al.

(10) Patent No.: US 8,976,846 B2
(45) Date of Patent: Mar. 10, 2015

(54) WIRELESS TRANSMISSION SYSTEM AND WIRELESS TRANSMITTER, WIRELESS RECEIVER, WIRELESS TRANSMISSION METHOD, WIRELESS RECEPTION METHOD AND WIRELESS COMMUNICATION METHOD USED WITH SAME

(75) Inventors: Junzoh Shimizu, Kawasaki (JP); Minoru Fujishima, Higashihiroshima (JP); Masahiko Ohta, Shinjuku-ku (JP); Toshio Takada, Kawasaki (JP)

(73) Assignees: Silicon Library Inc., Kawasaki-Shi, Kanagawa (JP); Hitachi Chemical Co., Ltd., Shinjuku, Tokyo (JP); Hiroshima University, Higashihiroshima-Shi, Hiroshima (JP)

( * ) Notice: Subject to any disclaimer, the term of this patent is extended or adjusted under 35 U.S.C. 154(b) by 234 days.

(21) Appl. No.: 13/635,862

(22) PCT Filed: Mar. 17, 2011

(86) PCT No.: PCT/JP2011/001579
§ 371 (c)(1),
(2), (4) Date: Sep. 18, 2012

(87) PCT Pub. No.: WO2011/114738
PCT Pub. Date: Sep. 22, 2011

(65) Prior Publication Data
US 2013/0010849 A1  Jan. 10, 2013

(30) Foreign Application Priority Data
Mar. 19, 2010  (JP) .................. 2010-064462

(51) Int. Cl.
*H04B 1/38* (2006.01)
*H04L 27/04* (2006.01)
(Continued)

(52) U.S. Cl.
CPC *H04L 27/04* (2013.01); *H04L 5/06* (2013.01); *H04N 21/43637* (2013.01)

USPC ........... 375/219; 375/220; 375/268; 375/300; 375/320

(58) Field of Classification Search
CPC ..... H04L 5/06; H04L 27/04; H04N 21/43637
USPC .......................... 375/219, 220, 268, 300, 320
See application file for complete search history.

(56) References Cited

U.S. PATENT DOCUMENTS 7,020,121 B2  3/2006  Hardacker et al.
7,228,154 B2  6/2007  Champion et al.
(Continued)

FOREIGN PATENT DOCUMENTS

CN   101194509     6/2008
JP   2006-525736 A  11/2006
(Continued)

OTHER PUBLICATIONS

International Search Report (PCT/ISA/210) issued on Apr. 19, 2011, by the Japanese Patent Office as the International Searching Authority for International Application No. PCT/JP2011/001579.
(Continued)

*Primary Examiner* — Leon Flores
(74) *Attorney, Agent, or Firm* — Buchanan Ingersoll & Rooney PC

(57) ABSTRACT

A wireless transmission system includes a wireless HDMI transmitter and a wireless HDMI receiver. The wireless HDMI transmitter includes a carrier oscillator provided for each channel of an HDMI transmission path to output a carrier signal in a millimeter band, an OOK modulator provided for each carrier oscillator to perform on-off keying modulation on a carrier signal outputted by its corresponding carrier oscillator, and an input circuit provided for each channel of the HDMI transmission path to input a digital signal outputted by a source device to the OOK modulator. Radio signals have different planes of polarization from their adjacent channels.

10 Claims, 28 Drawing Sheets

(51) Int. Cl.
*H04L 5/06* (2006.01)
*H04N 21/4363* (2011.01)

(56) References Cited

U.S. PATENT DOCUMENTS

| | | |
|---|---|---|
| 7,562,379 B2 | 7/2009 | Hardacker et al. |
| 7,719,482 B2 | 5/2010 | Unger |
| 7,965,663 B2 | 6/2011 | Hardacker et al. |
| 7,965,837 B2 | 6/2011 | Kawasaki et al. |
| 2004/0217948 A1 | 11/2004 | Kawasaki et al. |
| 2005/0105498 A1 | 5/2005 | Hardacker et al. |
| 2005/0135611 A1 | 6/2005 | Hardacker |
| 2005/0136990 A1 | 6/2005 | Hardacker et al. |
| 2005/0227638 A1 | 10/2005 | Suematsu et al. |
| 2006/0092893 A1 | 5/2006 | Champion et al. |
| 2006/0095638 A1 | 5/2006 | Unger |
| 2006/0209745 A1 | 9/2006 | MacMullan et al. |
| 2006/0209890 A1 | 9/2006 | MacMullan et al. |
| 2006/0233096 A1 | 10/2006 | Hardacker et al. |

FOREIGN PATENT DOCUMENTS

| | | |
|---|---|---|
| JP | 2006-352623 A | 12/2006 |
| JP | 2007-511977 A | 5/2007 |
| JP | 2007-524288 A | 8/2007 |
| JP | 2008-518492 A | 5/2008 |
| JP | 2008-519548 A | 6/2008 |
| JP | 2008-519549 A | 6/2008 |
| JP | 2008-519552 A | 6/2008 |
| JP | 2008-533913 A | 8/2008 |
| JP | 2009-089155 A | 4/2009 |
| JP | 2009-303084 | 12/2009 |
| WO | WO 03/073628 A1 | 9/2003 |
| WO | WO 2006/052376 A2 | 5/2006 |

OTHER PUBLICATIONS

Written Opinion (PCT/ISA/237) issued on Apr. 19, 2011, by the Japanese Patent Office as the International Searching Authority for International Application No. PCT/JP2011/001579.

Panasonic Corp., "Full High-Vision Wireless Unit TU-WH1J", searched online Mar. 9, 2010 at <URL:http://panasonic.jp/support/product/tv/08/TU-WH1J.html>.

Gefen Inc., "Wireless for HDMI (UWB Technology)", searched online Mar. 9, 2010 at URL:http://www.gefen.com/kvm/dproduct.jsp?prod_id=4318.

Lancerlink Co., Ltd., "1920 × 1080p, Full-Spec, High-Vision HDMI Wireless Transceiver Unit HD-Wireless RD & TD", searched online Mar. 9, 2010 at URL:http://lancerlink.shop24.makeshop.jp/shopdetail/001005000001/brandname/.

Fujishima, "Millimeter-Wave Circuits Based on Silicon CMOS Technology", Department of Electric Engineering and Information Systems, School of Engineering, The University of Tokyo.

Office Action issued in corresponding Chinese Patent Application No. 201180024518.3, issued on Jul. 23, 2014 and English translation.

Office Action issued in corresponding Japanese Patent Application No. 2010-064462, issued on Oct. 29, 2013 and English translation.

Ahmet Oncu et al, "Low-power CMOS Transceiver Circuits for 60GHz Band Millimeter-wave Impulse Radio", Design Automation Conference, 2009.ASP-DAC 2009. Asis and South Pacific, pp. 99-100, Jan. 19, 2009.

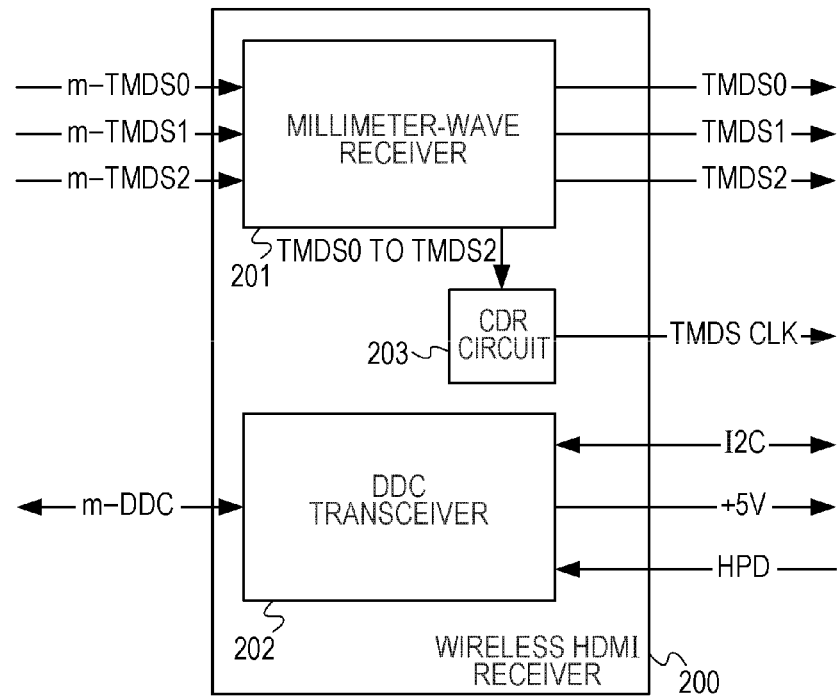
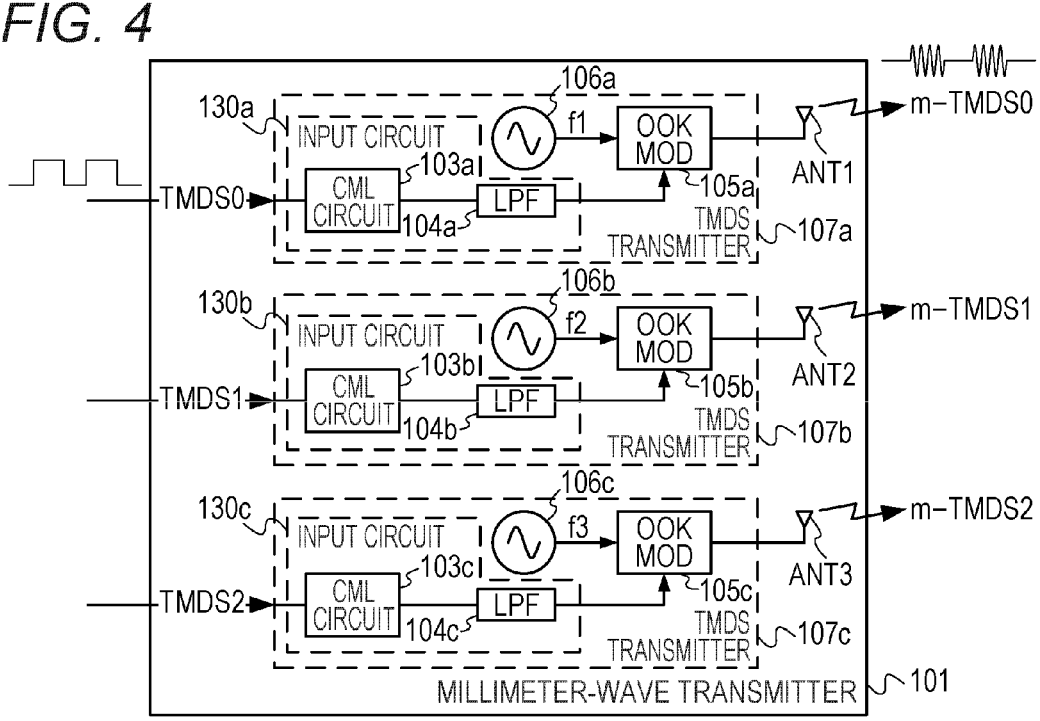

FIG. 22

| CONNECTOR NO. | S SIGNAL |
|---|---|
| 1 | VBUS |
| 2 | D− |
| 3 | D+ |
| 4 | GND |
| Shell | SHIELD |

| PIN | ASSIGNED SIGNAL | PIN | ASSIGNED SIGNAL |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved |
| 15 | SCL | 16 | SDA |
| 17 | DDC/CEC Ground | 18 | +5V Power |
| 19 | Hot Plug Detect | | |

WIRELESS TRANSMISSION SYSTEM AND WIRELESS TRANSMITTER, WIRELESS RECEIVER, WIRELESS TRANSMISSION METHOD, WIRELESS RECEPTION METHOD AND WIRELESS COMMUNICATION METHOD USED WITH SAME

TECHNICAL FIELD

The present invention relates to wireless transmission systems and also to wireless transmitters, wireless receivers, wireless transmission methods, wireless reception methods and wireless communication methods for use with the same, and more particularly, the invention relates to a wireless transmission system using millimeter waves and also to a wireless transmitter, a wireless receiver, a wireless transmission method, a wireless reception method and a wireless communication method for use with the same.

BACKGROUND ART

Most of the high-definition plasma televisions, liquid crystal televisions, digital projectors, DVD players and Blu-ray players that are available in the market today include high-definition multimedia interface (HDMI) connectors. By using an HDMI connector, a source device (e.g., a digital set-top box, a DVD player, a Blu-ray player, an HDD player or the like) can very reliably transfer digital content to a sink device (e.g., a high-definition television or display device, a digital projector, or the like).

The HDMI standard defines specifications to support any common high-definition formats, including 720p and 1080i high-definition televisions (HDTVs), which require a 1.5 Gbps data transfer rate (bit rate) with a bit error ratio (BER) of $10^{-9}$. Moreover, to ensure security while digital content is transferred between the source device and the sink device, the HDMI standard also defines specifications for the high-bandwidth digital content protection (HDCP) system. The HDMI standard thus comprehensively designed has wide support from the industry. As of 2008, the number of devices with HDMI sold was expected to increase from 50,000,000 in 2005 to more than 200,000,000.

FIG. 37 is a block diagram outlining signals to be transmitted from the source device to the sink device in accordance with the HDMI standard. FIG. 38 is a table showing signal types assigned to HDMI connector pins. First, the HDMI standard will be outlined with reference to FIGS. 37 and 38. Note that in FIG. 37, digital signals TMDS Data0+ and TMDS Data0− represent positive and negative polarities, respectively, of a differential signal. The above is similar for digital signals TMDS Data1+ and TMDS Data1− and also for digital signals TMDS Data2+ and TMDS Data2−.

A source device 900 and a sink device 901 are connected by an HDMI cable 902. Video and audio signals generated in the source device 900 are inputted to an HDMI transmitter 903. The HDMI transmitter 903 converts signals to be transmitted into a 3-channel serial digital signal before outputting to three channels, "TMDS Data0", "TMDS Data1" and "TMDS Data2", of the HDMI cable 902. For each of the channels "TMDS Data0", "TMDS Data1" and "TMDS Data2", the bit rate is up to 1485 Mbps (in the case of 1080P with a color depth of 8 bits). In addition, the HDMI transmitter 903 appropriately generates a clock signal TMDS CLK based on a control signal Control/Status, and outputs the generated signal to channel "TMDS Clock" of the HDMI cable 902. For example, "TMDS CLK" has a clock frequency one tenth of the bit rate for TMDS Data0 to TMDS Data2. An HDMI receiver 904 reproduces video and audio signals from the 3-channel serial digital signal inputted via the HDMI cable 902 using TMDS CLK, and then outputs the reproduced signals.

The source device 900 and the sink device 901 bi-directionally communicate SCL (serial clock) and SDA (serial data) as control signals referred to by DDC (display data channel). The control signals DDC are used to exchange settings and status information between the source device 900 and the sink device 901. For communication of the control signals DDC, a communication protocol called I2C (inter-integrated circuit) is used. The bit rate for I2C is as low as 100 Kbps.

The source device 900 and the sink device 901 use "Hot Plug Detect" and "+5V Power" pins in combination to confirm whether the HDMI cable is connected to the source device 900 and the sink device 901. The sink device 901 detects a +5V voltage outputted by the source device 900, thereby recognizing that the cable is connected thereto. The +5V voltage returns to "Hot Plug Detect" via a 1 kohm resistance within the sink device 901. The source device 900 recognizes the cable being connected thereto by detecting the "Hot Plug Detect" signal to be at 5V.

Note that CEC (consumer electronics control) refers to an optional control signal to be used for communication between the source device 900 and the sink device 901.

In this manner, the source device 900 and the sink device 901 are connected using the HDMI cable 902.

Incidentally, with the recent development of thinner and lighter HDTVs, wall-hanging HDTVs have come into the market. In the case of the wall-hanging HDTV, an HDMI cable being laid on the wall between the source device and the HDTV might compromise the appearance. Therefore, it is desirable that the source device and the HDTV wirelessly communicate with each other.

Under such circumstances, the following inventions have been proposed as described in Patent Documents 1 to 8.

Patent Document 1 describes a transmission device (1) in which a P/S (parallel-serial) conversion portion (10) converts R, G, B, and clock signals to a serial signal. Thereafter, in the transmission device (1), a serial-parallel converter (11) alternatingly branches the serial signal, resulting in I and Q signals. A QPSK modulation portion (12) of the transmission device (1) modulates the I signal with a millimeter wave to obtain an in-phase component (I1), and also modulates the Q signal with another millimeter wave 90 degrees out of phase to obtain a quadrature component (Q1). In the transmission device (1), an adder (12c) superimposes the in-phase component (I1) on the quadrature component (Q1) and outputs them via an antenna portion (13). A reception device (2) demodulates the superimposed signal (IQ1) transmitted from the transmission device (1). In this manner, Patent Document 1 discloses the transmission and reception devices by which digital signals are converted to a serial signal to be modulated by QPSK (quadrature phase shift keying) and wirelessly transmitted using a millimeter wave.

Patent Document 2 describes a multimedia source (12) with a first link (22) of 60 GHz and a second link of a lower rate. In the multimedia source (12), a forward channel modulator (36) modulates digital data into an analog signal using DQPSK (differential quadrature phase shift keying), QPSK, BPSK (binary phase shift keying), 8PSK (8-phase shift keying) or the like, and a forward channel upconverter (38) up-converts the signal to a 60-GHz millimeter wave for transmission.

Patent Document 3 describes a wireless transmission chip (16) in which a transmitter processor (18) converts multimedia data to I and Q signals, which are modulated by a wireless transmitter (20) using QPSK, DQPSK, BPSK, 8PSK or the like and then up-converted to a 60-GHz millimeter wave for transmission.

Patent Documents 4 to 8 describe wireless transmitters in which digital data is modulated using QPSK, DQPSK, BPSK, 8PSK or the like, and up-converted to a 60-GHz millimeter wave for transmission.

In addition, the following inventions as described in Non-Patent Documents 1 to 3 have been commercialized. Non-Patent Document 1 describes an invention sold at a street price of about ¥43,000, in which transmitter power consumption is 10 W, receiver power consumption is 12 W, transmitter external dimensions are about 190 (W)×70 (D)×69 (H) in mm, receiver external dimensions are about 146 (W)×46 (D)× 133 (H) in mm, and SiBEAM's wireless technology WirelessHD is used.

Non-Patent Document 2 describes an invention sold at a street price of about US$999, in which transmitter power consumption is 12.5 W, receiver power consumption is 12.5 W, transmitter and receiver external dimensions are both about 6 (W)×4 (D)×2 (H) in inches, and Tzero Technologies' wireless technology ZeroWire is probably used.

Non-Patent Document 3 describes an invention sold at a street price of about ¥148,000, in which required power supply is 5 V/2.6 A, transmitter and receiver external dimensions are both 162.6 (W)×164.5 (D)×33.5 (H) in mm, and AMIMON's wireless technology WHDI (wireless home digital interface) is used.

CITATION LIST

Patent Document

Patent Document 1: Japanese Laid-Open Patent Publication No. 2006-352623
Patent Document 2: Japanese National Phase PCT Laid-Open Publication No. 2006-525736
Patent Document 3: Japanese National Phase PCT Laid-Open Publication No. 2007-511977
Patent Document 4: Japanese National Phase PCT Laid-Open Publication No. 2007-524288
Patent Document 5: Japanese National Phase PCT Laid-Open Publication No. 2008-518492
Patent Document 6: Japanese National Phase PCT Laid-Open Publication No. 2008-519552
Patent Document 7: Japanese National Phase PCT Laid-Open Publication No. 2008-519549
Patent Document 8: Japanese National Phase PCT Laid-Open Publication No. 2008-519548

Non-Patent Document

Non-Patent Document 1: Panasonic Corp., "Full High-Vision Wireless Unit TU-WH1J", searched online Mar. 9, 2010 at <URL:http://panasonic.jp/support/product/tv/08/TU-WH1J.html>
Non-Patent Document 2: Gefen Inc., "Wireless for HDMI (UWB Technology)", searched online Mar. 9, 2010 at <URL:http://www.gefen.com/kvm/dproduct.jsp-?prod_id=4318>
Non-Patent Document 3: Lancerlink Co., Ltd., "1920×1080p, Full-Spec, High-Vision HDMI Wireless Transceiver Unit HD-Wireless RD & TD", searched online Mar. 9, 2010 at <URL:http:// lancerlink.shop24.makeshop.jp/shopdetail/ 001005000001/brandname/>

DISCLOSURE OF THE INVENTION

Problems to be Solved by the Invention

First, when the HDMI cable is replaced with a wireless device, it is ideal that the wireless device be provided at a price approximately the same as or less than the price of the HDMI cable. While the price of the HDMI cable varies in accordance with its length, it is probably about a few thousand yen for a few to several meters, which is sufficient for ordinary household use.

In addition, the wireless device is substituted for the cable, which basically does not consume power at all, and therefore it is natural that the wireless device is required to, for example, simply operate with power supplied by the source device or the sink device, thereby achieving low power consumption.

However, the conventional wireless HDMI transmission devices as described in Non-Patent Documents 1 to 3 cost from tens to hundreds of thousands of yen and consume about 10 watts of power. Accordingly, at present, there are no low-power consumption, wireless HDMI transmission devices on the market that cost about a few to several thousand yen and can simply operate with power supplied by the source device or the sink device.

The invention described in Non-Patent Document 1 uses the wireless technology WirelessHD with a 60-GHz millimeter band as a wireless band. Millimeter waves are characteristically very straightforward, and therefore, when there is any obstacle between the transmitter and the receiver, communication is severely interrupted. To prevent this, WirelessHD employs a beamforming technique using an array of antennas to achieve a function of finding a different communication path (from the transmitter to a wall and to the receiver after reflection on the wall) when there is an obstacle between the communicating devices. As a result, the configuration of the wireless device becomes complicated, making it extremely difficult to achieve low cost and low power consumption.

The inventions described in Non-Patent Documents 2 and 3 use a 5-GHz wireless band. It is extremely difficult to wirelessly transmit a signal in a 5-GHz band if the signal has a transmission rate reaching 1.5 Gbps as in the case of an HDMI signal. Accordingly, the invention described in Non-Patent Document 2 transmits data after compressing it using JPEG 2000 or H.264 technology. In addition, the invention described in Non-Patent Document 3 employs AMIMON's unique coding and modulation techniques to achieve 1.5-Gbps transmission with a 40-MHz bandwidth. In either case, the configuration of the wireless device becomes complicated, making it extremely difficult to achieve low cost and low power consumption.

In the invention described in Patent Document 1, the transmission device requires a parallel-serial converter and a quadrature modulator, and performs QPSK modulation. A quadrature demodulator includes a serial-parallel converter, and a mixer for mixing phase-shifted signals. In the case where a parallel-serial converter is used, to convert digital signals for three channels to a serial signal, the transmission device requires a high-speed, 4.5-Gbps signal processing circuit because the transmission rate of an HDMI digital signal for one channel is 1.5 Gbps, for example. Furthermore, the transmission device divides a serial signal into I and Q signals via the serial-parallel converter, and therefore requires circuits such as a look-up table. Moreover, in the case of QPSK modulation, the transmission device needs to mix I and Q signals via the mixer after rendering them out of phase with each other, and therefore is required to generate the I and Q signals using a local signal locked by a PLL (phase-locked loop) circuit. In addition, in the case where the QPSK system is used, a transmitted radio signal cannot be demodulated if the frequency thereof deviates from a desired frequency, and therefore the transmission device requires a carrier wave locked by a PLL circuit when up-converting a QPSK-modulated signal to 60 GHz. That is, the transmission device requires at least two PLL circuits.

Furthermore, when demodulating a QPSK-modulated signal, the reception device needs to obtain an IF (intermediate frequency) signal by down-converting a transmitted radio signal using a millimeter-wave local signal locked by a PLL circuit. In addition, when converting the IF signal to a baseband signal using a quadrature demodulator, the reception device requires a local signal locked by a PLL circuit and also a look-up table. Moreover, the reception device requires a serial-parallel converter for converting the baseband signal obtained from the quadrature demodulator into a parallel signal, and also requires a high-speed signal processing circuit.

Accordingly, in the invention described in Patent Document 1, each of the transmission device and the reception device requires at least two PLL circuits, at least one look-up table for serial-parallel conversion, and at least one high-speed processing circuit for parallel-serial conversion. Thus, with the invention described in Patent Document 1, it is difficult to achieve the transmission device and the reception device both at low cost and low power consumption. However, the invention described in Patent Document 1 uses the QPSK system, and therefore can achieve a narrowed wireless transmission band and high-quality signal transmission.

In the case of the inventions described in Patent Documents 2 to 8 also, modulation is performed using various PSK systems, and therefore as in Patent Document 1, each of the transmission device and the reception device requires at least two PLL circuits, at least one look-up table for serial-parallel conversion and at least one high-speed processing circuit for parallel-serial conversion. Thus, with the invention described in Patent Document 1, it is difficult to achieve the transmission device and the reception device both at low cost and low power consumption. However, the inventions described in Patent Documents 2 to 8 use various PSK systems, and therefore can achieve a narrowed wireless transmission band and high-quality signal transmission.

As described above, conventionally, HDMI signal communication cannot be achieved at low cost and low power consumption.

While the foregoing has been described with respect only to the HDMI signal, the aforementioned problems of achieving low cost and low power consumption also arise in communication systems, such as USB 2.0, USB 3.0, DVI, DisplayPort, MHL, HAVi, and DiiVA, other than HDMI systems, where one device transmits a digital signal to another device via a digital cable, if the digital cable is eliminated for wireless transmission.

Preventing quality deterioration is a prerequisite for wireless transmission of a high-quality digital signal from one device to another. Therefore, an objective of the present invention is to provide a low-cost, low-power consumption wireless transmission system in which a digital signal is wirelessly transmitted from one device to another without transmission quality deterioration, along with a wireless transmitter, a wireless receiver, a wireless transmission method, a wireless reception method and a wireless communication method for use with the system.

Solution to the Problems

To solve the aforementioned problems, the present invention has the following features. The present invention is directed to a wireless transmitter connected to an electronic device via a transmission path with two or more channels, including two or more carrier oscillators provided for their respective channels of the transmission path to output carrier signals in a millimeter band, two or more on-off keying (OOK) modulators provided so as to correspond to the carrier oscillators and perform on-off keying modulation on the carrier signals outputted by the carrier oscillators, two or more input circuits provided for their respective channels of the transmission path to input digital signals for two or more channels outputted by the electronic device to the OOK modulators, and two or more transmission antennas provided so as to correspond to the OOK modulators and output millimeter-wave signals provided by the OOK modulators as radio signals, in which the OOK modulators perform on-off keying modulation on the carrier signals outputted by the carrier oscillators based on the digital signals inputted by the input circuits, and any of the two or more transmission antennas that use adjacent channels transmit the radio signals with different planes of polarization.

Preferably, the transmission path may transmit HDMI-conforming signals, the carrier oscillators, the OOK modulators, and the input circuits may be provided so as to correspond to digital signals HDMI0, HDMI1, and HDMI2, a radio signal transmitted by the transmission antenna that corresponds to the digital signal HDMI0 and a radio signal transmitted by the transmission antenna that corresponds to the digital signal HDMI1 may have different planes of polarization, and the radio signal transmitted by the transmission antenna that corresponds to the digital signal HDMI1 and a radio signal transmitted by the transmission antenna that corresponds to the digital signal HDMI2 may have different planes of polarization.

Preferably, further included may be a first reception portion provided so as to share transmission and reception frequencies with a first transmission portion consisting of a set of the carrier oscillator, the OOK modulator, and the input circuit, a second reception portion utilizing a millimeter-wave reception frequency different from a transmission frequency used by a second transmission portion consisting of a set of the carrier oscillator, the OOK modulator, and the input circuit, and a reception antenna intended for use by the second reception portion, in which the two or more transmission antennas include a first transmission antenna intended for use by the first transmission portion and the first reception portion, and a second transmission antenna intended for use by the second transmission portion, and a radio signal transmitted by the second transmission antenna and a radio signal received by the reception antenna have different planes of polarization.

Furthermore, the present invention is directed to a wireless receiver connected to an electronic device via a transmission path with two or more channels, including two or more reception antennas provided so as to correspond to carrier frequencies of received millimeter-wave radio signals subjected to OOK modulation, two or more local oscillators provided for their respective channels of the transmission path to output local signals in a millimeter band, two or more mixers provided so as to correspond to the local oscillators and down-convert the received radio signals using the local signals outputted by the local oscillators, and two or more detector portions provided so as to correspond to the mixers and reproduce baseband signals by demodulating the signals down-converted by the mixers, in which any of the two or more reception antennas that use adjacent channels accept the received radio signals with different planes of polarization.

Preferably, the transmission path may transmit HDMI-conforming signals, the reception antennas, the local oscillators, the mixers, and the detector portions may be provided so as to correspond to digital signals HDMI0, HDMI1, and HDMI2, a radio signal received by the reception antenna that corresponds to the digital signal HDMI0 and a radio signal received by the reception antenna that corresponds to the digital signal HDMI1 may have different planes of polarization, and the radio signal received by the reception antenna that corresponds to the digital signal HDMI1 and a radio signal received by the reception antenna that corresponds to the digital signal HDMI2 may have different planes of polarization.

Preferably, further included may be a first transmission portion provided so as to share transmission and reception frequencies with a first reception portion consisting of a set of the local oscillator, the mixer, and the detector portion, a second transmission portion utilizing a millimeter-wave transmission frequency different from a reception frequency used by a second reception portion consisting of a set of the local oscillator, the mixer, and the detector portion, and a transmission antenna intended for use by the second transmission portion, in which the two or more reception antennas include a first reception antenna intended for use by the first reception portion and the first transmission portion, and a second reception antenna intended for use by the second reception portion, and a radio signal received by the second reception antenna and a radio signal transmitted by the transmission antenna have different planes of polarization.

Furthermore, the present invention is directed to a wireless transmission system including a first wireless device connected to a first electronic device via a first transmission path with two or more channels and a second wireless device connected to a second electronic device via a second transmission path with two or more channels, in which the first wireless device includes two or more carrier oscillators provided for their respective channels of the first transmission path to output carrier signals in a millimeter band, two or more OOK modulators provided so as to correspond to the carrier oscillators and perform on-off keying modulation on the carrier signals outputted by the carrier oscillators, two or more input circuits provided for their respective channels of the first transmission path to input digital signals for two or more channels outputted by the first electronic device to the OOK modulators, and two or more transmission antennas for outputting millimeter-wave signals provided by the OOK modulators as radio signals, the OOK modulators perform on-off keying modulation on the carrier signals outputted by the carrier oscillators on the basis of the digital signals inputted by the input circuits, any of the two or more transmission antennas that use adjacent channels transmit the radio signals with different planes of polarization, the second wireless device includes two or more reception antennas provided so as to correspond to the transmission antennas, two or more local oscillators provided for their respective channels of the second transmission path to output local signals in a millimeter band, two or more mixers provided so as to correspond to the local oscillators and down-convert the radio signals using the local signals outputted by the local oscillators, and two or more detector portions provided so as to correspond to the mixers and reproduce the digital signals by demodulating the signals down-converted by the mixers, and the two or more reception antennas receive the radio signals with the same planes of polarization as their corresponding transmission antennas.

Furthermore, the present invention is directed to a wireless transmission method for use with a wireless transmitter connected to an electronic device via a transmission path with two or more channels, in which a carrier frequency of a carrier signal in a millimeter band is set for each of the channels of the transmission path, a millimeter-wave radio signal is transmitted for each of the channels by performing on-off keying modulation on a carrier signal on the basis of a digital signal outputted by the electronic device via the transmission path, the carrier signal corresponding to the channel of the digital signal, and the radio signals have different planes of polarization from their adjacent channels.

Furthermore, the present invention is directed to a wireless reception method for use with a wireless receiver connected to an electronic device via a transmission path with two or more channels, in which a local frequency of a local signal in a millimeter band is set for each of the channels of the transmission path, received radio signals subjected to OOK modulation are down-converted on a channel-by-channel basis and then demodulated to reproduce baseband signals for their respective channels, and the radio signals have different planes of polarization from their adjacent channels.

Furthermore, the present invention is directed to a wireless communication method for use with a wireless transmission system including a first wireless device connected to a first electronic device via a first transmission path with one or more channels and a second wireless device connected to a second electronic device via a second transmission path with one or more channels, in which a carrier frequency of a carrier signal in a millimeter band is set for each of the channels of the first transmission path, a millimeter-wave radio signal is transmitted for each of the channels by performing on-off keying modulation on a carrier signal on the basis of a digital signal outputted by the first electronic device via the first transmission path, the carrier signal corresponding to the channel of the digital signal, a local frequency of a local signal in a millimeter band is set for each of the channels of the second transmission path, received radio signals subjected to OOK modulation are down-converted on a channel-by-channel basis and then demodulated to reproduce baseband signals for their respective channels, the radio signals have different planes of polarization from their adjacent channels.

Effect of the Invention

According to the present invention, millimeter-wave carrier signals from carrier oscillators provided for their respective channels of a transmission path are subjected to on-off keying modulation on a channel-by-channel basis and then transmitted wirelessly. The radio signals subjected to on-off keying modulation are down-converted using millimeter-wave local signals from local oscillators provided for their respective channels and therefore demodulated into the original digital signals. In this manner, in the present invention, radio signals are modulated by on-off keying and demodulated simply on the basis of envelope information for the radio signals subjected to on-off keying modulation, and therefore unlike in the conventional art, high-quality demodulation can be achieved without carrier frequencies being accurately fixed on the transmission side and also without local frequencies being accurately fixed on the reception side. Accordingly, for on-off keying modulation and demodulation based on envelope information, carrier and local frequencies are not required to be fixed accurately, and therefore the need for PLL circuits is eliminated. Moreover, in the case of OOK modulation, it is possible to eliminate the need for high-speed processing circuits for parallel-serial conversion and look-up tables for serial-parallel conversion. Thus, the wireless transmitter and the wireless receiver make it possible to eliminate the need for PLL circuits, high-speed processing circuits, and look-up tables. Accordingly, it is possible to provide a wireless transmission system for wirelessly transmitting a digital signal from one device to another at low price and low power consumption without compromising transmission quality, along with a wireless transmitter, a wireless receiver, a wireless transmission method, a wireless reception method, and a wireless communication method for use with the same system.

Furthermore, by setting radio signals to have different planes of polarization from their adjacent channels, it is rendered possible to reduce the level of a disturbing wave in a radio signal to be received, so that high-quality demodulation can be achieved even in high-speed wireless transmission of digital signals.

In an HDMI application, it is assumed that even digital signals with quality of 1080p/60FPS/8-bit (1483.52 Mbps) or higher can be transmitted with high quality. In actuality, the present inventors experimentally confirmed that transmission at 1080p/60FPS/8-bit (1483.52 Mbps) is possible. Moreover, not only the main lobe of a disturbing wave but also side lobes of the disturbing wave have their reception levels reduced, and therefore improved quality can be achieved even in transmission of a digital signal at a relatively low bit rate.

Transmission quality is improved even in communication using half-duplex and full-duplex transmission in combination. For example, in the case of USB 3.0 or suchlike, by setting the plane of polarization to vary between adjacent channels, the level of a disturbing wave can be reduced. Note that the adjacent channels in the case of USB 3.0 herein may refer to both channels added for USB 3.0, i.e., the channel for No. 6 and No. 7 and the channel for No. 9 and No. 10, or may refer to USB 2.0 and USB 3.0 channels (the channel for No. 2 and No. 3 and the channel for No. 6 and No. 7 or the channel for No. 9 and No. 10). However, transmission/reception with USB 2.0 and transmission/reception with USB 3.0 do not occur at the same time, and therefore by considering the channel for No. 6 and No. 7 and the channel for No. 9 and No. 10, added for USB 3.0, to be adjacent channels and setting their planes of polarization to be different from each other, the communication band can be widened to 1.5 Gbps or more. Specifically, even if the band is widened to such an extent that the main lobes of the channel for No. 6 and No. 7 and the channel for No. 9 and No. 10 in FIG. 28 overlap with each other, transmission and reception are possible because of the different planes of polarization.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram illustrating functional features of a wireless HDMI receiver 200.

FIG. 4 is a block diagram illustrating functional features of a millimeter-wave transmitter 101.

FIG. 22 is a table showing pin assignments for connectors to be used with USB 2.0.

BEST MODE FOR CARRYING OUT THE INVENTION

Figure 1:
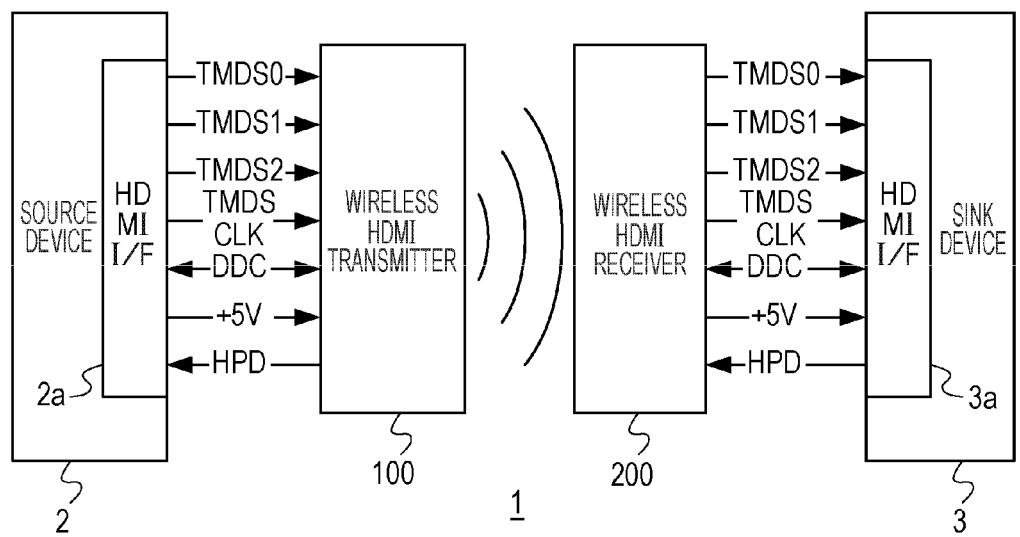
FIG. 1 is a block diagram illustrating the overall configuration of a wireless transmission system 1 of the present invention.

FIG. 1 is a block diagram illustrating the overall configuration of a wireless transmission system 1 of the present invention. Note that "TMDS0" to "TMDS2" and "TMDS CLK" are differential signals. Moreover, in FIG. 1, CEC may be used. In FIG. 1, the wireless transmission system 1 includes a source device 2, a sink device 3, a wireless HDMI transmitter 100, and a wireless HDMI receiver 200. The source device 2 includes an HDMI interface 2a.

The HDMI interface 2a and the wireless HDMI transmitter 100 are connected by a wired HDMI transmission path. For example, the HDMI interface 2a and the wireless HDMI transmitter 100 may be connected by an HDMI cable or a trace on an electronic board. However, the HDMI interface 2a and the wireless HDMI transmitter 100 are not prevented from being connected by a transmission path for close proximity wireless communication (e.g., TransfarJet). In addition, the transmission path for connecting the HDMI interface 2a and the wireless HDMI transmitter 100 is not limited to any specific type of medium. Moreover, the HDMI interface 2a and the wireless HDMI transmitter 100 may be connected by an HDMI cable or a flexible board such that the direction of the wireless HDMI transmitter 100 can be changed.

The sink device 3 includes an HDMI interface 3a. The HDMI interface 3a and the wireless HDMI receiver 200 are connected by a wired HDMI transmission path. For example, the HDMI interface 3a and the wireless HDMI receiver 200 may be connected by an HDMI cable or a trace on an electronic board. However, the HDMI interface 3a and the wireless HDMI receiver 200 are not prevented from being connected by a transmission path for close proximity wireless communication (e.g., TransfarJet). In addition, the transmission path for connecting the HDMI interface 3a and the wireless HDMI receiver 200 is not limited to any specific type of medium. Moreover, the HDMI interface 3a and the wireless HDMI receiver 200 may be connected by an HDMI cable or a flexible board such that the direction of the wireless HDMI receiver 200 can be changed. The wireless HDMI transmitter 100 transmits a millimeter-wave radio signal. The wireless HDMI receiver 200 receives the radio signal from the wireless HDMI transmitter 100.

Figure 2:
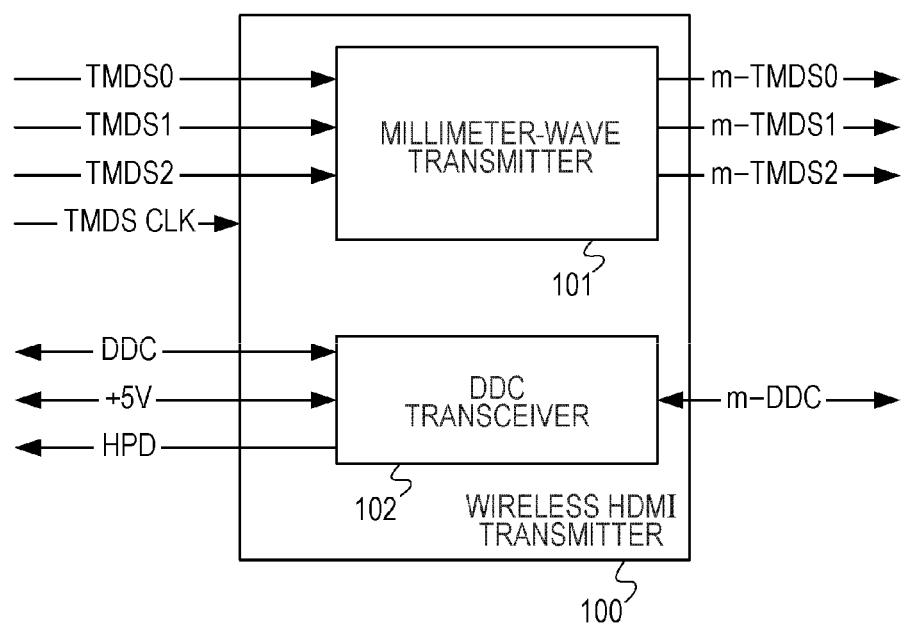
FIG. 2 is a block diagram illustrating functional features of a wireless HDMI transmitter 100.

FIG. 2 is a block diagram illustrating functional features of the wireless HDMI transmitter 100. In FIG. 2, the wireless HDMI transmitter 100 includes a millimeter-wave transmitter 101 and a DDC transceiver 102. The wireless HDMI transmitter 100 receives digital signals TMDS0 to TMDS2, a clock signal TMDS CLK, a control signal DDC, a +5V power, and an HPD signal. In a first embodiment, "TMDS CLK" is generated by the wireless HDMI receiver 200, as will be described later, and therefore the wireless HDMI transmitter 100 does not use "TMDS CLK". However, "TMDS CLK" may be transmitted by a millimeter wave as in a sixth embodiment to be described later.

The millimeter-wave transmitter 101 uses the digital signals TMDS0 to TMDS2 to respectively subject 60.75 GHz, 62.5 GHz and 64.25 GHz millimeter waves to OOK (on-off keying) modulation, and transmits radio signals m-TMDS0 to m-TMDS2. The DDC transceiver 102 packetizes the control signal DDC, performs upconversion to 2.4 GHz, for example, via I2C, and transmits a radio signal m-DDC. The DDC transceiver 102 also receives a radio signal m-DDC transmitted by the wireless HDMI receiver 200.

FIG. 3 is a block diagram illustrating functional features of the wireless HDMI receiver 200. In FIG. 3, the wireless HDMI receiver 200 includes a millimeter-wave receiver 201, a DDC transceiver 202, and a CDR (clock data recovery) circuit 203. The wireless HDMI receiver 200 receives radio signals m-TMDS0 to m-TMDS2 and a radio signal m-DDC. The millimeter-wave receiver 201 demodulates the radio signals m-TMDS0 to m-TMDS2 using envelope detection (or square-law detection), and outputs digital signals TMDS0 to TMDS2. The CDR circuit 203 is a well-known circuit for separating a clock signal superimposed on a data signal from any one of the digital signals TMDS0 to TMDS2.

For the CDR circuit 203, there are architecture types which use a PLL circuit, a DDL (digital locked loop) circuit, or digital oversampling. The PLL-type CDR circuit 203 is provided with a phase comparator capable of phase comparison between a data signal and a clock signal, and is configured to output a clock signal either by a frequency loop or a phase loop. By using the PLL-type CDR circuit 203, it is rendered possible to realize low jitter with a simplified configuration. The DDL-type CDR circuit 203 has a multi-phase clock and a phase interpolator (a phase DAC). The digital oversampling-type CDR circuit 203 is one of great variety. For clock recovery, jitter is preferably low, and therefore the PLL-type CDR circuit 203 is used here but is not particularly restrictive.

Figures 38, 39:
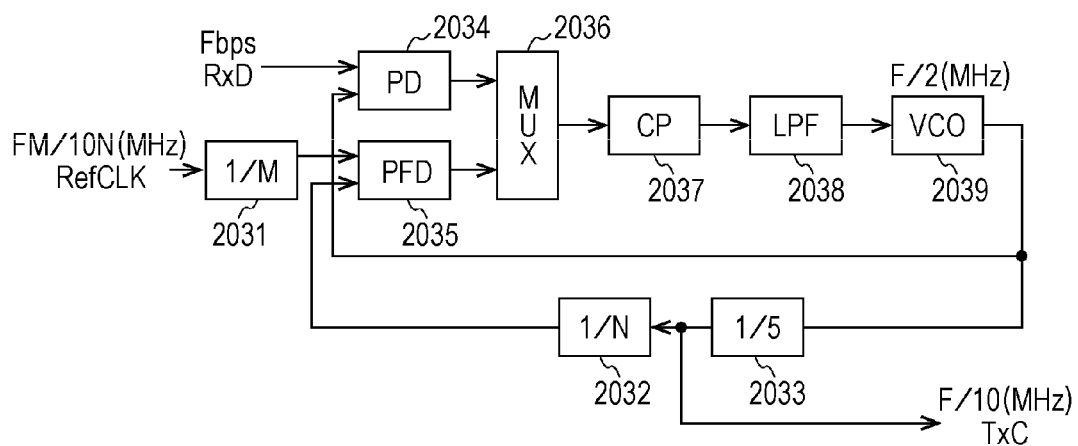
FIG. 38 is a table showing signal types assigned to HDMI connector pins.
FIG. 39 is a block diagram illustrating functional features of a CDR circuit 203.

FIG. 39 is a block diagram illustrating functional features of the CDR circuit 203. In FIG. 39, the CDR circuit 203 includes dividers (1/M, 1/N, 1/5) 2031, 2032, and 2033, a phase frequency detector (PFD) 2035, a phase comparator (PD) 2034, a multiplexer (MUX) 2036, a charge pump (CP) 2037, a low-pass filter (LPF) 2038, and a voltage-controlled oscillator (VCO) 2039.

A rough frequency adjustment is made using a reference clock RefClk outputted by an unillustrated reference oscillator. At this time, the MUX 2036 connects the PFD 2035 and the CP 2037, and basically operates in a manner similar to the PLL. Specifically, the PFD 2035 performs phase-frequency comparison between signals respectively obtained by dividing RefClk at a division ratio of M and by dividing an output of the VCO 2039 at a division ratio of 5N. As a result, it is possible to perform feedback control such that the signal obtained by dividing the output of the VCO 2039 at a division ratio 5N matches the signal obtained by dividing RefClk at a division ratio of M in terms of frequency and phase. Since the signal obtained by dividing the output of the VCO 2039 in frequency by 5 using the divider 2033 is used as a clock, the signal obtained by dividing RefClk in frequency at a division ratio of M is required to be set to about half the bit rate "F" of data (e.g., TMDS0 to TMDS2) from which a clock (e.g., "TMDS CLK") is desired to be recovered. Specifically, RefClk is FM/10N (MHz).

Next, the MUX 2036 is switched to connect the PD 2034 and the CP 2037. The MCX 2036 disconnects the PFD 2034 from the CP 2037. At this stage, an output frequency of the VCO 2039 still approximately matches half the bit rate of a data signal R×D (e.g., any one of TMDS0 to TMDS2) from which a clock is desired to be recovered, but a fine adjustment is required. Therefore, phase comparison is made between R×D and the output of the VCO 2039, thereby performing a fine phase adjustment. As a result, the divider 2033 outputs a clock T×C at a frequency of F/10 MHz, so that the clock can be recovered from R×D. Here, "HDMI CLK" is assumed to be a clock at 1/10 the data rate but the division ratio, the output frequency of the VCO 2039, and the reference frequency may be properly selected depending on the system. In this manner, the CDR circuit 203 generates and outputs the clock signal "TMDS CLK" based on any one of the digital signals TMDS0, TMDS1, and TMDS2. The DDC transceiver 202 receives a radio signal m-DDC transmitted by the wireless HDMI transmitter 100. Moreover, the DDC transceiver 202 packetizes a DDC signal, performs upconversion to 2.4 GHz, for example, via I2C, and transmits a radio signal m-DDC.

FIG. 4 is a block diagram illustrating functional features of the millimeter-wave transmitter 101. In FIG. 4, the millimeter-wave transmitter 101 includes TMDS transmitters 107a to 107c. The TMDS transmitters 107a to 107c include their respective CML (current mode logic) circuits (level conversion circuits) 103a to 103c, low-pass filters (LPFs) 104a to 104c, OOK modulation portions 105a to 105c, VCOs (voltage-controlled oscillators (carrier oscillators) 106a to 106c, and millimeter-wave antennas ANT1 to ANT3. The CML circuit 103a and the low-pass filter 104a form an input circuit 130a for inputting single-channel digital signal TMDS0 to the OOK modulator 105a. The above is similar for the input circuits 130b and 130c.

The CML circuit 103a converts a differential data signal TMDS0+/TMDS0− to a CMOS-level voltage and also to a single-ended signal. Any well-known CML circuits can be used as the CML circuits 103a to 103c.

The low-pass filter 104a removes harmonic components from the data signal TMDS0 subjected to CMOS-level conversion, so that only low-frequency components pass therethrough. The operation of the low-pass filter 104a makes it possible to keep a low sideband level of a millimeter-wave modulation signal, thereby inhibiting a millimeter-wave signal from disturbing any adjacent channels. As a result, it is rendered possible to wirelessly transmit HDMI signals while maintaining their high quality.

The OOK modulation portion 105a is formed by a switch, for example. The OOK modulation portion 105a switches on/off a carrier signal from the oscillator 106a based on the digital signal TMDS0 from the low-pass filter 104a. As a result, the millimeter-wave radio signal m-TMDS0 subjected to on-off keying modulation is transmitted from the antenna ANT1. For better understanding, FIG. 4 shows conceptual waveforms of the digital signal TMDS and the radio signal m-TMDS0.

The VCO 106a has an oscillation frequency (carrier frequency) f1 of, for example, 60.75 GHz (first channel). In the case of 1080p (where the bit depth is 8), TMDS0 is at a data rate of 1.485 Gbps, and therefore the bandwidth of the first channel is 2.97 GHz. Accordingly, a second channel adjacent to the first channel needs to be at a frequency higher than 62.235 GHz and therefore is set to 62.5 GHz (an oscillation frequency f2 of the VCO 106b). In addition, a third channel adjacent to the second channel needs to be at a frequency higher than 63.985 GHz and therefore is set to 64.25 GHz (an oscillation frequency f3 of the VCO 106c). In this manner, the carrier frequencies can be demodulated so long as an interval therebetween is greater than or equal to a bandwidth twice the bit rate of digital signals to be transmitted. Note that carrier frequencies for wirelessly transmitting the clock signal "TMDS CLK" as well will be described in a sixth embodiment.

The VCO 106a has the oscillation frequency (carrier frequency) f1 of, for example, 60.75 GHz (first channel). In the case of 1080i (where the bit depth is 8), TMDS0 is at a data rate of 741.76 Mbps, and therefore the bandwidth of the first channel is 1.48352 GHz. Accordingly, the second channel adjacent to the first channel needs to be at a frequency higher than 62.23352 GHz and therefore is set to 62.5 GHz (the oscillation frequency f2 of the VCO 106b). In addition, the third channel adjacent to the second channel needs to be at a frequency higher than 63.98352 GHz and therefore is set to 64.25 GHz (the oscillation frequency f3 of the VCO 106c). In this manner, the carrier frequencies can be demodulated so long as an interval therebetween is greater than or equal to a bandwidth twice the bit rate of digital signals to be transmitted. Note that carrier frequencies for wirelessly transmitting the clock signal "TMDS CLK" as well will be described in the sixth embodiment.

In the TMDS transmitters 107b and 107c, their respective CML circuits 103b and 103c, low-pass filters 104b and 104c, OOK modulation portions 105 band 105c, oscillators 106b and 106c, and millimeter-wave antennas ANT2 and ANT3 operate in the same manner as those of the TMDS transmitter 107a, and radio signals m-TMDS1 and m-TMDS2 having center frequencies of 62.5 GHz and 64.25 GHz, respectively, are transmitted.

Figure 5:
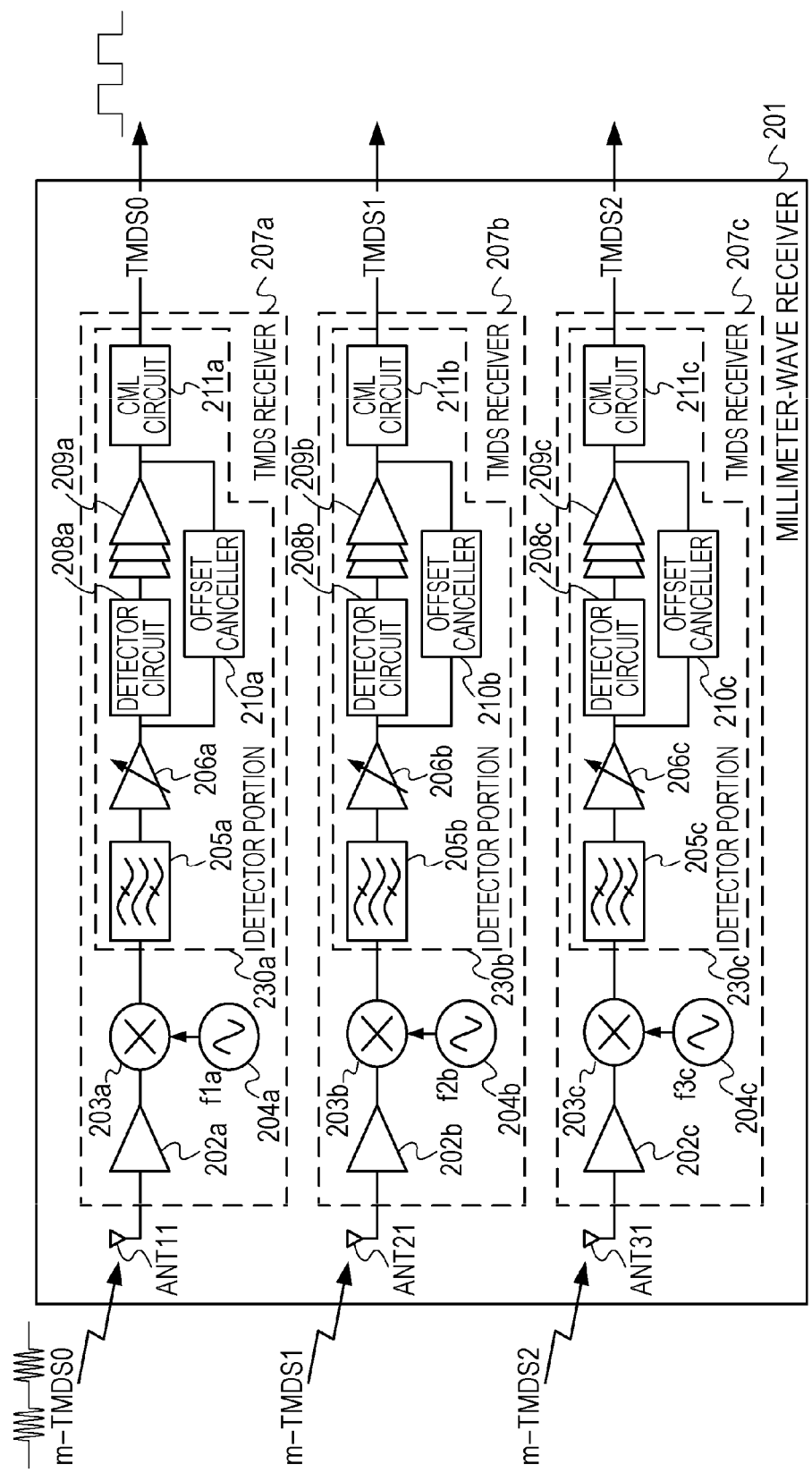
FIG. 5 is a block diagram illustrating functional features of a millimeter-wave receiver 201.

FIG. 5 is a block diagram illustrating functional features of the millimeter-wave receiver 201. For better understanding, FIG. 5 shows conceptual waveforms of the digital signal TMDS and the radio signal m-TMDS0. In FIG. 5, the millimeter-wave receiver 201 includes TMDS receivers 207a to 207c. The TMDS receivers 207a to 207c include their respective millimeter-wave antennas ANT11 to ANT31, LNAs (low-noise amplifiers) 202a to 202c, mixers 203a to 203c, VCOs (local oscillators) 204a to 204c, channel selection filters (bandpass filters) 205a to 205c, VGAs (variable gain amplifiers) 206a to 206c, detector circuits 208a to 208c, limiter circuits 209a to 209c, offset cancellers 210a to 210c, and CML circuits 211a to 211c.

The LNA 202a amplifies radio signals m-TMDS0 to m-TMDS2 received by the antenna ANT11 while achieving low noise. The VCO 204a has an oscillation frequency f1a of 52.75 GHz, for example. The mixer 203a uses a local signal oscillating from the VCO 204a to down-convert a signal received from the LNA 202a into an IF signal. The IF signal resulting from downconversion by the mixer 203a contains TMDS signals for three channels. Accordingly, the channel selection filter 205a passes no signals other than those in a band corresponding to TMDS0. For example, IF signals for TMDS0 and TMDS1 have center frequencies of 8 GHz and 9.75 GHz, respectively, and therefore the channel selection filter 205a passes signals in the band from 7.125 GHz to 8.875 GHz.

Figure 40:
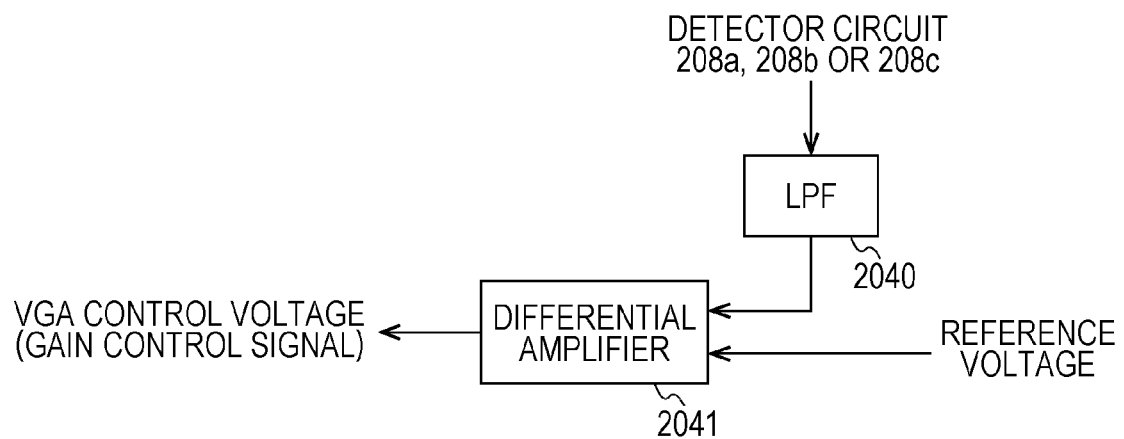
FIG. 40 is a diagram illustrating a control block for a gain control signal.

To maintain the best reception state regardless of the strength of an IF signal from the channel selection filter 205a, the VGA 206a performs gain adjustments and outputs an amplified IF signal. A gain control signal supplied to the VGA 206a is controlled in a manner described below. FIG. 40 is a diagram illustrating a control block for the gain control signal. The control block shown in FIG. 40 is provided in the millimeter-wave receiver 201. An output of the detector circuit 208a, 208b or 208c shown in FIG. 5 is inputted to an LPF 2040. An output of the LPF 2040 is inputted to a differential amplifier 2041. The differential amplifier 2041 receives a reference voltage at the other input. The differential amplifier 2041 outputs a voltage corresponding to the difference between the output of the LPF 2040 and the reference voltage. The voltage outputted by the differential amplifier 2041 is a VGA control voltage, i.e., a gain control signal. Specifically, the VGA 206a, the detector circuit 208a, the LPF 2040, the reference voltage, and the differential amplifier 2041 form a feedback loop by which the output of the detector circuit 208a is controlled to be at a constant amplitude corresponding to the reference voltage. The above is similar for the detector circuits 204b and 204c. Moreover, reception characteristics are determined by a provided reference voltage, which is set to an optimal value determined through simulations and experiments.

The detector circuit 208a demodulates the IF signal inputted by the VGA 206a using envelope detection (or square-law detection). The offset canceller 210a removes any DC offsets generated within the TMDS receiver 207a (e.g., a DC offset generated by the VGA 206a). In the case of OOK modulation, data reproduction is performed in accordance with the size of the amplitude, and if the DC offset is properly removed, erroneous data reproduction occurs, so it is desirable that the offset canceller 201a be provided. In response to the signal inputted by the detector circuit 208a, the limiter circuit 209a outputs a baseband signal, which takes 1 when the signal exceeds a predetermined threshold or otherwise takes 0. The output from the limiter circuit 209a is a reproduced digital signal TMDS0. The CML circuit 211a converts the CMOS-level voltage of the digital signal TMDS0 inputted by the limiter circuit 209a into a signal voltage for use in the sink device 3 before outputting the digital signal TMDS0. The channel selection filter 205a, the VGA 206a, the detector circuit 208a, the limiter circuit 209a, the offset canceller 210a, and the CML circuit 211a function as a detector portion 207a for demodulating a signal down-converted by the mixer 203a, thereby reproducing a baseband signal. The above is similar for detector portions 207b and 208c.

In the TMDS receiver 207b, the VCO 204b has an oscillation frequency f2b of 54.5 GHz, for example. Accordingly, the center frequency of an IF signal corresponding to TMDS1 is 8 GHz. As with the channel selection filter 205a, the channel selection filter 205b passes signals in the band from 7.125 GHz to 8.875 GHz, for example. Therefore, the channel selection filter 205b outputs an IF signal corresponding to TMDS1. In the TMDS receiver 207b, the channel selection filter 205b and circuits in stages subsequent thereto operate in the same manner as those in the TMDS receiver 207a. The detector portion 207b reproduces the digital signal TMDS1.

In the TMDS receiver 207c, the VCO 204c has an oscillation frequency f3c of 56.25 GHz, for example. Accordingly, the center frequency of an IF signal corresponding to TMDS2 is 8 GHz. As with the channel selection filter 205a, the channel selection filter 205c passes signals in the band from 7.125 GHz to 8.875 GHz, for example. Therefore, the channel selection filter 205c outputs an IF signal corresponding to TMDS2. In the TMDS receiver 207c, the channel selection filter 205c and circuits in stages subsequent thereto operate in the same manner as those in the TMDS receiver 207a. The detector portion 207c reproduces the digital signal TMDS2.

In this manner, the millimeter-wave receiver 201 reproduces the digital signals TMDS0 to TMDS2.

Figure 6:
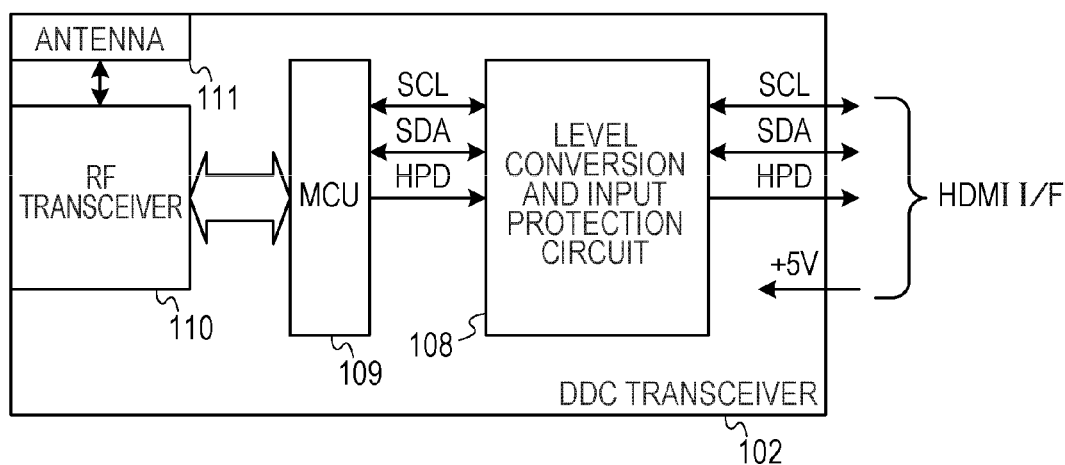
FIG. 6 is a block diagram illustrating functional features of a DDC transceiver 102.
Figure 7:
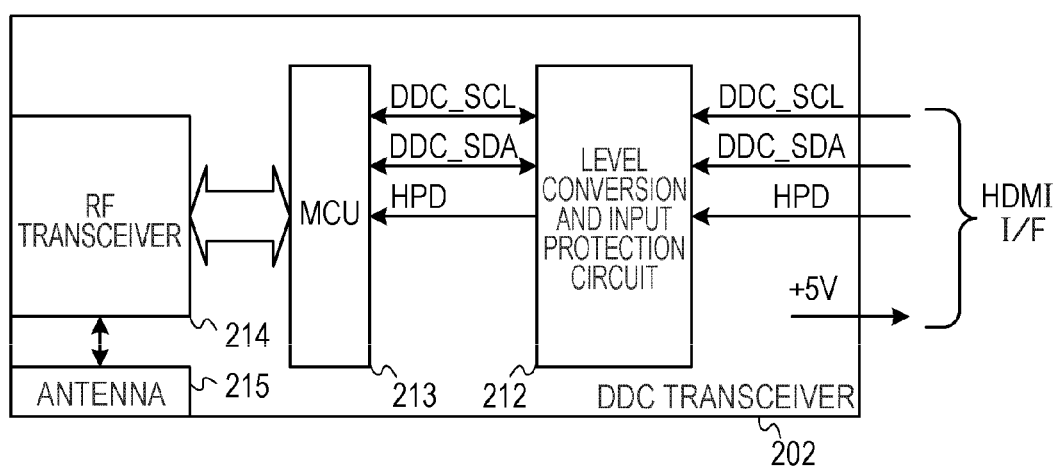
FIG. 7 is a block diagram illustrating functional features of a DDC transceiver 202.

FIG. 6 is a block diagram illustrating functional features of the DDC transceiver 102. FIG. 7 is a block diagram illustrating functional features of the DDC transceiver 202. In FIG. 6, the DDC transceiver 102 includes a level conversion and input protection circuit 108, an MCU (micro control unit) 109, an RF (radio frequency) transceiver 110, and an antenna 111. The DDC transceiver 202 includes a level conversion and input protection circuit 212, an MCU (micro control unit) 213, an RF transceiver 214, and an antenna 215. In FIG. 7, DDC is transmitted and received in two-way communication, and therefore the DDC transceiver 102 on the source device side and the DDC transceiver 202 on the sink device side are equal in terms of basic hardware configuration. Accordingly, the DDC transceiver 102 and the DDC transceiver 202 can share several switching mechanisms such as jumper terminals and also can share a hardware configuration by changing software. The DDC transceivers 102 and 202 are protocol converters for converting DDC to RF packets. The DDC transceivers 102 and 202 convert DDC to RF packets, thereby achieving wireless DDC communication.

The antennas 111 and 215 are one-channel radio-frequency antennas corresponding to the RF transceivers 110 and 214. The RF transceivers 110 and 214 are high-frequency wireless communication transceivers.

The MCUs 109 and 213 are hardware devices for performing DDC communication, transmitting/receiving RF packets, and monitoring/setting the states of HPD terminals. The MCU 109 on the source device 2 side starts DDC and performs a protocol conversion process on an RF packet in accordance with a generated DDC request. The MCU 213 on the sink device 3 side monitors a packet received by the RF transceiver 214 and performs a protocol conversion process on a DDC request in accordance with the packet.

The level conversion and input protection circuit is a circuit for converting DDC and HPD voltage levels between the DDC transceiver 102/202 and the HDMI I/F and providing hot-swap protection to HDMI cables.

The DDC transceiver 102 starts a DDC communication process by issuing a request from the source device 2. Moreover, the DDC transceiver 102 performs HPD monitoring in parallel with the DDC communication process. The DDC transceiver 102 performs HPD monitoring in unoccupied time when a DDC bus is idle. RF packet transmission/reception is performed in accordance with an automatic repeat request protocol using the source device 2 as a master. Note that the DDC bus refers to a transmission path for transmitting SCL and SDA.

The RF transceivers 110 and 214 transmit/receive 2.4-GHz radio signals, for example. The RF transceivers 110 and 214 use FSK (frequency shift keying) as a modulation system but this is not specifically restrictive. Moreover, the DDC transceivers 102 and 202 transmit/receive RF packets using an I2C system as a communication protocol.

Figure 8:
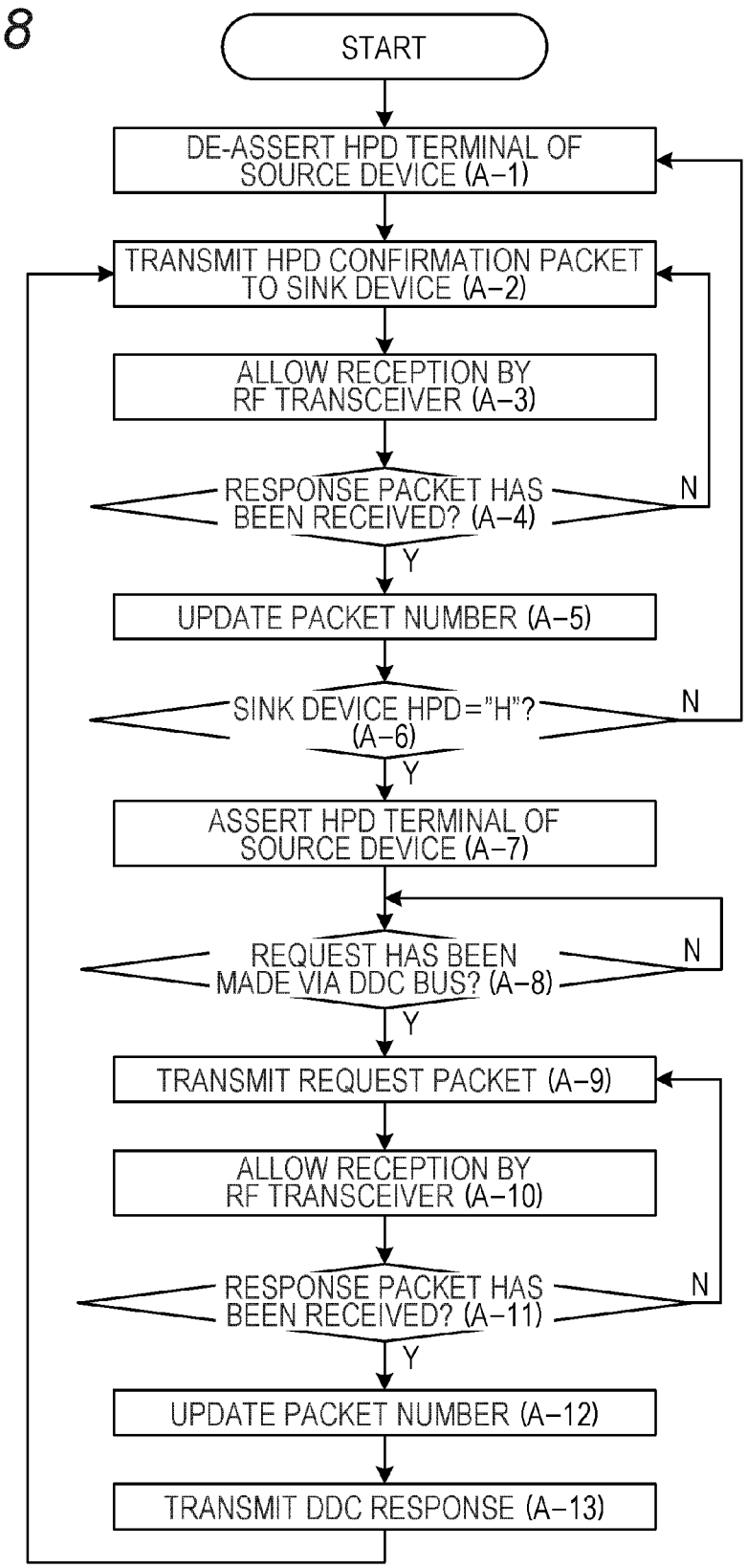
FIG. 8 is a flowchart illustrating the operation of the DDC transceiver 102 on a source device 2 side.

Hereinafter, the operations of the DDC transceivers 102 and 202 will be described. FIG. 8 is a flowchart illustrating the operation of the DDC transceiver 102 on the source device 2 side. First, when the wireless HDMI transmitter 100 is connected to the source device 2, the MCU 109 performs an initialization operation in which an HPD signal to the source device 2 is set to "L", thereby inhibiting DDC communication from starting (A-1). The level conversion and input protection circuit 108 performs level conversion on an output of the MCU 109, thereby setting HPD to "L".

Next, the MCU 109 generates an HPD confirmation packet to confirm the state of the HPD terminal of the sink device 3 (A-2). The RF transceiver 110 transmits the HPD confirmation packet generated by the MCU 109 as an RF packet. Then, the MCU 109 sets the RF transceiver 110 in a reception mode to receive a response from the DDC transceiver 202 (A-3).

Next, the MCU 109 determines whether or not the response packet to be transmitted from the DDC transceiver 202 has been received (A-4). When the response packet has been received without error within a prescribed time-out period, the MCU 109 proceeds to the operation of A-5. On the other hand, when the response packet has not been received within the prescribed time-out period or when the response packet has been received but has some error, the MCU 109 returns to the operation of A-2.

In A-5, the MCU 109 updates a sequence number (packet number) assigned to the packet. As a result, the DDC transceiver 202 on the sink device 3 side can determine whether the HPD confirmation packet transmitted from the DDC transceiver 102 is a repeat request or a new HPD confirmation packet. Then, the MCU 109 analyzes the response packet to confirm whether or not the HPD terminal of the sink device 2 is at "H" (A-6). When the HPD terminal is at "H", the MCU 109 proceeds to the operation of A-7 and controls the level conversion and input protection circuit 108 to set the HPD terminal of the source device 2 at "H". Correspondingly, the level conversion and input protection circuit 108 sets the HPD terminal of the source device 2 at "H". As a result, the source device 2 and the sink device 3 have their HPD terminals in a matching state. On the other hand, when the HPD terminal of the sink device 2 is not at "H" in A-6, control returns to the operation of A-1. Through the operations of A-2 to A-7, the process for confirming the states of the HPD terminals (the HPD confirmation process) is completed.

Since the HPD status is "H" after the operation of A-7, the source device 2 starts DDC bus communication. Accordingly, after A-7, the MCU 109 determines whether or not any request has been made via the DDC bus and then puts itself on standby (A-8). When there is a request via the DDC bus, the MCU 109 detects DDC bus communication and analyzes the details thereof before causing the RF transceiver 110 to transmit a request packet corresponding thereto (A-9). Then, the MCU 109 sets the RF transceiver 110 in a reception mode to receive a response from the DDC transceiver 202 (A-10).

Next, the MCU 109 determines whether or not the response packet to be transmitted from the DDC transceiver 202 has been received (A-11). When the response packet has been received without error within a prescribed time-out period, the MCU 109 proceeds to the operation of A-12. On the other hand, when the response packet has not been received within the prescribed time-out period or when the response packet has been received but has some error, the MCU 109 returns to the operation of A-9 where the request packet is transmitted again.

In A-12, the MCU 109 updates a sequence number (packet number) assigned to the packet. As a result, the DDC transceiver 202 on the sink device 3 side can determine whether the request packet transmitted from the DDC transceiver 102 is a repeat request or a new request packet.

After the operation of A-12, the MCU 109 analyzes the response packet from the DDC transceiver 202, recognizes the contents of DDC, and sends a response to the DDC bus in accordance with the contents of DDC (A-13). Correspondingly, the level conversion and input protection circuit 108 sends a response to the source device 2 after performing level conversion. After the operation of A-13, the MCU 109 executes the DDC communication process from A-8 to A-13 until the DDC bus is brought into idling state. When the DDC bus is brought into idling state, i.e., DDC communication is not being performed, the MCU 109 performs HPD monitoring after returning to the operations of A-2 to A-6 (the HPD monitoring process). In the HPD monitoring process, the MCU 109 monitors whether the HPD status is "H" level as needed, and when the level is "L", the MCU 109 transmits a new HPD confirmation packet and obtains the state of the HPD terminal of the sink device 3 again.

Figure 9:
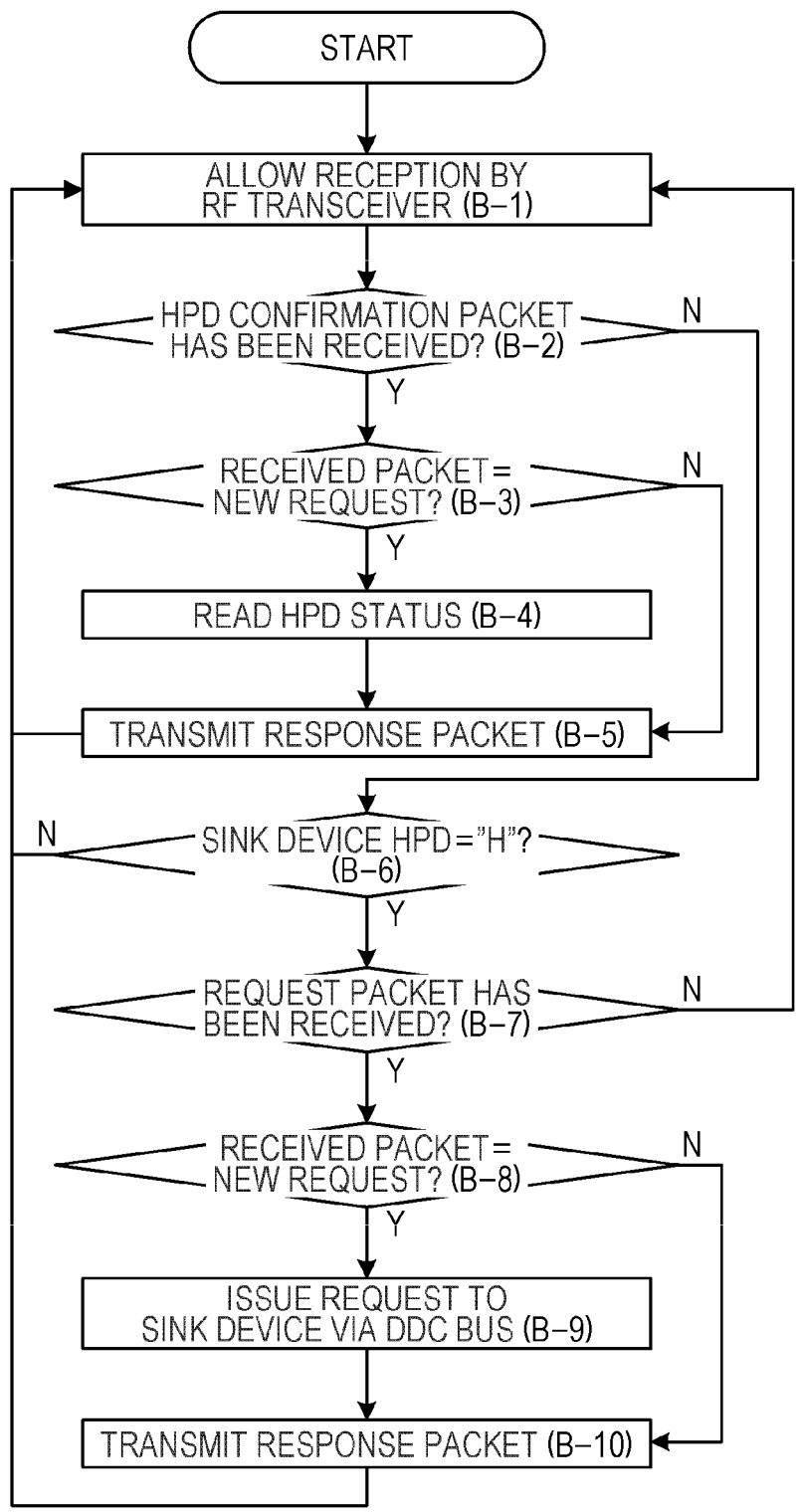
FIG. 9 is a flowchart illustrating the operation of the DDC transceiver 202 on a sink device 3 side.

FIG. 9 is a flowchart illustrating the operation of the DDC transceiver 202 on the sink device 3 side. First, when the wireless HDMI receiver 200 is connected to the sink device 3, the MCU 213 performs an initialization operation to set the RF transceiver 214 in a reception mode for the purpose of receiving a request from the DDC transceiver 102 on the source device 2 side (B-1). Next, the MCU 213 analyzes a packet transmitted from the DDC transceiver 102 to determine whether or not the packet is an HPD confirmation packet. When an HDP confirmation packet is received, the MCU 213 proceeds to the operation of B-3. On the other hand, when the packet is not an HDP confirmation packet, the MCU 213 proceeds to the operation of B-6.

In the operation of B-3, the MCU 213 refers to the packet number to determine whether or not the received HPD confirmation packet is a new request. If the request is new, the MCU 213 reads the state of the HPD terminal of the sink device 3 and causes the RF receiver 214 to transmit a response packet specifying the state of the HPD terminal (B-5). On the other hand, when the request is not new, the MCU 213 resends the response packet that was transmitted responsive to the new request (B-5). After the operation of B-5, the MCU 213 returns to the operation of B-1. Through the operations of B-2 to B-5, the HPD confirmation process is completed.

In the operation of B-6, when the received packet is not an HPD confirmation packet, the MCU 213 determines whether or not the HPD terminal of the sink device 3 is at "H" level. In the case where it is not at "H" level, the MCU 213 returns to the operation of B-1 because no packets other than the HPD confirmation packet are allowed to be processed. On the other hand, in the case of "H" level, the MCU 213 proceeds to the operation of B-7.

In the operation of B-7, the MCU 213 analyzes the received packet and the contents of DDC, and then proceeds to the operation of B-8. At this time, when the received data string is confirmed to be erroneous, the MCU 213 discards the received packet and returns to the operation of B-1.

In the operation of B-8, the MCU 213 refers to the packet number of the received packet to confirm whether the request is new or a repeat. In the case where the request is new, the MCU 213 proceeds to the operation of B-9. On the other hand, when the request is not new, the MCU 213 retransmits the response packet that was last transmitted (B-10).

In the operation of B-9, the MCU 213 issues a command corresponding to the request made by the source device 2, and transmits the command to the sink device 3 via the level conversion and input protection circuit 212. The sink device 3 returns a response to the transmission of the command, and the MCU 213 generates a response packet based on the response and causes the RF transceiver to transmit the response packet (B-10). Through the operations of B-6 to B-10, the DDC communication process is completed.

In B-10, the MCU 213 confirms that the DDC bus is in idling state, and thereafter returns to the state of waiting for packet reception (B-1). In the case where the DDC bus is in idling state, when a non-new HPD confirmation packet is brought in via transmission, the MCU 213 responds to the HPD monitoring process through the operations of B-2, B-3, and B-5.

Examples of the First Embodiment

Figure 10:
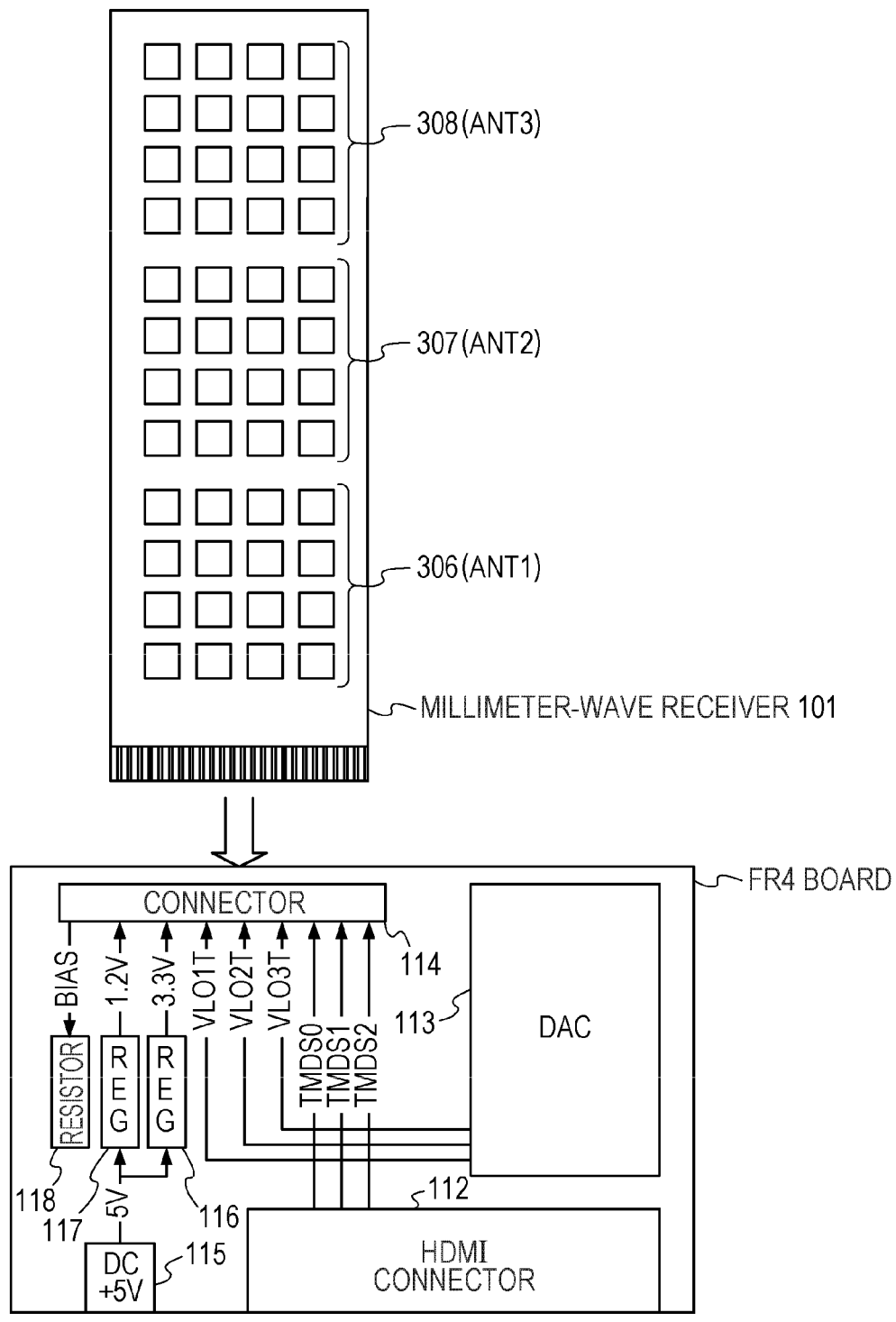
FIG. 10 is a block diagram illustrating functional features of a prototype of the wireless HDMI transmitter 100.

The present inventors manufactured prototypes of the first embodiment and confirmed a bit error ratio (BER) and power consumption by principal parts. FIG. 10 is a block diagram illustrating functional features of a prototype of the wireless HDMI transmitter 100. In FIG. 10, the wireless HDMI transmitter 100 includes an HDMI connector 112, a DAC (digital to analog converter) 113, a connector 114, a DC +5V power connector 115, and resistors 116, 117, and 118, which are all formed on an FR4 (flame retardant type 4) board, and also includes a millimeter-wave transmitter 101. The millimeter-wave transmitter 101 can be attached to/removed from the connector 114. Note that because the wireless HDMI transmitter 100 is a prototype, DC +5V is independently supplied for experimental simplicity, but in an actual product, DC +5V may be supplied via the HDMI connector 112. Note that in a wireless HDMI receiver 200 shown in FIG. 11, an HDMI connector 216 does not supply DC +5V via an HDMI connector 216, and therefore DC +5V is externally supplied even in an actual product.

The HDMI connector 112 is connected to an HDMI connector of a source device 2 by an HDMI cable. The DAC 113 generates control voltages VLO1T to VLO3T to be supplied to VCOs 106a to 106c in the millimeter-wave transmitter 101. The regulator 116 converts DC +5V into 3.3V. The regulator 117 converts DC +5V into 1.2V. Power of 3.3V is supplied to a CML circuit. Power of 1.2V is supplied to other circuits. The resistor 118 is 1.2 KΩ. The resistor 118 is connected to a biasing circuit 119 (see FIG. 14) in a millimeter-wave transmission chip 101b (see FIG. 13) and is used to generate a reference current of 1 mA. Although not shown in FIG. 10, a DDC transceiver 102 is also formed on the FR4 board. The millimeter-wave transmitter 101 has 4×4 patch antennas 306, 307, and 308 for millimeter waves, which are configured by a sandwich structure as will be described later. The 4×4 patch antennas 306, 307, and 308 correspond to the antennas ANT1, ANT2, and ANT3, respectively. The 4×4 patch antennas 306, 307, and 308 have an aluminum cover 306a formed thereon. The aluminum cover 306a has slot apertures provided in positions corresponding to the 4×4 patch antennas 306, 307, and 308 (black marked positions in FIG. 10).

Figure 11:
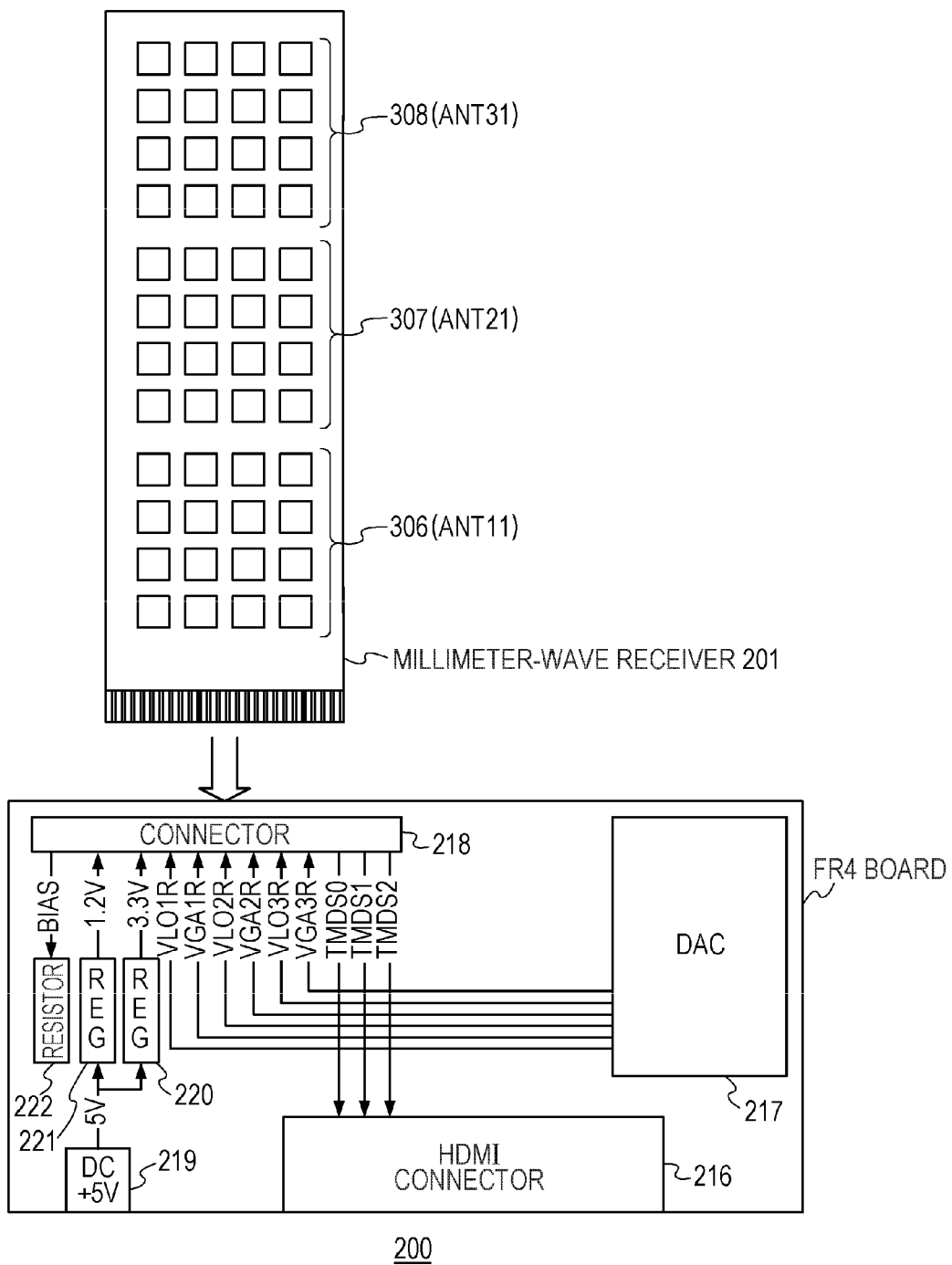
FIG. 11 is a block diagram illustrating functional features of a prototype of the wireless HDMI receiver 200.

FIG. 11 is a block diagram illustrating functional features of a prototype of the wireless HDMI receiver 200. In FIG. 11, the wireless HDMI receiver 200 includes the HDMI connector 216, a DAC 217, a connector 218, a DC +5V power connector 219, and resistors 220, 221, and 222, which are all formed on an FR4 (flame retardant type 4) board, and also includes a millimeter-wave receiver 201. The millimeter-wave receiver 201 can be attached to/removed from the connector 218.

The HDMI connector 216 is connected to a HDMI connector of a sink device 3 by an HDMI cable. The DAC 217 generates control voltages VLO1R to VLO3R to be supplied to VCOs 204a to 204c in the millimeter-wave receiver 201 and gain control signals VGA1R to VGA3R to be supplied to VGAs 206a to 206c. The gain control signals VGA1R to VGA3R are controlled by a structure as shown in FIG. 40. The resistor 220 converts DC +5V into 3.3V. The resistor 221 converts DC +5V into 1.2V. Power of 3.3V is supplied to a CML circuit. Power of 1.2V is supplied to other circuits. The resistor 222 is 1.2 KΩ. The resistor 222 is connected to a biasing circuit 223 (see FIG. 15) in a millimeter-wave reception chip 201b (see FIG. 13) and is used to generate a reference current of 1 mA. Although not shown in FIG. 11, a DDC transceiver 202 is also formed on the FR4 board. The millimeter-wave receiver 201 has 4×4 patch antennas 306, 307, and 308 for millimeter waves configured by a sandwich structure as will be described later. The 4×4 patch antennas 306, 307, and 308 correspond to the antennas ANT11, ANT21, and ANT31, respectively. The 4×4 patch antennas 306, 307, and 308 have an aluminum cover 306a formed thereon. The aluminum cover 306a has slot apertures formed in positions corresponding to the 4×4 patch antennas 306, 307, and 308 (black-marked positions in FIG. 11).

Figure 12:
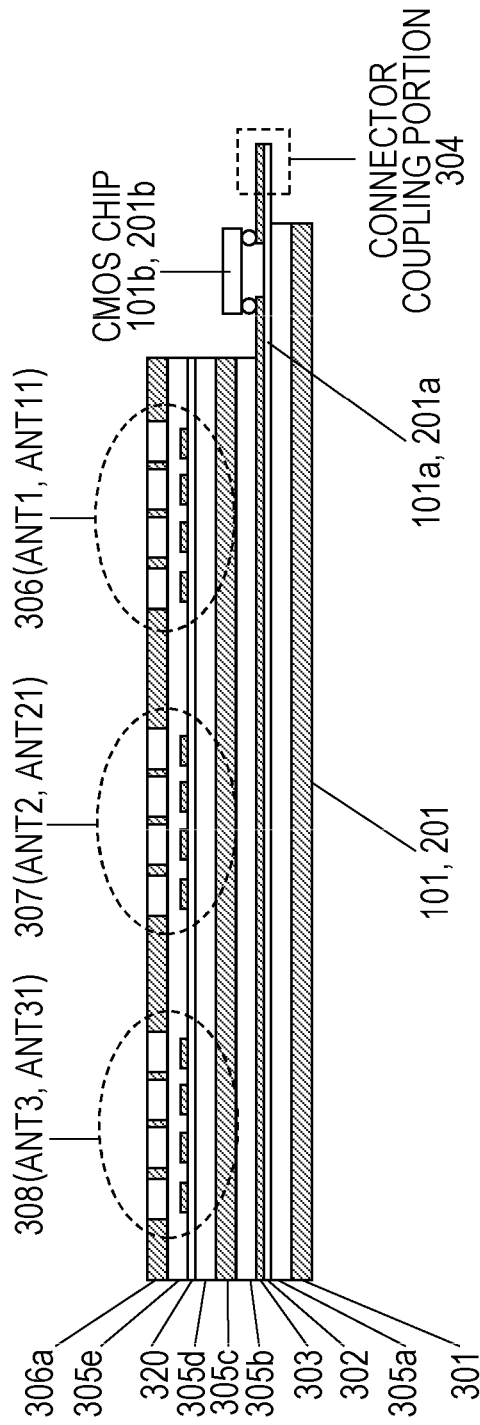
FIG. 12 is a cross-sectional view of the millimeter-wave transmitter 101 and the millimeter-wave receiver 201.

FIG. 12 is a cross-sectional view of the millimeter-wave transmitter 101 and the millimeter-wave receiver 201. The cross-sectional structures of the millimeter-wave transmitter 101 and the millimeter-wave receiver 201 are similar and therefore will be commonly described here with respect to FIG. 12. A polyimide film substrate 302 is provided on an aluminum base 301 via an aluminum spacer 305a. A Cu wiring layer 303 is formed on the film substrate 302. The millimeter-wave transmission chip 101b and the millimeter-wave reception chip 201b, which are CMOS chips, are connected to the Cu wiring layer 303 using bumps (SnAg:Sn 98 wt %, Ag 2 wt %) formed on the CMOS chips. The film substrate 302 has provided at an end a connector coupling portion 304 connectable to the connectors 114 and 218. Aluminum spacers 305a, 305c, and 305d are provided above the Cu wiring layer 303. A polyimide film substrate 320 is provided on the aluminum spacer 305d. The film substrate 320 has the 4×4 patch antennas 306 to 308 (corresponding to ANT1 to ANT3 and ANT11 to ANT31) formed thereon. The 4×4 patch antennas 306 to 308 are planar antennas, each having four rows and four columns of patches: circularly polarized; emission angle ±7.5 degrees; gain about 17 dB. The aluminum cover 306a is formed on the 4×4 patch antennas 306 to 308 via an aluminum spacer 305e. The aluminum cover 306a has slot apertures in positions corresponding to the 4×4 patch antennas 306 to 308.

Figure 13:
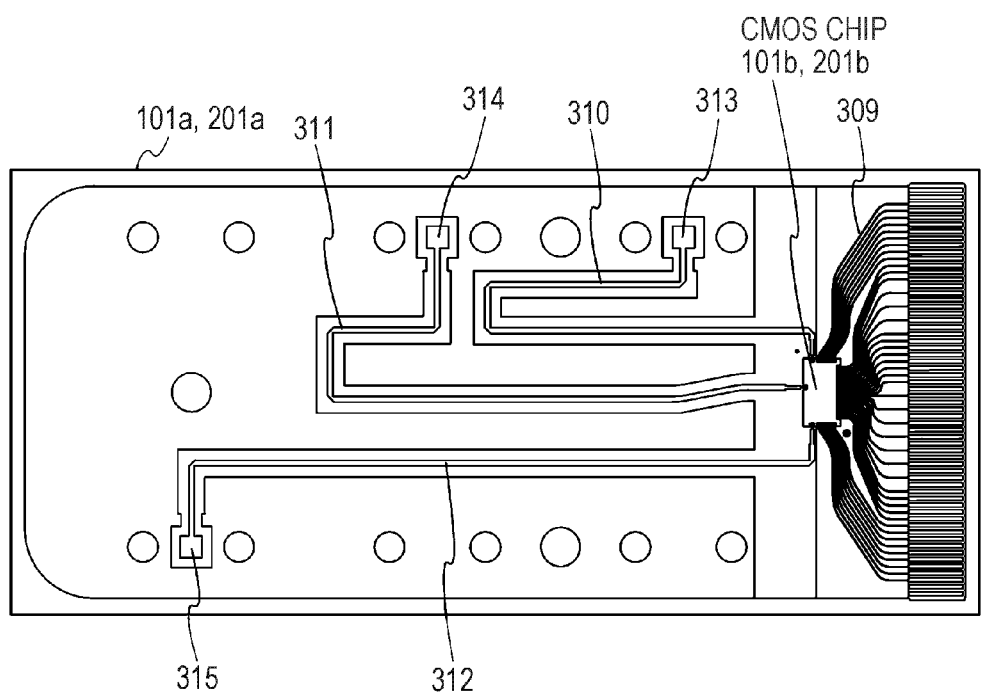
FIG. 13 is a diagram illustrating a Cu wiring layer 303, a CMOS chip 101b/201b, and a connector coupling portion 304 formed on a film substrate 302.

FIG. 13 is a diagram illustrating the Cu wiring layer 303, the CMOS chip 101b/201b, and the connector coupling portion 304 formed on the film substrate 302. The wiring structures of the millimeter-wave transmitter 101 and the millimeter-wave receiver 201 are similar and therefore will be commonly described here with reference to FIG. 13. The connector coupling portion 304 is connected to the CMOS chip 101b/201b, by wiring parts 309 for power source and control signals. The CMOS chip 101b/201b, is connected to traces 310, 311, and 312 for transmitting data signals TMDS0 to TMDS2. The CMOS chip 101b/201b, is connected to the wiring parts 309 and the traces 310, 311, and 312 by bumps. The traces 310, 311, and 312 are equal in length. The trace 310 connects to an antenna coupling portion 313 for connecting to the 4×4 patch antenna 306 for TMDS0. The antenna coupling portion 313 is connected to the 4×4 patch antenna 306 for TMDS0 by electromagnetic coupling through connection apertures provided in the aluminum spacers 305b, 305c, and 305c. While traces for supplying power from the antenna coupling portion 313 to the patches of the 4×4 patch antenna 306 are not shown here, the antenna coupling portion 313 supplies power to the patches of the 4×4 patch antenna 306 by a well-known technique. The trace 311 connects to an antenna coupling portion 314 for connecting to the 4×4 patch antenna 307 for TMDS0. The antenna coupling portion 314 is connected to the 4×4 patch antenna 307 for TMDS0 by electromagnetic coupling through connection apertures provided in the aluminum spacers 305b, 305c, and 305c. While traces for supplying power from the antenna coupling portion 314 to the patches of the 4×4 patch antenna 307 are not shown here, the antenna coupling portion 314 supplies power to the patches of the 4×4 patch antenna 307 by a well-known technique. The trace 312 connects to an antenna coupling portion 315 for connecting to the 4×4 patch antenna 308 for TMDS0. The antenna coupling portion 315 is connected to the 4×4 patch antenna 308 for TMDS0 by electromagnetic coupling through connection apertures provided in the aluminum spacers 305b, 305c, and 305c. While traces for supplying power from the antenna coupling portion 315 to the patches of the 4×4 patch antenna 308 are not shown here, the antenna coupling portion 315 supplies power to the patches of the 4×4 patch antenna 308 by a well-known technique.

Figure 14:
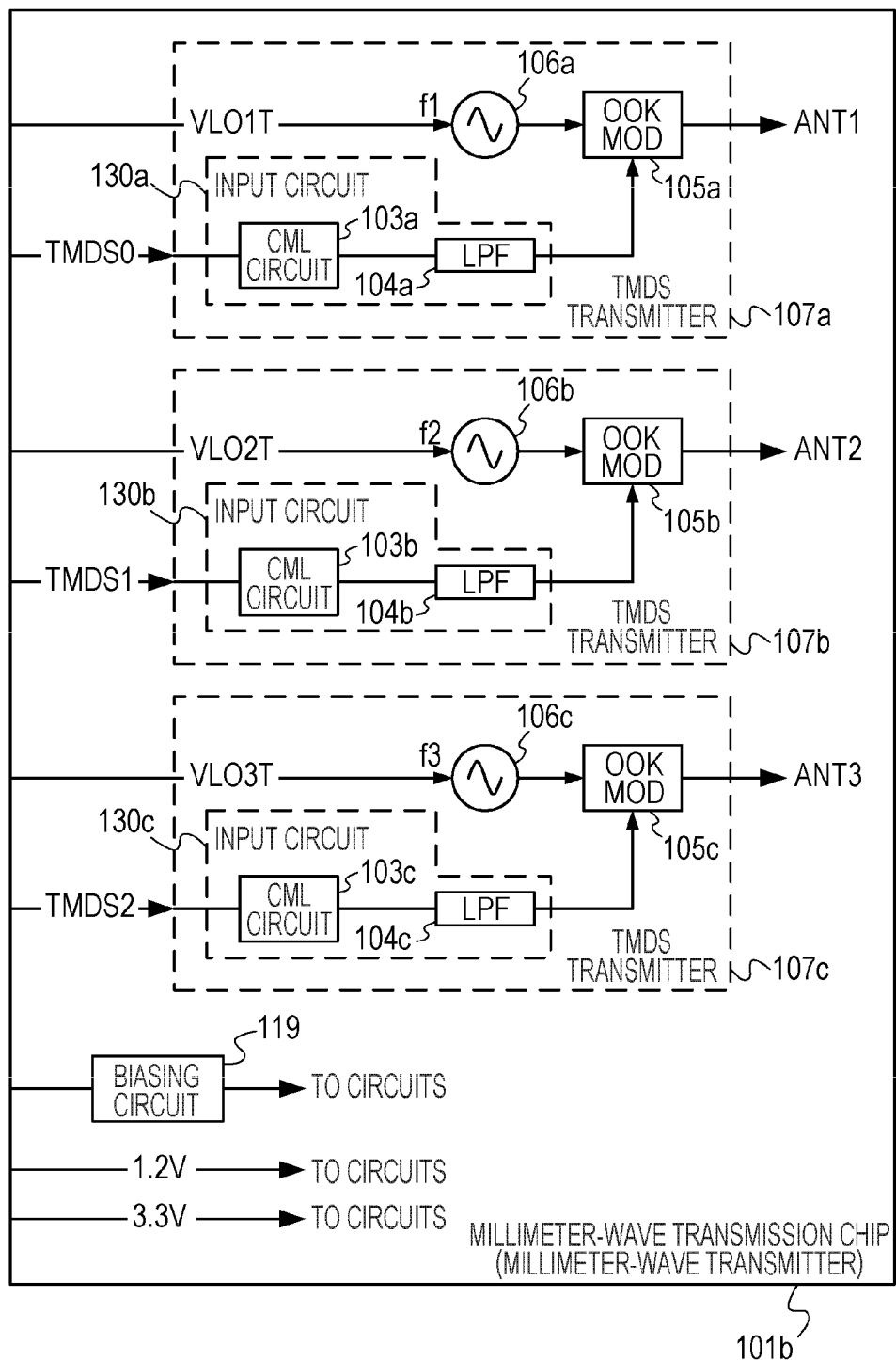
FIG. 14 is a block diagram illustrating functional features of a prototyped millimeter-wave transmission chip (millimeter-wave transmitter) 101b.

FIG. 14 is a block diagram illustrating functional features of the prototyped millimeter-wave transmission chip (millimeter-wave transmitter) 101b. In FIG. 14, elements configured in a similar manner to those of the millimeter-wave transmitter 101b shown in FIG. 4 are denoted by the same reference characters and any descriptions thereof will be omitted. The millimeter-wave transmission chip 101b was designed and manufactured using a 90-nm CMOS process. The millimeter-wave transmission chip 101b had a chip size of 5 mm×2.31 mm. The control voltage VLO1T is inputted to the VCO 106a. The control voltage VLO2T is inputted to the VCO 106b. The control voltage VLO3T is inputted to the VCO 106c. Power of 1.2V is supplied to circuits other than CML circuits 103a to 103c. Power of 3.3V is supplied to the CML circuits 103a to 103c. The biasing circuit 119, consisting of a band gap reference circuit and a current mirror circuit, is connected to the resistor 118, which is a reference resistance, to generate a reference current of 1 mA to be supplied to various circuits.

The control voltages VLO1T to VLO3T from the DAC 113 are set such that carrier frequencies for CH1 to CH3, i.e., oscillation frequencies for the VCOs 106a to 106c, are 60.75 GHz, 62.5 GHz, and 64.25 GHz, respectively.

The digital signal TMDS0 is a signal supplied via the HDMI connector 112 and consisting of differential signals TMDS0+ and TMDS0−. The digital signal TMDS0 is a signal normally having a maximum voltage of 3.3V and a minimum voltage of 2.9V. The CML circuit 103a converts the digital signal TMDS0 to a single-ended signal at a 1.2V CMOS level.

A low-pass filter 104a shapes a waveform of a signal outputted by the CML circuit 103a, such that its harmonic component is attenuated. An OOK modulation portion 105a performs OOK modulation on a baseband signal from the low-pass filter 104a using a 60.75-GHz carrier signal outputted by the VCO 106a. The OOK modulated signal is outputted through the antenna ANT1. Output power from the end of the antenna ANT1 is −1 dBm. The above for TMDS0 is similar for TMDS1 and TMDS2.

Figure 15:
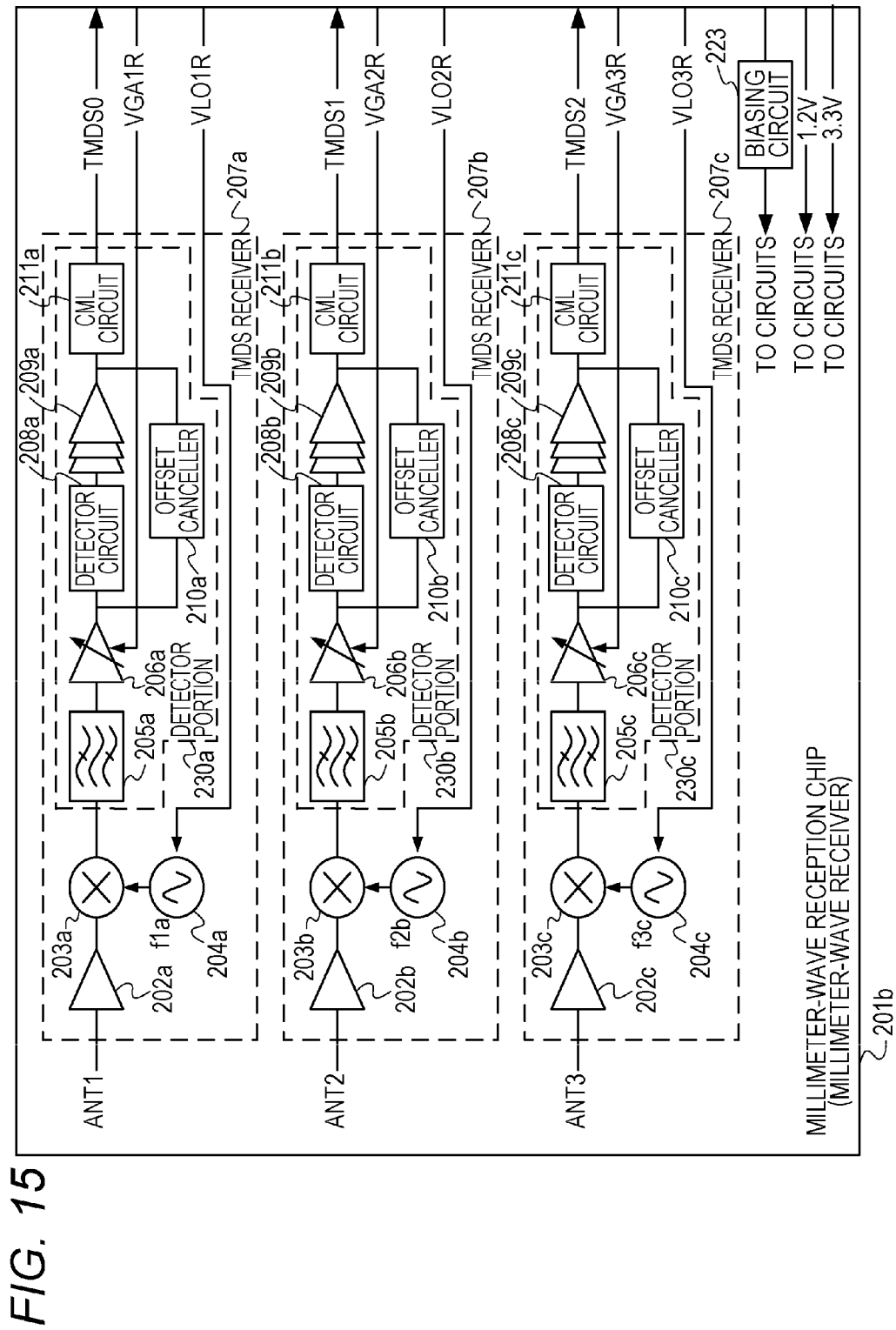
FIG. 15 is a block diagram illustrating functional features of a prototyped millimeter-wave reception chip (millimeter-wave receiver) 201b.

FIG. 15 is a block diagram illustrating functional features of the prototyped millimeter-wave reception chip (millimeter-wave receiver) 201b. In FIG. 15, elements configured in a similar manner to those of the millimeter-wave receiver 201b shown in FIG. 5 are denoted by the same reference characters and any descriptions thereof will be omitted. The millimeter-wave reception chip 201b was designed and manufactured using a 90-nm CMOS process. The millimeter-wave reception chip 201b had a chip size of 5 mm×2.69 mm. The control voltage VLO1R is inputted to the VCO 204a. The control voltage VLO2T is inputted to the VCO 204b. The control voltage VLO3T is inputted to the VCO 204c. Power of 1.2V is supplied to circuits other than CML circuits 211a to 211c. Power of 3.3V is supplied to the CML circuits 211a to 211c. The biasing circuit 223, consisting of a band gap reference circuit and a current mirror circuit, is connected to the resistor 222, which is a reference resistance, to generate a reference current of 1 mA to be supplied to various circuits.

The control voltages VLO1R to VLO3R from the DAC 217 are set such that carrier frequencies for CH1 to CH3, i.e., oscillation frequencies for the VCOs 203a to 203c, are 52.75 GHz, 54.5 GHz, and 56.25 GHz, respectively. The gain control signals VGA1R to VGA3R are set to values which optimize reception characteristics.

Figure 16:
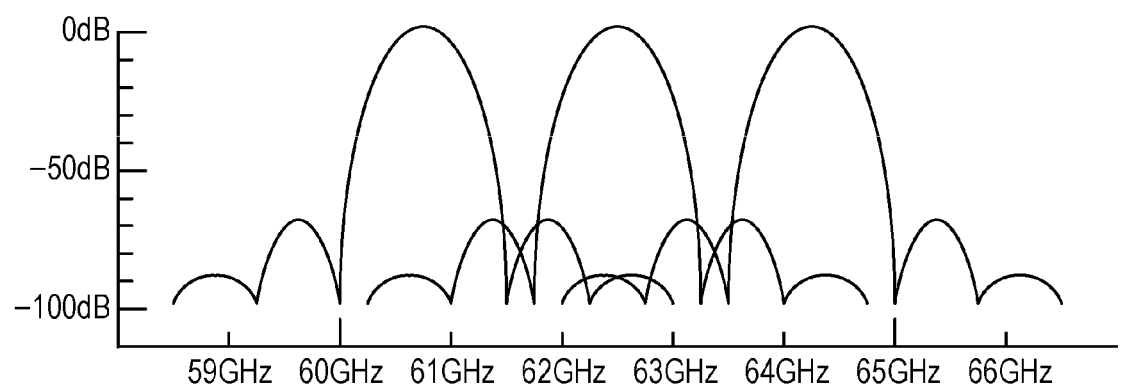
FIG. 16 illustrates spectra of signals received at an antenna ANT11 for CH1 by the millimeter-wave reception chip 201b.

FIG. 16 illustrates spectra of signals received at the antenna ANT11 for CH1 by the millimeter-wave reception chip 201b. The received signals are amplified by an LNA 202a with a gain of 20 dB and an NF of 9 dB. Any received signal at a carrier frequency of 60.75 GHz is subjected to downconversion by a mixer 203a using a 52.75-GHz local signal. The received signal subjected to downconversion is converted to an IF signal at a center frequency of 8 GHz.

Figure 17:
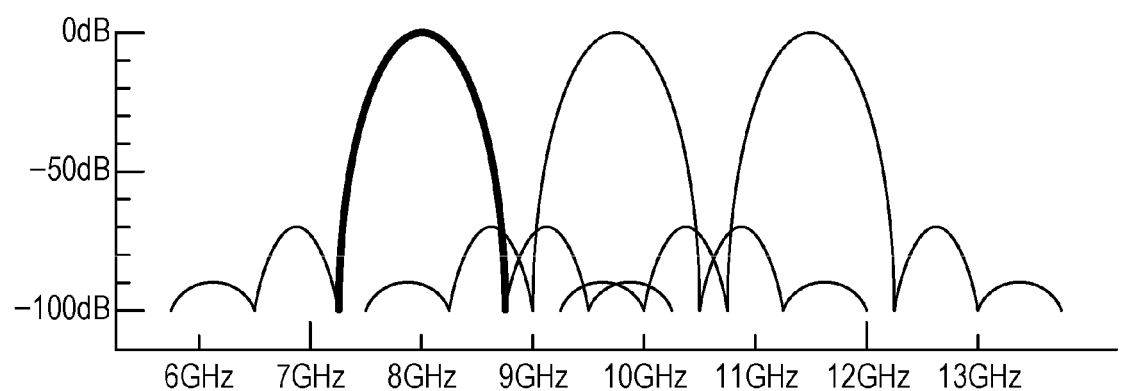
FIG. 17 illustrates spectra of IF signals.

FIG. 17 illustrates spectra of IF signals. A channel selection filter 205a only passes a CH1 signal (center frequency 8 GHz, thick line in FIG. 17) and removes other signals. The channel selection filter 205a is characterized by a center frequency of 8 GHz, a 3-dB bandwidth of 1.8 GHz, and an attenuation at a frequency 2 GHz away from the center frequency being about 16 dB.

The signal that has passed through the channel selection filter 205a is amplified by the VGA 206a and demodulated by a detector circuit 208a through square-law detection. Note that a total of gains by the mixer 203a and the VGA 206a was from 9 dB to 36 dB when the gain control signal VGA1R has a value of from 0.35V to 0.9V. A limiter circuit 209a amplifies the demodulated signal so as to maximize its amplitude and generates and converts a digital signal TMDS0 to a baseband signal at a 1.2V CMOS level. The CML circuit 211a converts a 2.9V CMOS-level baseband signal to a 3.3V differential signal, thereby generating TMDS0+ and TMDS0− to be outputted to the HDMI connector 216 via the FR4 board. The above for TMDS0 is similar for TMDS1 and TMDS2.

The prototype was measured for its BER and power consumption by principal parts using a signal at 750 Mbps with the wireless HDMI transmitter 100 and the wireless HDMI receiver 200 being placed 40 cm away from each other.

In the wireless HDMI transmitter 100,
  the carrier frequency was 60.74 GHz where VLO1T=0.61V,
  the carrier frequency was 62.46 GHz where VLO2T=0.78V, and
  the carrier frequency was 64.25 GHz where VLO3T=0.6V.
In the wireless HDMI receiver 200,
  the local frequency was 52.77 GHz where VLO1R=0.35V,
  the local frequency was 54.56 GHz where VLO2R=1.15V,
  the local frequency was 56.25 GHz where VLO3R=0.3V,
  the gain by the mixer and the VGA was about 19 dB where VGA1R=0.4V,
  the gain by the mixer and the VGA was about 19 dB where VGA2R=0.4V, and
  the gain by the mixer and the VGA was about 19 dB where VGA3R=0.4V.

As a result, in the wireless HDMI transmitter 100, power consumption was 224 mW for the millimeter-wave transmitter 101 (including power consumption of 99 mW by the CML circuits 105a to 105c), 35 mW for an RF transceiver 110 of the DDC transceiver 102, and 3.3 mW for an MCU 109. Thus, power consumption by principal parts of the wireless HDMI transmitter 100 was 262.3 mW in total.

In the wireless HDMI receiver 200, it was 240 mW for the millimeter-wave receiver 201, 44 mW for an RF transceiver 214 of the DDC transceiver 202, and 3.3 mW for an MCU. Thus, power consumption by principal parts of the wireless HDMI receiver 200 was 287.3 mW in total.

The BER was $4.4 \times 10^{-12}$ for TMDS0 on CH1, 0 for TMDS1 on CH2 (error-free: no measured error), and 0 for TMDS2 on CH3 (error-free: no measured error).

In this manner, the present prototype made it possible to confirm that low power consumption can be achieved while maintaining high quality.

Furthermore, image transmission experiments were conducted. Signals used were 1080i/60FPS and 1080p/24FPS. In this case, bit rates for the channels were 741.76 Mbps and 741.88 Mbps, respectively. A PS3 (registered trademark) manufactured by Sony Computer Entertainment Inc. was used as a source device 2. The PS3 (registered trademark) was connected to a wireless HDMI transmitter 100 via an HDMI cable. The wireless HDMI transmitter 100 was placed at a distance of 80 cm from a wireless HDMI receiver 200. An HDTV (Aquos (registered trademark)) manufactured by Sharp Corp. was used as a sink device 3. The wireless HDMI receiver 200 was connected to the HDTV via an HDMI cable.

In the case of 1080i/60FPS, the output video format of the PS3 (registered trademark) was fixed at 1080i to play Blu-ray software "Spider-Man 3" (distributor: Sony Pictures Entertainment Inc.). It was confirmed that pictures could be wirelessly transferred without any problem.

In the case of 1080p/24FPS, Blu-ray software "A Bridge Too Far" (distributor: Twentieth Century Fox Home Entertainment Japan K.K. was played, and it was confirmed that this also could be played without any problem.

The present prototype made it possible to configure the wireless HDMI transmitter and the wireless HDMI receiver that can operate at hundreds of mW. It was estimated that it can be sold for thousands of yen.

In this manner, in the first embodiment, millimeter-wave carrier signals from the VOCs 106a to 106c provided for their respective channels of a transmission path are subjected to on-off keying modulation on a channel-by-channel basis and then transmitted wirelessly. The radio signals subjected to on-off keying modulation are down-converted using millimeter-wave local signals from the VCOs 204a to 204c provided for their respective channels and therefore demodulated into the original digital signals HDMI0 to HDMI2. In this manner, in the first embodiment, radio signals are modulated by on-off keying and demodulated simply on the basis of envelope information for the radio signals subjected to on-off keying modulation, and therefore unlike in the conventional art, high-quality demodulation can be achieved without carrier frequencies being accurately fixed on the transmission side and also without local frequencies being accurately fixed on the reception side. Accordingly, for on-off keying modulation and demodulation based on envelope information, carrier and local frequencies are not required to be fixed accurately, and therefore the need for PLL circuits is eliminated. Moreover, in the case of OOK modulation, it is possible to eliminate the need for high-speed processing circuits for parallel-serial conversion and look-up tables for serial-parallel conversion. Thus, the wireless HDMI transmitter 100 and the wireless HDMI receiver 200 make it possible to eliminate the need for PLL circuits, high-speed processing circuits, and look-up tables. Accordingly, it is possible to provide a wireless transmission system for wirelessly transmitting a digital signal from one device to another at low price and low power consumption without compromising transmission quality, along with a wireless transmitter, a wireless receiver, a wireless transmission method, a wireless reception method, and a wireless communication method for use with the same system.

In the first embodiment, the millimeter-wave transmitter 101 includes the low-pass filters 104a to 104c for removing harmonic components from the digital signals HDMI0 to HDMI2. Accordingly, OOK modulation is performed using the digital signals having their harmonic components removed. As a result, the sideband levels of the modulated millimeter-wave signals are minimized, and therefore it is rendered possible to inhibit the millimeter-wave signals from disturbing their adjacent channels. Thus, it is possible to achieve signal transmission while maintaining its high quality.

The TMDS transmitters 107a to 107c are made of CMOS, and therefore high-quality millimeter-wave communication is possible. Thus, the CMS circuits effectively function for conversion to a CMOS level.

In the first embodiment, an interval between carrier frequencies is greater than or equal to a bandwidth twice the bit rate of a digital signal, and therefore it is possible to prevent sidebands from disturbing their adjacent channels, thereby realizing high-quality communication.

Transmitting the control signal DDC as a low-rate radio signal facilitates DDC transmission/reception. For DDC transmission/reception, it is requisite to confirm the HPD status, but in the case of wireless communication, a connection to an HDMI cable is not direct, and therefore there is a problem as to how the source device side recognizes the HPD status. When an HPD confirmation packet is transmitted to confirm the HPD status on the basis of its response packet, as in the first embodiment, it is possible to realize DDC transmission/reception even if such transmission/reception is performed wirelessly. In addition, it is necessary to confirm the HPD status as needed, but by confirming the HPD status using the HPD confirmation packet when DDC transmission/reception is in idling state, it is possible to confirm the HPD status as needed even if such transmission/reception is performed wirelessly. In this manner, even in the case of wireless DDC, the present invention allows appropriate DDC transmission/reception.

The detector portions 230a to 230c in the wireless HDMI receiver 200 includes the channel selection filters 205a to 205c, the variable gain amplifiers 206a to 206c, the detector circuits 208a to 208c, the limiter circuits 209a to 209c, and the offset cancellers 210a to 210c, and therefore can accurately demodulate received radio signals.

The local oscillators 204a to 204c, the mixers 203a to 203c, and the detector portions 230a to 230c in the wireless HDMI receiver 200 are made of CMOS, thereby making it possible to perform high-quality millimeter-wave communication. Accordingly, it is effective for the CML circuits 211a to 211c to perform conversion from a CMOS level to a voltage level for the sink device 3.

In the wireless HDMI receiver 200, the millimeter-wave radio signals are down-converted to IF signals, resulting in increased demodulation accuracy.

By reproducing the clock signal "HDMI CLK" with the clock recovery circuit, it is rendered possible to construct an HDMI wireless transmission system even if a millimeter band for four channels is not available due to, for example, the use of radio waves being regulated.

Second Embodiment

FIG. 1 is referenced for the overall configuration of a wireless transmission system 1 in a second embodiment because it is generally the same as in the first embodiment. Moreover, FIGS. 2 and 3 are referenced for the schematic configurations of the wireless HDMI transmitter 100 and the wireless HDMI receiver 200 because they are generally the same as in the first embodiment. The second embodiment differs from the first embodiment regarding the configuration of a millimeter-wave transmitter 401. Specifically, the millimeter-wave transmitter 401 of the second embodiment differs from the millimeter-wave transmitter 101 of the first embodiment in that PLL circuits are provided for locking VCOs 106a to 106c of TMDS transmitters 107a to 107c only at predetermined times. Moreover, a millimeter-wave receiver 501 of the second embodiment differs from the millimeter-wave receiver 201 of the first embodiment in that PLL circuits are provided for locking TMDS receivers 207a to 207c only at predetermined times.

Figure 18:
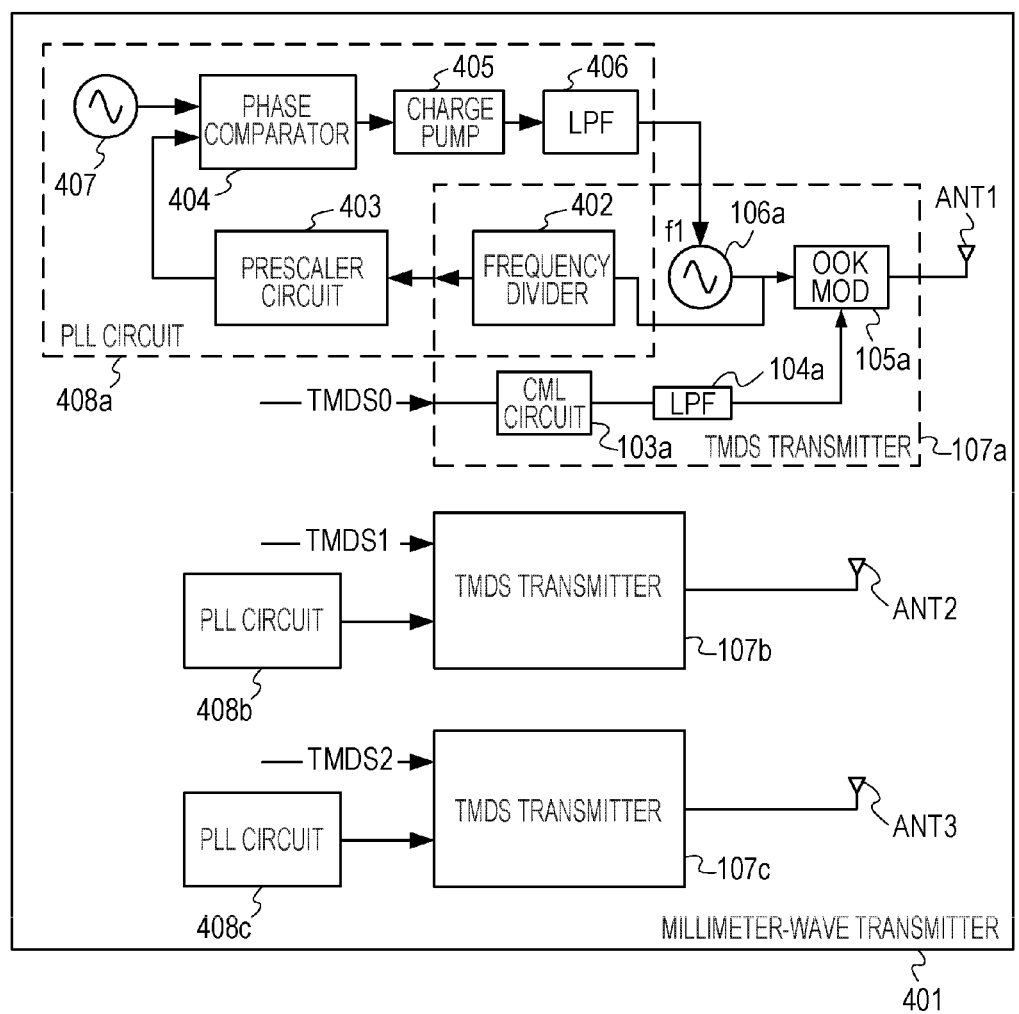
FIG. 18 is a block diagram illustrating functional features of a millimeter-wave transmitter 401 in a second embodiment of the present invention.

FIG. 18 is a block diagram illustrating functional features of the millimeter-wave transmitter 401 in the second embodiment of the present invention. In FIG. 18, elements that function generally in the same manner as in the millimeter-wave transmitter 101 of the first embodiment are denoted by the same reference characters, and any descriptions thereof will be omitted. The millimeter-wave transmitter 401 is provided with PLL circuits 408a to 408c for fixing the oscillation frequencies of the VCOs 106a to 106c. Each of the PLL circuits 408a to 408c includes a frequency divider 402, a prescaler circuit 403, a phase comparator 404, a charge pump 405, a low-pass filter 406, and a reference oscillator 407.

The frequency divider 402 divides an output of the VCO 106a to generate a 1/M frequency. The prescaler circuit 403 multiplies the frequency of the output of the frequency divider 402 by L/N (L<M) before inputting it to the phase comparator 404. Where the frequency of the VCO 106a is F_VCO, the output frequency of the prescaler circuit 403 is F_VCO·L/M/N. A reference frequency from the reference oscillator 407 is inputted to the other input terminal of the phase comparator 404. The phase comparator 404 performs phase comparison between the reference frequency and a clock signal outputted by the prescaler circuit 403. In accordance with the result of comparison by the phase comparator 404, the charge pump 405 raises/lowers its output voltage. The output voltage of the charge pump 405 is inputted to a frequency control terminal of the VCO 106a via the low-pass filter 406. With the frequency of the VCO 106a being locked, F_REF and F_VCO have the relationship F_REF=F_VCO·L/M/N. The above is similar for the PLL circuits 408b and 408c connected to the VCOs 106b and 106c, but the reference frequency of the reference oscillator 407 and the division ratios of the frequency divider 402 and the prescaler circuit 403 are suitably selected in accordance with the oscillation frequencies of the VCOs 106b and 106c.

Figure 19:
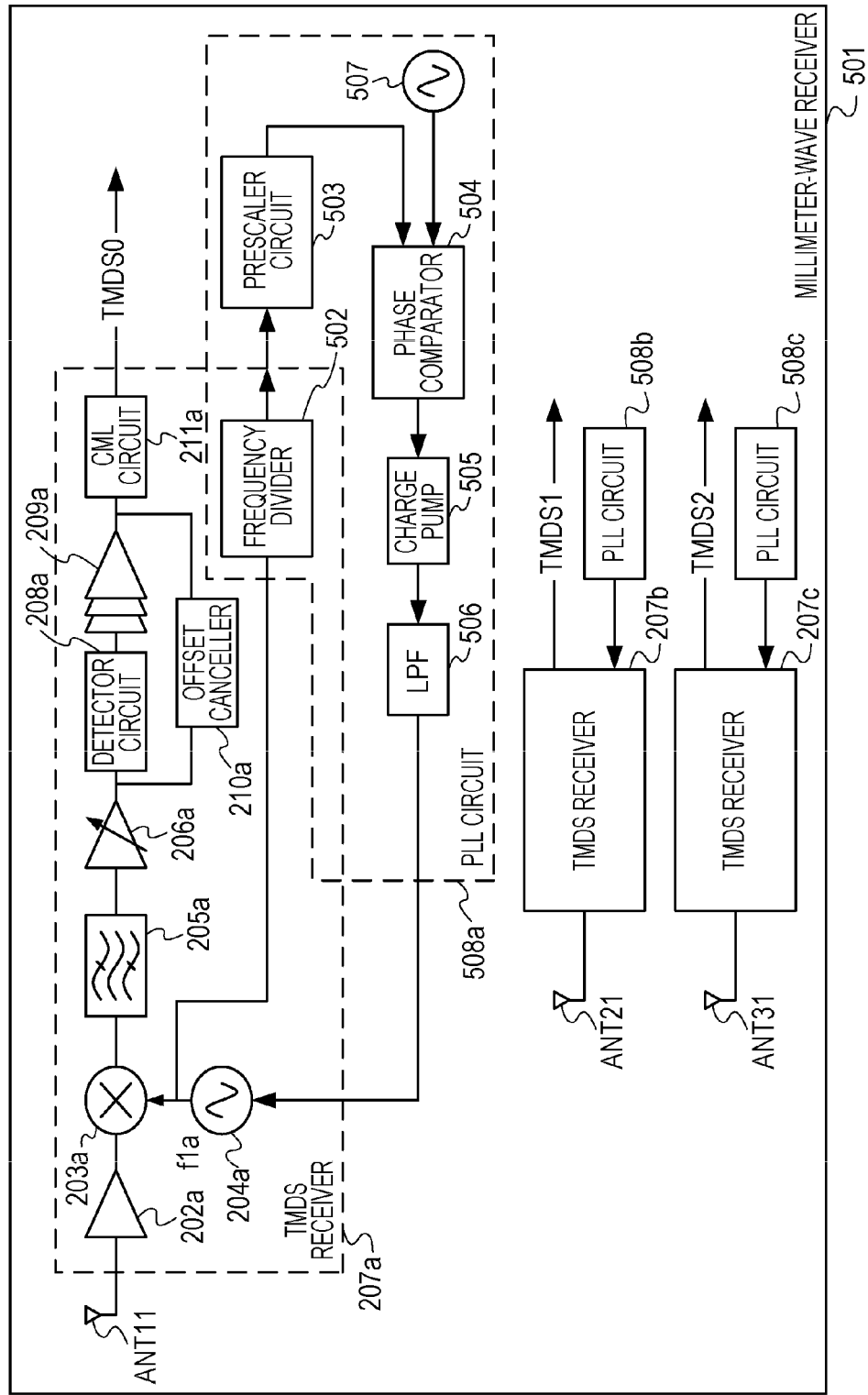
FIG. 19 is a block diagram illustrating functional features of a millimeter-wave receiver 501 in the second embodiment of the present invention.

FIG. 19 is a block diagram illustrating functional features of the millimeter-wave receiver 501 in the second embodiment of the present invention. In FIG. 19, elements that function generally in the same manner as in the millimeter-wave receiver 201 of the first embodiment are denoted by the same reference characters, and any descriptions thereof will be omitted. The millimeter-wave receiver 501 is provided with PLL circuits 508a to 508c for fixing the oscillation frequencies of the VCOs 204a to 204c. Each of the PLL circuits 508a to 508c includes a frequency divider 502, a prescaler circuit 503, a phase comparator 504, a charge pump 505, a low-pass filter 506, and a reference oscillator 507. The PLL circuits 508a to 508c connected to the VCOs 204a to 204c operate generally in the same manner as the PLL circuits 408a to 408c, but the reference frequency of the reference oscillator 507 and the division ratios of the frequency divider 502 and the prescaler circuit 503 are suitably selected in accordance with the oscillation frequencies of the VCOs 204a to 204c.

The second embodiment is characterized by times at which the PLL circuits 408a to 408c and 508a to 508c fix the oscillation frequencies of the VCOs 106a to 106c and 204a to 204c. Normally, it is preferable that VCOs be always locked by PLL circuits, but in the case where OOK modulation is used, there is almost no deterioration of transmission quality even if there are slight shifts in the oscillation frequencies, as described in the first embodiment. Accordingly, in the present invention, PLL circuits for locking VCOs are dispensable.

However, if VCOs are locked only at predetermined times and control voltages used at those times are continuously supplied to the VCOs thereafter, it is possible to suppress power consumption and further prevent transmission quality deterioration. Therefore, in the second embodiment, the VCOs are locked only at predetermined times and thereafter unlocked, and control voltages used for the locking are continuously supplied to the VCOs while the millimeter-wave transmitter 401 and the millimeter-wave receiver 501 are in operation.

Examples of the predetermined times include (1) the first time the wireless HDMI transmitter 100 is connected to the source device 2, (2) the first time the wireless HDMI receiver 200 is connected to the sink device 3, (3) the manufacturing time of the wireless HDMI transmitter 100 and the wireless HDMI receiver 200, and (4) prescribed regular times.

Unillustrated control portions respectively provided for the wireless HDMI transmitter 100 and the wireless HDMI receiver 200 manage the predetermined times, and control the operations of the PLL circuits 408a to 409c and 508a to 508c such that the PLL circuits 408 and 507 lock the VCOs 106a to 106c and 204a to 204c when the predetermined times arrive. When control voltages are obtained after the locking, the control portions input the control voltages to unillustrated digital-analog converters, thereby converting values of the control voltages into digital data. After the conversion, the digital data is stored to unillustrated storage portions respectively provided in the wireless HDMI transmitter 100 and the wireless HDMI receiver 200. Thereafter, until another predetermined time arrives, the digital-analog converters input control voltages that correspond to the stored digital data to the VCOs 106a to 106c and 204a to 204c. In this manner, the PLL circuits 408a to 408c and 508a to 508c function as frequency adjustment portions such that the oscillation frequencies of the VCOs 106a to 106c, which function as carrier oscillators, and the oscillation frequencies of the VCOs 204a to 204c, which function as local oscillators, are adjusted only at predetermined times.

In this manner, in the second embodiment, the carrier frequencies are adjusted only at predetermined times. Accordingly, it is possible to prevent any significant carrier frequency shift and furthermore allow high-quality communication. In addition, there is an effect in that carrier frequency adjustments do not lead to an increase in power consumption if such adjustments are made only at predetermined times. When the frequency adjustment portions on the transmission side and the reception side are PLL circuits, the frequency adjustment portions can be readily designed. Furthermore, the frequency adjustment portions 408a to 40c8 can be constructed using CMOS technology, so that the frequency adjustment functions can be added without increasing the size of the wireless HDMI transmitter 100 and the wireless HDMI receiver 200.

Third Embodiment

Figure 20:
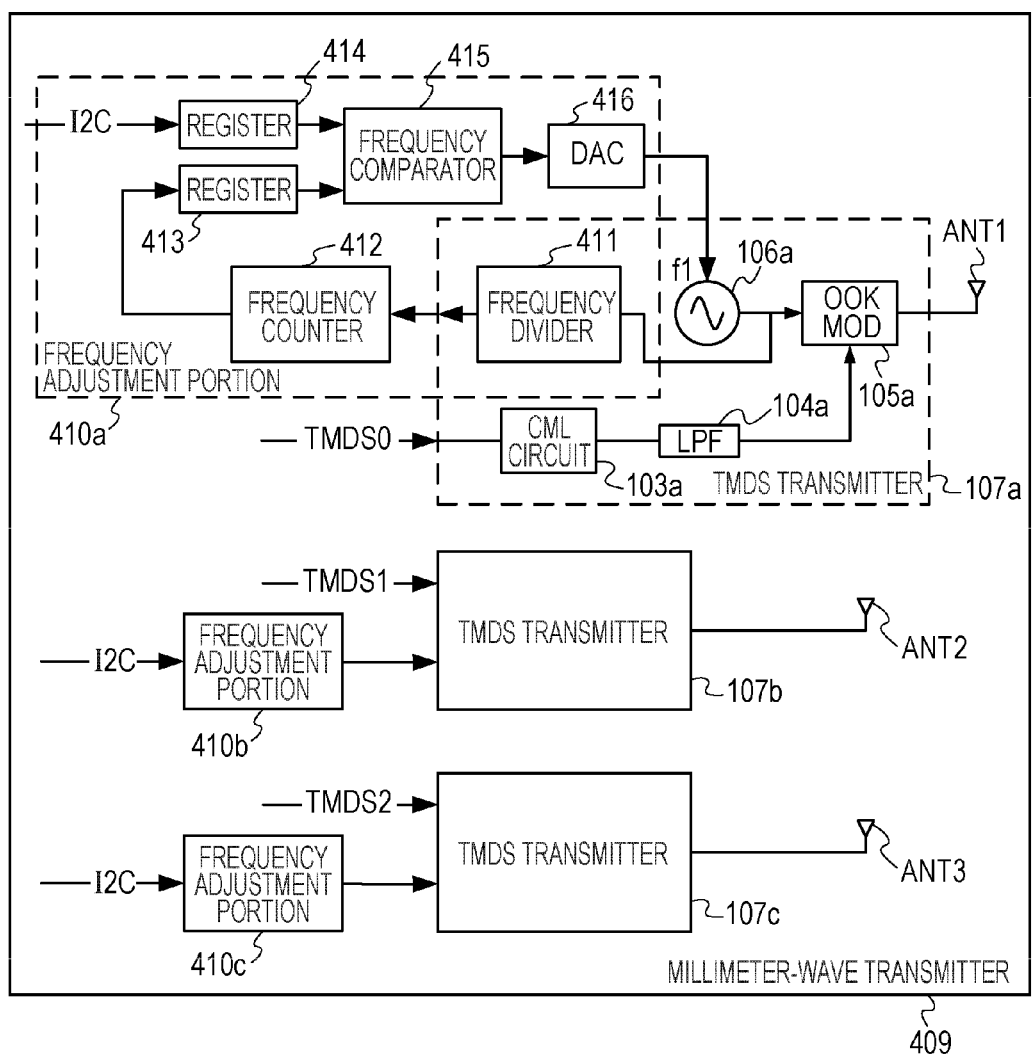
FIG. 20 is a block diagram illustrating functional features of a millimeter-wave transmitter 409 in a third embodiment of the present invention.

In a third embodiment, as frequency adjustment portions, frequency counters are used in place of the PLL circuits used in the second embodiment. Hereinafter, differences from the second embodiment will be described. FIG. 20 is a block diagram illustrating functional features of a millimeter-wave transmitter 409 in the third embodiment of the present invention. In FIG. 20, elements that function generally in the same manner as in the millimeter-wave transmitter 101 in the first embodiment are denoted by the same reference characters, and any descriptions thereof will be omitted. The millimeter-wave transmitter 409 is provided with frequency adjustment portions 410a to 410c for adjusting the oscillation frequencies of the VCOs 106a to 106c. Each of the frequency adjustment portions 410a to 410c includes a frequency divider 411, a frequency counter 412, registers 413 and 414, a frequency comparator 415, and a digital-analog converter 416.

The frequency divider 411 divides an output of the VCO 106a. The frequency counter 412 measures a post-division frequency and writes it to the register 413. On the other hand, a set value stored in an unillustrated ROM is written to the register 414 via I2C communication upon power-on. The frequency comparator 415 compares the set value in the register 414 and the measured value in the register 413 and inputs the result of comparison to the digital-analog converter 416 as a digital signal. The digital-analog converter 416 changes the inputted digital signal into a voltage, which is inputted to the VCO 106a as a control voltage for the VCO 106a. The above is similar for the frequency adjustment portions 410b and 410c connected to the VCOs 106b and 106c, but set values for the frequency divider 411 and the register 414 are appropriately selected in accordance with the oscillation frequencies of the VCOs 106b and 106c.

Figure 21:
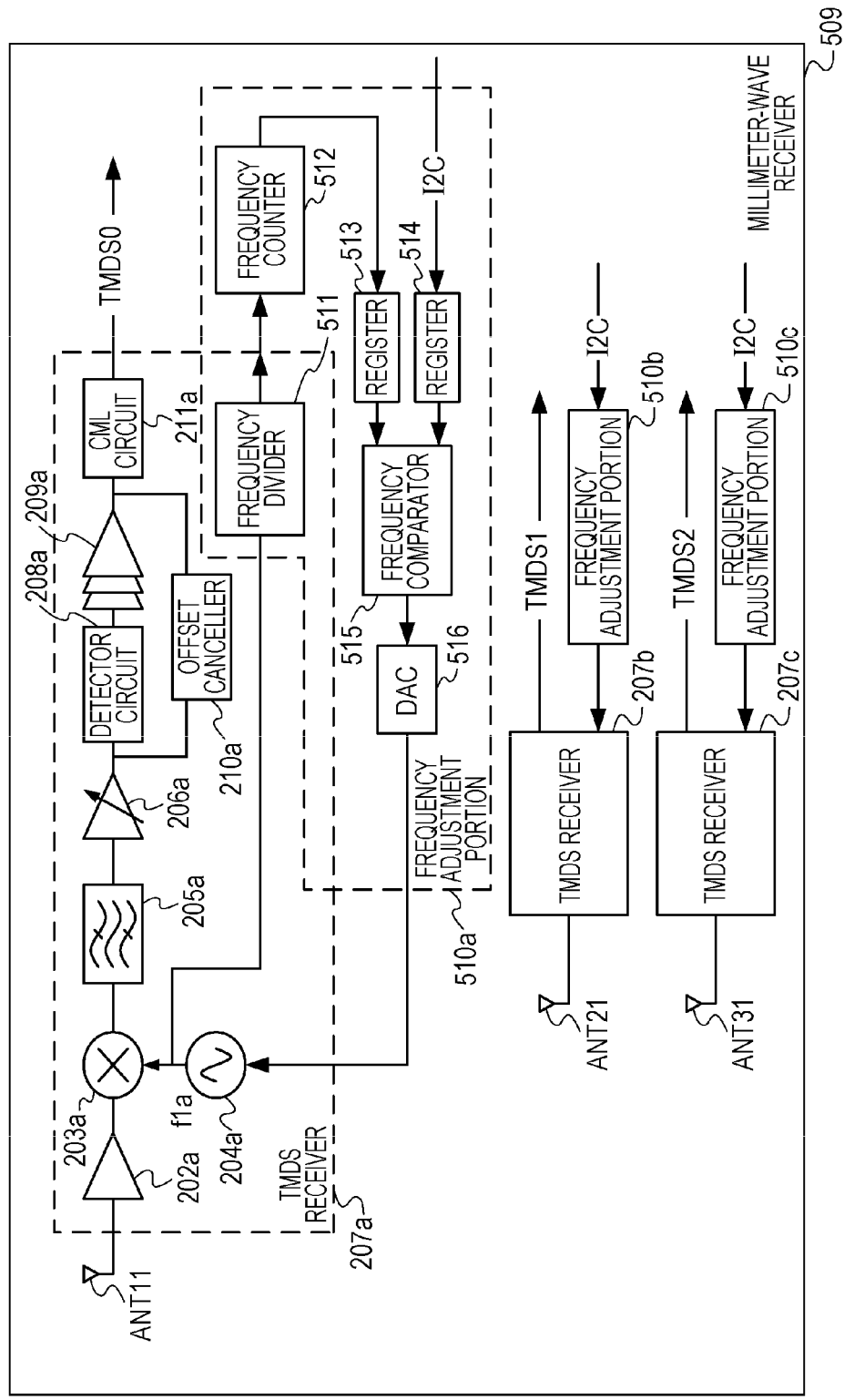
FIG. 21 is a block diagram illustrating functional features of a millimeter-wave receiver 509 in the second embodiment of the present invention.

FIG. 21 is a block diagram illustrating functional features of the millimeter-wave receiver 509 in the second embodiment of the present invention. In FIG. 21, elements that function generally in the same manner as in the millimeter-wave receiver 201 in the first embodiment are denoted by the same reference characters, and any descriptions thereof will be omitted. The millimeter-wave receiver 501 is provided with frequency adjustment portions 510a to 510c for adjusting the oscillation frequencies of the VCOs 204a to 204c. Each of the frequency adjustment portions 510a to 510c includes a frequency divider 511, a frequency counter 512, registers 513 and 514, a frequency comparator 515, and a digital-analog converter 516. While the frequency adjustment portions 510a to 510c connected to the VCOs 204a to 204c operate in a similar manner to the frequency adjustment portions 410a to 410c, set values for the frequency divider 511 and the register 514 are appropriately selected in accordance with the oscillation frequencies of the VCOs 204a to 204c.

The third embodiment is characterized by times at which the frequency adjustment portions 410a to 410c and 510a to 510c fix the oscillation frequencies of the VCOs 106a to 106c and 204a to 204c. Normally, it is preferable that VCOs be always locked by PLL circuits, but in the case where OOK modulation is used, there is almost no deterioration of transmission quality even if there are slight shifts in the oscillation frequencies, as described in the first embodiment. Accordingly, in the present invention, PLL circuits for locking VCOs are dispensable. However, if the oscillation frequencies of VCOs are adjusted only at predetermined times and control voltages used at those times are continuously supplied to the VCOs thereafter, it is possible to suppress power consumption and further prevent transmission quality deterioration. Therefore, in the third embodiment, the oscillation frequencies of the VCOs are locked only at predetermined times, and after the adjustments are over, control voltages used for the adjustments are continuously supplied to the VCOs while the millimeter-wave transmitter 409 and the millimeter-wave receiver 509 are in operation.

Examples of the predetermined times include (1) the first time the wireless HDMI transmitter 100 is connected to the source device 2, (2) the first time the wireless HDMI receiver 200 is connected to the sink device 3, (3) the manufacturing time of the wireless HDMI transmitter 100 and the wireless HDMI receiver 200, and (4) prescribed regular times.

Unillustrated control portions respectively provided for the wireless HDMI transmitter 100 and the wireless HDMI receiver 200 manage the predetermined times, and control the operations of the frequency adjustment portions 410a to 410c and 510a to 510c such that the frequency adjustment portions 410a to 410c and 510a to 510c adjust the oscillation frequencies of the VCOs 106a to 106c and 204a to 204c when the predetermined times arrive. When control voltages are obtained after the locking, the control portions input the control voltages to unillustrated digital-analog converters, thereby converting values of the control voltages into digital data. After the conversion, the digital data is stored to unillustrated storage portions respectively provided in the wireless HDMI transmitter 100 and the wireless HDMI receiver 200. Thereafter, until another predetermined time arrives, the digital-analog converters input control voltages that correspond to the stored digital data to the VCOs 106a to 106c and 204a to 204c.

In this manner, in the third embodiment, the local frequencies are adjusted only at predetermined times. Accordingly, it is possible to prevent any significant local frequency shift and furthermore allow high-quality communication. In addition, there is an effect in that local frequency adjustments do not lead to an increase in power consumption if such adjustments are made only at predetermined times. Moreover, the frequency control portions are configured to measure and compare frequencies to defined values, and therefore it is possible to provide a wireless transmitter for which frequencies are appropriately adjusted while achieving low power consumption. Furthermore, it is possible to eliminate the need for the low-pass filters 406 as required in the PLL circuits 408a to 408c in the second embodiment, resulting in simplified circuit configurations, and therefore the frequency adjustment functions can be added at low cost. Further still, the frequency adjustment portions 410a to 410c can be constructed using CMOS technology, so that the frequency adjustment functions can be added without increasing the size of the wireless HDMI transmitter 100 and the wireless HDMI receiver 200.

Note that in the third embodiment, by using an OTPROM (one-time PROM) in place of the register 414, set values for frequency information can be written to the OTPROM during chip inspection of shipping time. In this manner, by previously writing set values in the OTPROM, users having the millimeter-wave transmission chip 110b and the millimeter-wave reception chip 201b incorporated in their products are not required to determine the set values.

Note that if power consumption by the frequency adjustment portions 410a to 410c and 510a to 510c is not a concern, the frequency adjustment portions 410a to 410c and 510a to 510c may operate all the time.

Note that in the second and third embodiments, the frequency adjustment portions may be provided only on the transmission side, or inversely, only on the reception side. Moreover, the frequency control portions do not have to be equal in configuration between those used on the transmission side and the reception side.

Fourth Embodiment

As in the case of HDMI, communication using OOK modulation and millimeter waves may be available in the form of two-way communication in addition to one-way communication. For example, communication using OOK modulation and millimeter waves can be achieved with USB 2.0. A fourth embodiment will be described with respect to a case where OOK modulation and millimeter waves are used in communication with USB 2.0.

FIG. 22 is a table showing pin assignments for connectors to be used with USB 2.0. In the case of USB 2.0, half-duplex two-way communication is performed using differential signal lines D+ and D− between the host side, such as a personal computer, and the device side, such as a peripheral device. Accordingly, transmission and reception are performed in a time-division manner. Moreover, control signals are packetized for communication using differential signals, as with data in data communication. Therefore, it is possible to eliminate the need for 2.4-GHz transceivers as required for DDC in the case of HDMI.

Figure 23:
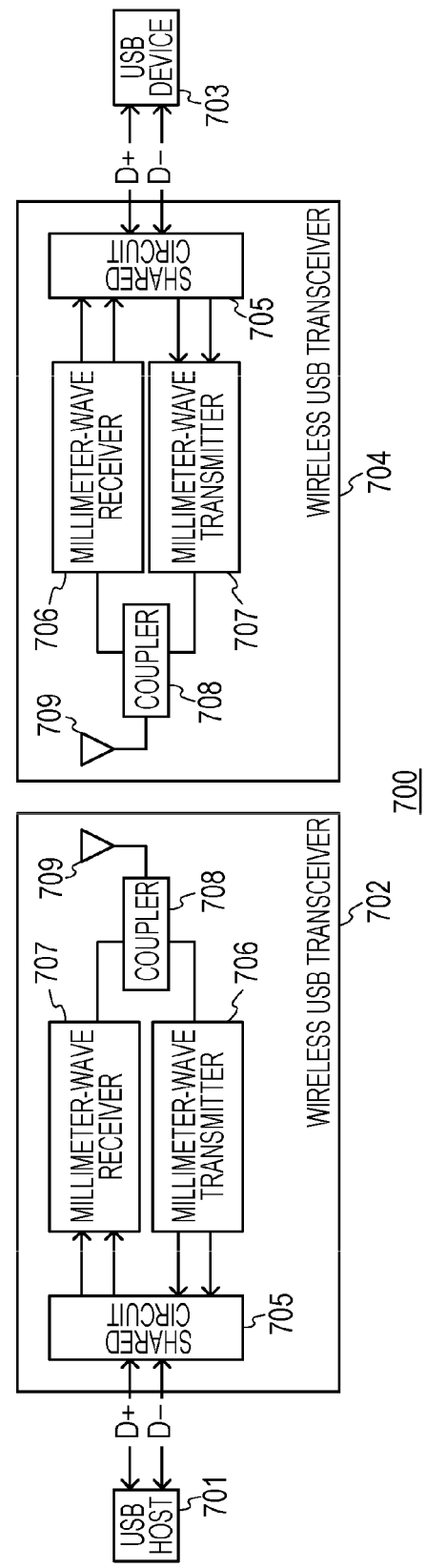
FIG. 23 is a diagram illustrating the overall configuration of a wireless transmission system 700 where OOK modulation and millimeter waves are used with USB 2.0.

FIG. 23 is a diagram illustrating the overall configuration of a wireless transmission system 700 where OOK modulation and millimeter waves are used with USB 2.0. The wireless transmission system 700 includes a USB host 701, a wireless USB transceiver 702, a USB device 703, and a wireless USB transceiver 704. The USB host 701 and the wireless USB transceiver 702 are connected via a USB cable. The USB device 703 and the wireless USB transceiver 704 are connected via a USB cable. Power for use in the wireless USB transceiver 702 is supplied by the USB host 701 via the USB cable. Power for use in the wireless USB transceiver 704 is additionally required.

The wireless USB transceiver (transmission portion) 702 includes a shared circuit 705, a millimeter-wave transmitter 707, a millimeter-wave receiver 706, a coupler 708, and an antenna 709. The wireless USB transceiver (reception portion) 704 includes a shared circuit 705, a millimeter-wave transmitter 707, a millimeter-wave receiver 706, a coupler 708, and an antenna 709. Elements denoted by the same reference characters in the wireless USB transceiver 702 and the wireless USB transceiver 704 are configured in the same manner. The wireless USB transceiver (transmission portion) 702 and the wireless USB transceiver (reception portion) 704 share transmission and reception frequencies.

Figure 24:
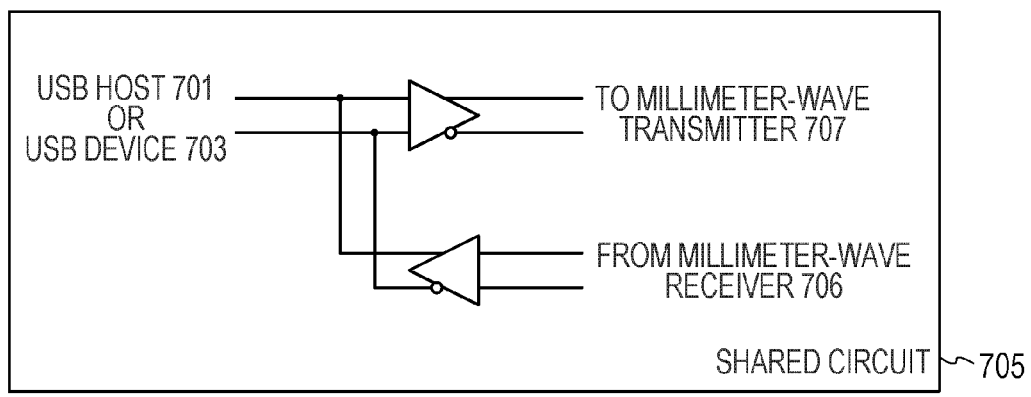
FIG. 24 is a circuit diagram of a shared circuit 705.

FIG. 24 is a circuit diagram of the shared circuit 705. The shared circuit 705 transfers a signal transmitted by the USB host 701 (or the USB device 703) to the millimeter-wave transmitter 707 and also transmits a signal outputted by the millimeter-wave receiver 706 to the USB host 701 (or the USB device 703).

Figure 25:
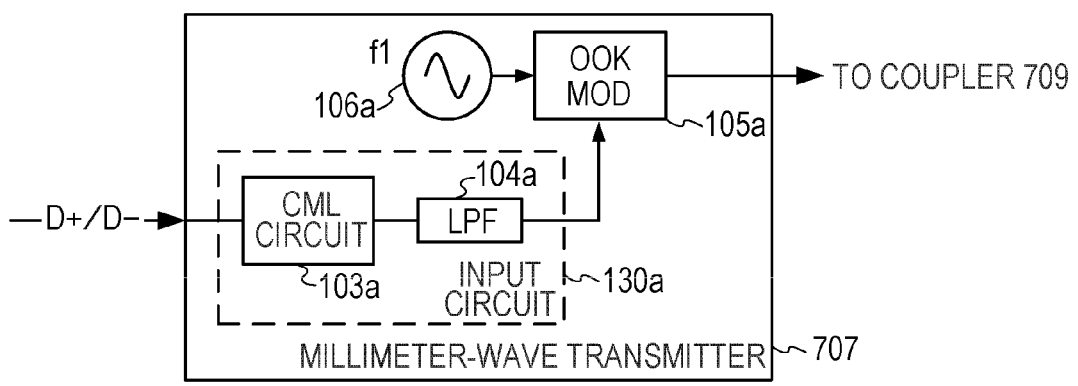
FIG. 25 is a block diagram illustrating functional features of a millimeter-wave transmitter 707.

FIG. 25 is a block diagram illustrating functional features of the millimeter-wave transmitter 707. In FIG. 25, elements that function generally in the same manner as in the first embodiment are denoted by the same reference characters, and any descriptions thereof will be omitted. The millimeter-wave transmitter 707 subjects signals D+ and D− to OOK modulation, and transmits millimeter-wave radio signals.

Figure 26:
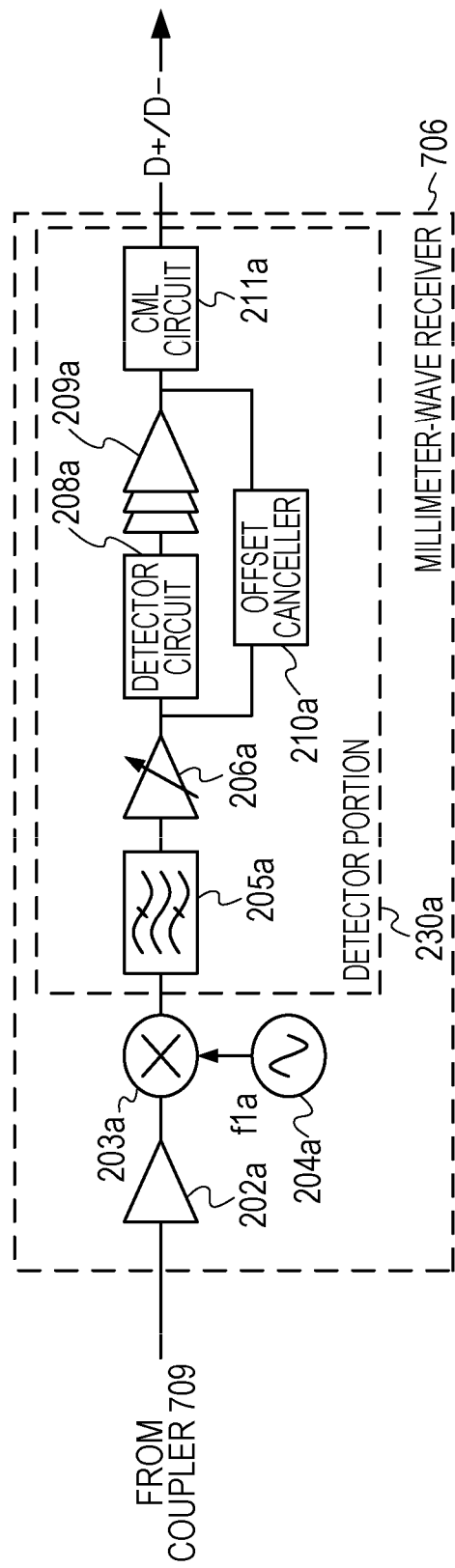
FIG. 26 is a block diagram illustrating functional features of a millimeter-wave receiver 706.

FIG. 26 is a block diagram illustrating functional features of the millimeter-wave receiver 706. In FIG. 26, elements that function generally in the same manner as in the first embodiment are denoted by the same reference characters, and any descriptions thereof will be omitted. The millimeter-wave receiver 706 demodulates a received millimeter-wave radio signal, thereby reproducing signals D+ and D−.

Since the USB 2.0 communication is half-duplex communication, the antenna 709 can be shared between the millimeter-wave transmitter 707 and the millimeter-wave receiver 706 via the coupler 708.

The bit rate for USB 2.0 is 480 Mbps, and therefore the band 480M×2=960 MHz is required for communication. Communication is rendered available by setting the oscillation frequencies of the VCOs 106a and 204a within an arbitrary frequency range of millimeter bands from 59 GHz to 66 GHz. The USB transceiver 2.0 performs half-duplex communication, and therefore the oscillation frequencies of the VCOs 106a and 204a may be equal.

In this manner, in the fourth embodiment, by providing a millimeter-wave transmitter (transmission portion) and a millimeter-wave receiver (reception portion) that share transmission and reception frequencies therebetween, it is rendered possible to perform half-duplex millimeter-wave wireless communication such as with USB 2.0.

As implied in the fourth embodiment, the number of each of the carrier oscillator, the OOK modulator, the input circuit, the local oscillator, the mixer, and the detector portion may be at least one or more.

Note that the configuration in the fourth embodiment can also be applied to any standards other than USB 2.0, so long as such standards employ a half-duplex communication system.

Fifth Embodiment

Communication using OOK modulation and millimeter waves is available not only with USB 2.0 but also with USB 3.0. Pin assigns for USB 3.0 are shown below.

No. 1: power (VBUS)
No. 2: USB 2.0 differential pair (D−)
No. 3: USB 2.0 differential pair (D+)
No. 4: USB OTG ID for identifying lines
No. 5: GND
No. 6: USB 3.0 signal transmission line (−)
No. 7: USB 3.0 signal transmission line (+)
No. 8: GND
No. 9: USB 3.0 signal reception line (−)
No. 10: USB 3.0 signal reception line (+)

As for Nos. 1 to 5, signals are the same as in the case of USB 2.0. For Nos. 6 to 10, signals are for use with USB 3.0. Nos. 6 and 7 correspond to send-only differential signal lines for ultrafast signal transmission for use with USB 3.0. Nos. 9 and 10 correspond to receive-only differential signal lines for ultrafast signal transmission for use with USB 3.0. In USB 3.0 ultrafast signal transmission, transmission and reception are performed using their respective different signal lines, and can occur concurrently. That is, USB 3.0 communication is full-duplex communication.

Figure 27:
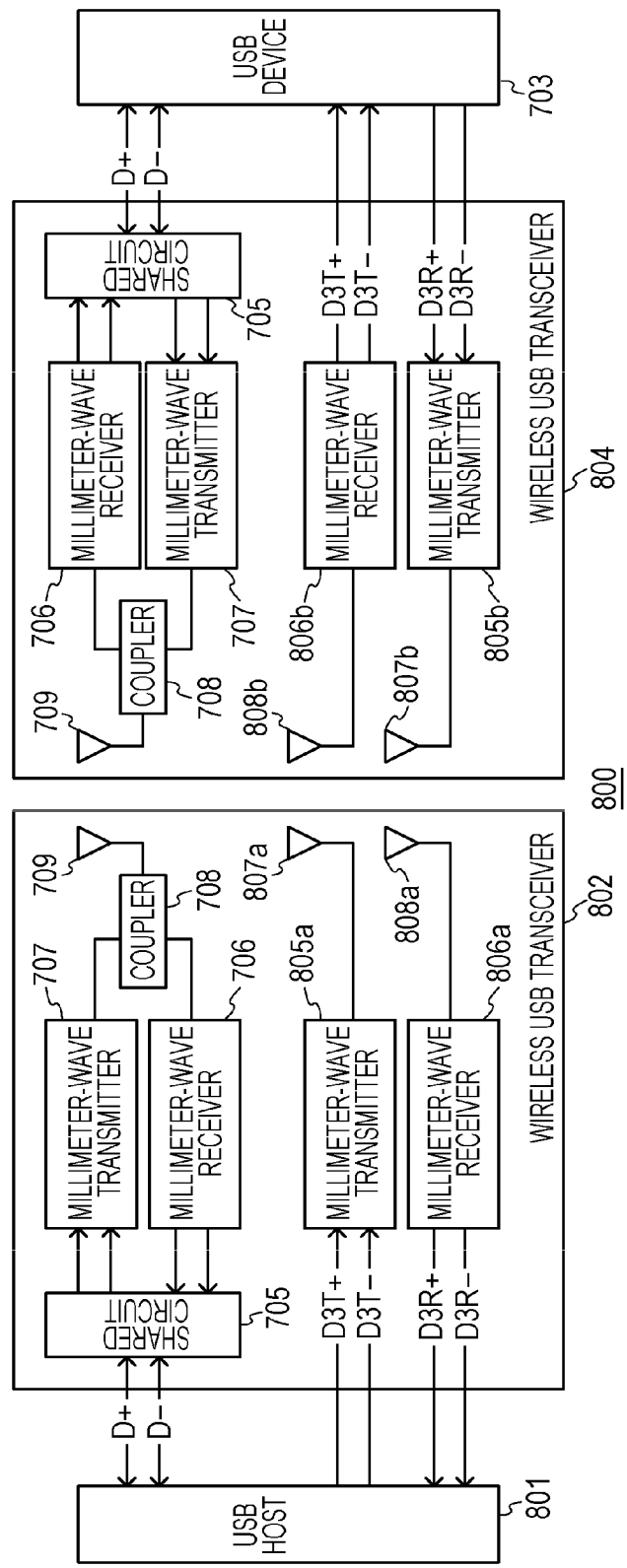
FIG. 27 is a diagram illustrating the overall configuration of a wireless transmission system 800 where OOK modulation and millimeter waves are used with USB 3.0.

FIG. 27 is a diagram illustrating the overall configuration of a wireless transmission system 800 where OOK modulation and millimeter waves are used with USB 3.0. In FIG. 27, elements that function generally in the same manner as in the fourth embodiment are denoted by the same reference characters, and any descriptions thereof will be omitted.

The wireless transmission system 800 includes a USB host 801, a wireless USB transceiver 802, a UDB device 803, and a wireless USB transceiver 804. The USB host 801 and USB device 803 are devices supporting USB 3.0. The USB host 801 and the wireless USB transceiver 802 are connected via a USB cable. The USB device 803 and the wireless USB transceiver 804 are connected via a USB cable. Power for use in the wireless USB transceiver 802 is supplied by the USB host 701 via the USB cable. Power for use in the wireless USB transceiver 804 is additionally required.

The wireless USB transceiver 802 includes a shared circuit 705, a millimeter-wave transmitter 707, a millimeter-wave receiver 706, a coupler 708, an antenna 709, a millimeter-wave transmitter 805a, a millimeter-wave receiver 806a, an antenna 807a, and an antenna 808a.

The wireless USB transceiver 804 includes a shared circuit 705, a millimeter-wave transmitter 707, a millimeter-wave receiver 706, a coupler 708, an antenna 709, a millimeter-wave transmitter 805b, a millimeter-wave receiver 806b, an antenna 807b, and an antenna 808b. Elements of the wireless USB transceiver 802 and the wireless USB transceiver 804 that are denoted by the same reference characters are configured in the similar manner.

The millimeter-wave transmitter 805a is configured in the same manner as the millimeter-wave transmitter 707, except for oscillation frequencies of VCOs. The millimeter-wave receiver 806b is configured in the same manner as the millimeter-wave receiver 706, except for oscillation frequencies of VCOs. The millimeter-wave transmitter 805b is configured in the same manner as the millimeter-wave transmitter 707, except for oscillation frequencies of VCOs. The millimeter-wave receiver 806a is configured in the same manner as the millimeter-wave receiver 706, except for oscillation frequencies of VCOs. In the case of USB 3.0, ultrafast communication is full-duplex communication, and therefore antennas cannot be shared. Therefore, in addition to the antenna 709 for USB 2.0, the antennas 807a, 808a, 807b, and 808b are required. The antennas 807a and 807b are transmission antennas. The antennas 808a and 808b are reception antennas. That is, the wireless transmission system 800 performs 3-channel communication.

Figure 28:
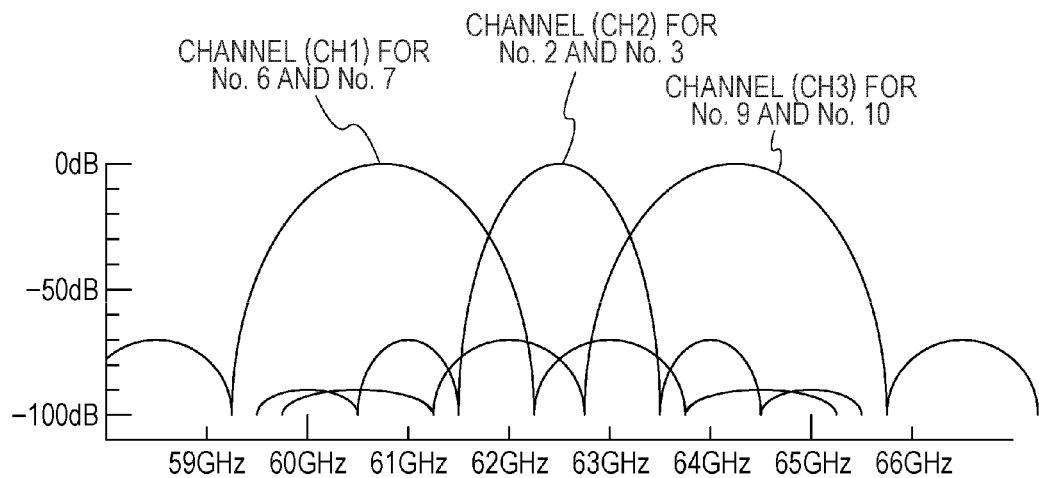
FIG. 28 is a graph illustrating exemplary spectra of radio signals transmitted by wireless USB transceivers 802 and 804.

FIG. 28 is a graph illustrating exemplary spectra of radio signals transmitted by the wireless USB transceivers 802 and 804. In FIG. 28, the millimeter-wave transmitter 707 transmits a radio signal with a center frequency of 62.5 GHz. Specifically, the oscillation frequency of the VCO 106a used in the millimeter-wave transmitter 707 is 62.5 GHz. Moreover, the oscillation frequency of the VCO 204a in the millimeter-wave receiver 706 is 54.5 GHz, for example.

The millimeter-wave transmitter 805a transmits a radio signal with a center frequency of 60.75 GHz. Specifically, the oscillation frequency of the VCO 106a used in the millimeter-wave transmitter 805a is 60.75 GHz. Moreover, the millimeter-wave receiver 806b receives a radio signal with a center frequency of 60.75 GHz. Specifically, the oscillation frequency of the VCO 204a used in the millimeter-wave receiver 806b is 52.75 GHz, for example.

The millimeter-wave transmitter 805b transmits a radio signal with a center frequency of 64.25 GHz. Specifically, the oscillation frequency of the VCO 106a used in the millimeter-wave transmitter 805b is 64.25 GHz. Moreover, the millimeter-wave receiver 806a receives a radio signal with a center frequency of 64.25 GHz. Specifically, the oscillation frequency of the VCO 204a used in the millimeter-wave receiver 806a is 56.25 GHz, for example.

Communication with USB 2.0 and ultrafast communication additionally provided by USB 3.0 are not performed at the same time, and therefore interference is not caused if the wireless frequency band 62.5 GHz for USB 2.0 overlaps with the wireless frequency bands 60.75 GHz and 64.25 GHz for ultrafast communication, as shown in FIG. 28. While ultrafast communication with USB 3.0 is performed at 5 Gbps, communication can be at least possible at 1.5 Gbps in the case where frequency bands as shown in FIG. 21 are used.

In this manner, in the fifth embodiment, by providing the half-duplex transmission and reception functions as well as the millimeter-wave transmitter (transmission portion) 805a and the millimeter-wave receiver (reception portion) 806b with reception frequencies different from the transmission frequencies of the millimeter-wave transmitter (transmission portion) 805a, it is rendered possible to perform full-duplex millimeter-wave wireless communication such as ultrafast communication with USB 3.0.

Note that the configuration of the fifth embodiment can also be applied to any standards other than USB 3.0, so long as such standards employ a full-duplex communication system.

Sixth Embodiment

Figure 29:
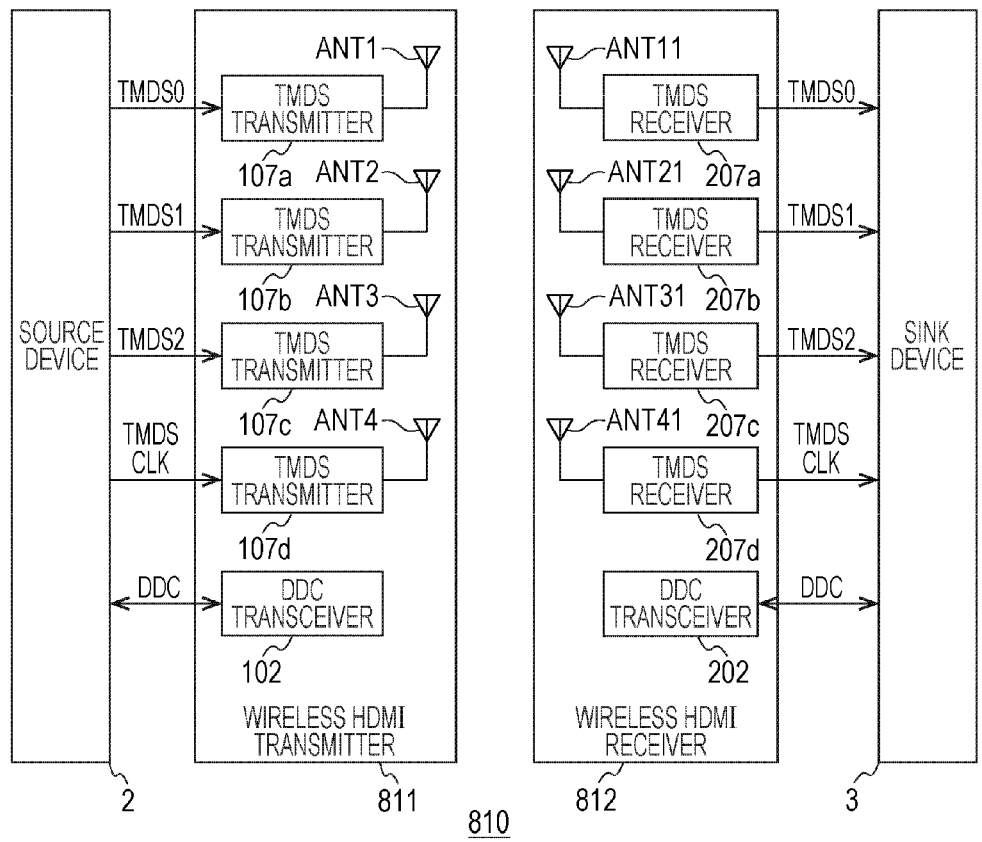
FIG. 29 is a block diagram illustrating the overall configuration of a wireless transmission system 810 of the present invention.

FIG. 29 is a block diagram illustrating the overall configuration of a wireless transmission system 810 of the present invention. In FIG. 29, elements that function generally in the same manner as in the first embodiment are denoted by the same reference characters, and any descriptions thereof will be omitted. In the wireless transmission system 810, a wireless HDMI transmitter 811 is configured by adding a TMDS transmitter 107d for transmitting a clock signal "TMDS CLK", to the wireless HDMI transmitter 100 according to the first embodiment. The TMDS transmitter 107d is configured in the same manner as the TMDS transmitters 107a to 107c, except for oscillation frequencies of VCOs. In the wireless transmission system 810, a wireless HDMI receiver 812 is configured by adding a TMDS receiver 207d for receiving the clock signal "TMDS CLK" to the wireless HDMI receiver 200 according to the first embodiment with the CDR circuit 203 being omitted. The TMDS receiver 207d is configured in the same manner as the TMDS receivers 207a to 207c, except for oscillation frequencies of VCOs.

In the sixth embodiment, the number of millimeter-wave channels is four. For example, CH1 for TMDS0 may have a center frequency of 58.32 GHz, CH2 for TMDS1 may have a center frequency of 60.48 GHz, CH3 for TMDS2 may have a center frequency of 62.64 GHz, and CH4 for TMDS CLK may have a center frequency of 64.8 GHz.

In this manner, in the sixth embodiment, since the clock signal "HDMI CLK" is wirelessly transmitted from the transmission side as well, the need for clock recovery circuits on the reception side is eliminated, resulting in reduced cost of the wireless HDMI receiver 200. The sixth embodiment is advantageous when a millimeter band for four channels is available.

Seventh Embodiment

Directivity for millimeter waves is narrow, and therefore the direction of an antenna(s) of a wireless HDMI transmitter and/or a wireless HDMI receiver can preferably be changed in a flexible manner. Accordingly, in the wireless HDMI transmitter and/or the wireless HDMI receiver, an antenna(s) may be provided away from a millimeter-wave transmitter and/or a millimeter-wave receiver, so that the angle of the antenna(s) can be changed. Moreover, wiring (e.g., an HDMI connector(s) and an HDMI cable(s)) for connecting a source device and/or a sink device with a wireless HDMI transmitter and/or a wireless HDMI receiver may be provided so as to be angularly changeable.

In this manner, by providing a flexible structure (s) allowing a change of antenna direction to a wireless HDMI transmitter and/or a wireless HDMI receiver, it is rendered possible to change the antenna direction to increase transmission/reception sensitivity, resulting in improved transmission quality.

Eighth Embodiment

Figure 30:
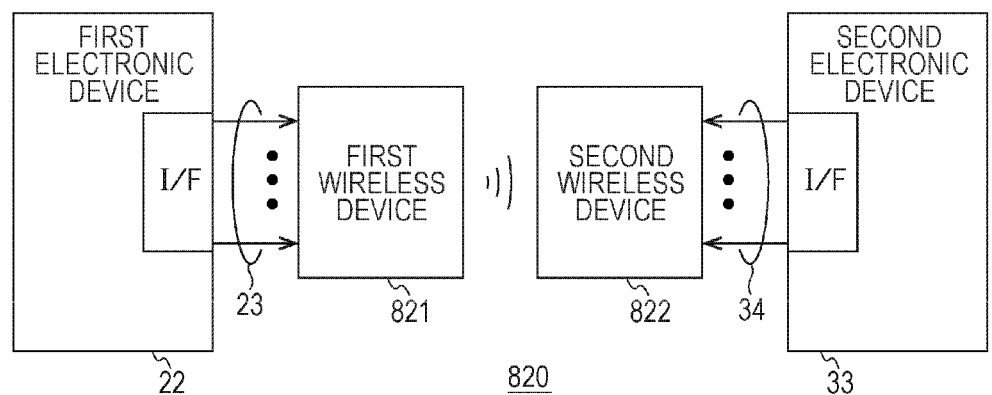
FIG. 30 is a diagram illustrating the overall configuration of a wireless transmission system 820 according to a seventh embodiment of the present invention.

FIG. 30 is a diagram illustrating the overall configuration of a wireless transmission system 820 according to a seventh embodiment of the present invention. As shown in FIG. 30, the wireless transmission system 820 includes a first wireless device 821 and a second wireless device 822. The first wireless device 821 is connected to a first electronic device 22 via a first transmission path 23 with one or more channels. The second wireless device 822 is connected to a second electronic device 33 via a second transmission path 34 with one or more channels. The first wireless device 821 is configured to transmit millimeter-wave radio signals through OOK modulation in the same manner as in other embodiments, and therefore any detailed description thereof will be omitted.

The second wireless device 822 is configured to receive radio signals and reproduce digital signals through envelope detection (or square-law detection) in the same manner as in other embodiments, and therefore any detailed description thereof will be omitted. The first electronic device 22 outputs not only HDMI-conforming signals but also digital signals for at least one channel, including DVI signals and other signals for DisplayPort, MHL, HAVi, DiiVA, etc. The first wireless device 821 subjects digital signals from the first electronic device 22 to OOK modulation and transmits modulated millimeter-wave carrier signals as radio signals on a channel-by-channel basis in the same manner as in other embodiments. The second wireless device 822 receives and converts the radio signals into IF signals, and performs envelope detection (or square-law detection) on them to reproduce the digital signals outputted by the first electronic device 22, before transmission to the second electronic device 33.

In this manner, in the present invention, signals to be wirelessly transmitted are not specifically limited.

Note that in the case where a control signal is used, the control signal may be transmitted/received using a band other than that for millimeter waves, as in the first embodiment, and if there is an available channel, the control signal may be transmitted/received using the millimeter band.

(Embodiment Related to the Plane of Polarization of the Radio Signal)

Any of the above embodiments have the following problems. In the above embodiments, the bit rates per channel at which transmission is possible without deteriorating transmission quality are 1080i/60fps/8-bit (741.76 Mbps), 1080p/24fps/8-bit (741.88 Mbps), and further up to 1080i/60fps/10-bit (927.2 Mbps). However, when the bit rate is 1080p/60FPS/8-bit (1483.52 Mbps), transmission quality might deteriorate. The cause of the transmission quality deterioration will be described below.

Figure 31:
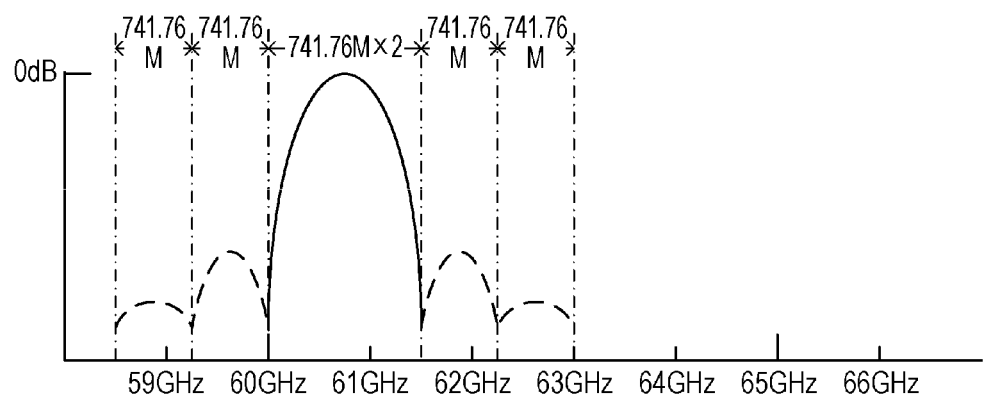
FIG. 31 illustrates a modulation spectrum for OOK modulation.

FIG. 31 illustrates a modulation spectrum for OOK modulation. In the spectrum shown in FIG. 31, the center frequency is 60.75 GHz and the bit rate is 741.76 Mbps (1080i/60fps/8-bit). In FIG. 31, the section indicated by the solid line represents a main lobe of the modulation wave. The main lobe has a bandwidth equal to twice the bit rate. In FIG. 31, sections indicated by dotted lines represent side lobes of the modulation wave. The width of the "peak" of each side lobe is equal to the bit rate. It is ideal to perform demodulation using the entire modulation signal including the main lobe and the side lobes, but in general, a modulation wave can be demodulated with at least the main lobe.

Figure 32:
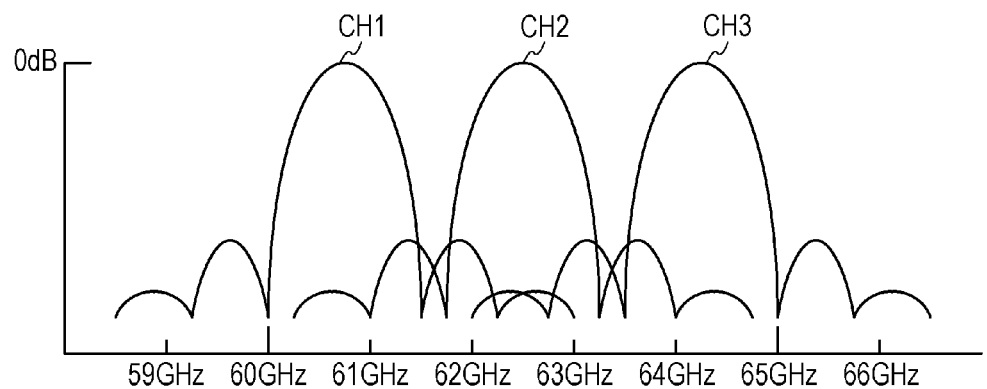
FIG. 32 illustrates millimeter-band spectra where digital signals are transmitted on three channels at a bit rate of 1080i/60fps/8-bit (741.76 Mbps).

FIG. 32 illustrates millimeter-band spectra where digital signals are transmitted on three channels at a bit rate of 1080i/60fps/8-bit (741.76 Mbps). In this case, side lobes of adjacent channels slightly overlap with other channels' main lobes, as shown in FIG. 32, but the main lobes do not overlap with one another, and therefore the main lobe of each channel can be extracted by a channel selection filter included in a receiver. Thus, in this case, demodulation quality barely deteriorates.

Figure 33:
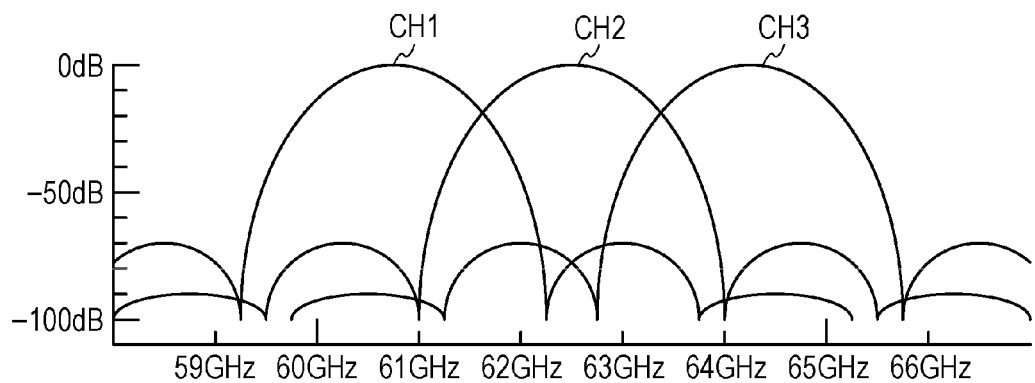
FIG. 33 illustrates millimeter-band spectra where digital signals are transmitted on three channels at a bit rate of 1080p/60fps/8-bit (1483.52 Mbps).

FIG. 33 illustrates millimeter-band spectra where digital signals are transmitted on three channels at a bit rate of 1080p/60fps/8-bit (1483.52 Mbps). In this case, the main lobes of the channels significantly overlap with other channels' main lobes, as shown in FIG. 33, and therefore their adjacent channels are disturbing waves to one another. As a result, the modulation waves have their demodulation quality reduced. In this manner, when the bit rate is 1080p/60FPS/8-bit (1483.52 Mbps), transmission quality might deteriorate.

Therefore, in all of the above embodiments, a transmission antenna and a reception antenna are provided for each channel, and the planes of polarization of the transmission antenna and the reception antenna are changed in accordance with the channel used. Specifically, the transmission antennas ANT1, ANT2, and ANT3 and the reception antennas ANT11, ANT21, and ANT31 in the first through third embodiments have different planes of polarization from their adjacent-channel antennas. Concretely, a radio signal transmitted by the antenna ANT1, which uses a data signal HDMI0, and a radio signal transmitted by the antenna ANT2, which uses a data signal HDMI1, have different planes of polarization. The radio signal transmitted by the antenna ANT2, which uses a data signal HDMI1, and a radio signal transmitted by the antenna ANT3, which uses a data signal HDMI3, have different planes of polarization. The radio signal transmitted by the antenna ANT1 and a radio signal received by the antenna ANT11 have the same plane of polarization. The radio signal transmitted by the antenna ANT2 and a radio signal received by the antenna ANT21 have the same plane of polarization. The radio signal transmitted by the antenna ANT3 and a radio signal received by the antenna ANT31 have the same plane of polarization. That is, on the reception side, a radio signal received by the antenna ANT11 and a reception signal received by the antenna ANT21 have different planes of polarization. The radio signal received by the antenna ANT21 and a reception signal received by the antenna ANT31 have different planes of polarization.

In the case where a clock signal HDMI CLK is wirelessly transmitted as well, as in the sixth embodiment, an antenna for HDMI CLK is also set to have a different plane of polarization from those of its adjacent channels.

In the case where the HDMI system is not restrictive, as in the eighth embodiment, antennas with different planes of polarization from their adjacent-channel antennas are used.

In the case where full-duplex two-way communication is performed, as in the fifth embodiment, adjacent channels may have different planes of polarization from each other. In the case where half-duplex and full-duplex systems are combined, as in the case of USB 3.0, planes of polarization may be determined as follows with reference to FIG. 27, for example.

On the USB host side, a wireless USB transceiver includes a first reception portion 706 provided so as to share transmission and reception frequencies with a first transmission portion 707, and a second reception portion 806a using a millimeter-wave reception frequency different from a transmission frequency used by a second transmission portion 805a. An antenna 808a serves as a reception antenna 808a to be used by the second reception portion 806a. An antenna 709 serves as a first transmission antenna 709 to be used by the first transmission portion 707 and the first reception portion 706. An antenna 807a serves as a second transmission antenna 807a to be used by the second transmission portion 805a. Transmission/reception with USB 2.0 and transmission/reception with USB 3.0 do not occur at the same time, and therefore a radio signal to be transmitted by the second transmission antenna 807a and a radio signal to be received by the reception antenna 808a are set to have different planes of polarization. As a result, even if a band is widened to such an extent that the main lobes of the channel for No. 6 and No. 7 and the channel for No. 9 and No. 10 in FIG. 28 overlap with each other, transmission and reception are possible because of the different planes of polarization. Possibly, it is expected that an ultrafast communication band for the channel for No. 6 and No. 7 can be widened to about 3 Gbps, and an ultrafast communication band for the channel for No. 9 and No. 10 can be widened to about 3 Gbps. However, in addition to the difference in the plane of polarization between CH1 and CH3, the radio signal to be transmitted by the second transmission antenna 807a and the radio signal to be transmitted by the first transmission antenna 709 may be set to have different planes of polarization, and the radio signal to be transmitted by the first transmission antenna 709 and the radio signal to be received by the reception antenna 808a may be set to have different planes of polarization.

On the USB device side, a wireless USB transceiver includes the first transmission portion 707 provided so as to share transmission and reception frequencies with the first reception portion 706 and the second transmission portion 805b using a millimeter-wave transmission frequency different from the reception frequency used by the second reception portion 806b. An antenna 807b serves as a transmission antenna 807b to be used by the second transmission portion 805b. An antenna 709 serves as a first reception antenna 709 to be used by the first reception portion 706 and the first transmission portion 707. An antenna 808b serves as a second reception antenna 808b to be used by the second reception portion 806b. Transmission/reception with USB 2.0 and transmission/reception with USB 3.0 do not occur at the same time, and therefore a radio signal to be received by the second reception antenna 808b and a radio signal to be transmitted by the transmission antenna 807b are set to have different planes of polarization. As a result, even if a band is widened to such an extent that the main lobes of the channel for No. 6 and No. 7 and the channel for No. 9 and No. 10 in FIG. 28 overlap with each other, transmission and reception are possible because of the different planes of polarization. Possibly, it is expected that an ultrafast communication band for the channel for No. 6 and No. 7 can be widened to about 3 Gbps, and an ultrafast communication band for the channel for No. 9 and No. 10 can be widened to about 3 Gbps. However, in addition to the difference in the plane of polarization between CH1 and CH3, the radio signal to be received by the second reception antenna 808b and the radio signal to be received by the first reception antenna 709 are set to have different planes of polarization. The radio signal to be received by the first reception antenna 709 and the radio signal to be transmitted by the transmission antenna 807b may be set to have different planes of polarization.

Consequently, the antenna 709 on the USB host side and the antenna 709 on the USB device side have the same plane of polarization. The antenna 807a on the USB host side and the antenna 808b on the USB device side have the same plane of polarization different from the plane of polarization of the antenna 709. The antenna 808a on the USB host side and the antenna 807b on the USB device side have the same plane of polarization different from the plane of polarization of the antenna 709.

Thus, it is estimated that the ultrafast communication bands with the spectra as shown in FIG. 28 can be widened to 1.5 Gbps or more, possibly to about 3 Gbps.

For example, in the case where there are channels CH1, CH2, and CH3, if the antennas are circularly polarized, the planes of polarization for CH1, CH2, and CH3 may be right-handed circularly polarized, left-handed circularly polarized, and right-handed circularly polarized, respectively, or left-handed circularly polarized, right-handed circularly polarized, and left-handed circularly polarized, respectively. Moreover, if the antennas are linearly polarized, the planes of polarization for CH1, CH2, and CH3 may be vertically polarized, horizontally polarized, and vertically polarized, respectively, or horizontally polarized, vertically polarized, and horizontally polarized, respectively. In the case where the number of channels is 2 or the number of channels is 4 or more, the antennas may be configured such that the plane of polarization varies between radio signals on adjacent channels. Techniques to change the plane of polarization of an antenna are well known, and the planes of polarization of the antennas can be changed using any of such well-known techniques.

For example, when a signal transmitted by a right-handed circularly polarized antenna is received by a right-handed circularly polarized antenna, the level of the received signal is assumed to be A (dB). On the other hand, when a signal transmitted by a right-handed circularly polarized antenna is received by a left-handed circularly polarized antenna, the level of the received signal is assumed to be B (dB). In this case, C as in C=A−B is referred to as a cross polarization level. Typically, the cross polarization level takes a value of from 20 to 30 dB. In the case where both the transmission antenna and the reception antenna are right-handed circularly polarized for CH1, left-handed circularly polarized for CH2, and right-handed circularly polarized for CH3, signals on adjacent channels are received at levels reduced by 20 to 30 dB. In this manner, disturbing waves have their levels reduced, resulting in improved reception performance.

Figure 34:
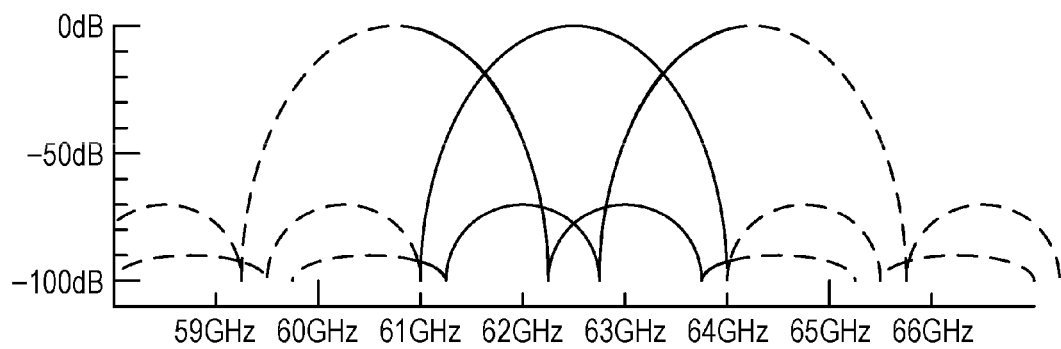
FIG. 34 illustrates spectra for antenna reception on CH2 in the case of right-handed circular polarization on CH1, right-handed circular polarization on CH2, and right-handed circular polarization on CH3.

FIG. 34 illustrates spectra for antenna reception on CH2 in the case of right-handed circular polarization on CH1, right-handed circular polarization on CH2, and right-handed circular polarization on CH3. In FIG. 34, the section indicated by the solid line corresponds to a signal received by a receiver on CH2.

Figure 35:
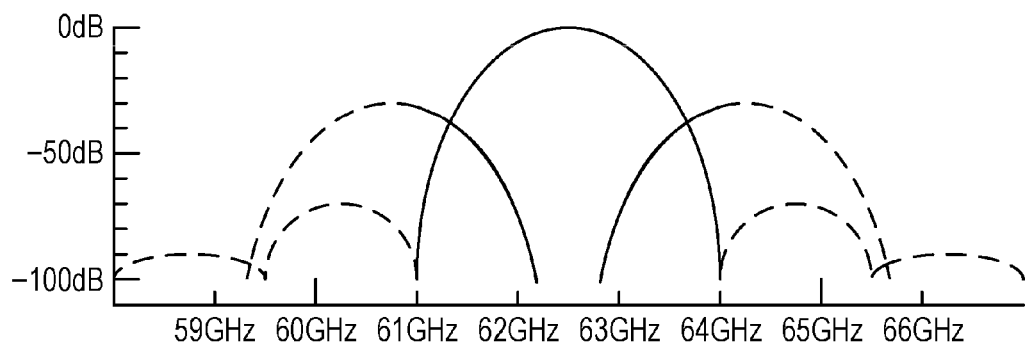
FIG. 35 illustrates spectra for antenna reception on CH2 in the case of right-handed circular polarization on CH1, left-handed circular polarization on CH2, and right-handed circular polarization on CH3.

FIG. 35 illustrates spectra for antenna reception on CH2 in the case of right-handed circular polarization on CH1, left-handed circular polarization on CH2, and right-handed circular polarization on CH3. In FIG. 35, the section indicated by the solid line corresponds to a signal received by a receiver on CH2. As shown in FIG. 35, signals on adjacent channels attenuate so that the level of a disturbing wave included in the main lobe for CH2 is reduced. Thus, a reduction in demodulation performance of a modulation wave can be prevented.

In this manner, the planes of polarization of antennas are set to be different between adjacent channels, resulting in improved demodulation performance, so that a digital signal with a faster bit rate can be wirelessly transmitted without transmission quality deterioration. Moreover, changing the plane of polarization of an antenna is unlikely to increase manufacturing cost, and therefore it is possible to realize high-speed wireless digital signal transmission at low cost and low power consumption.

Figure 36:
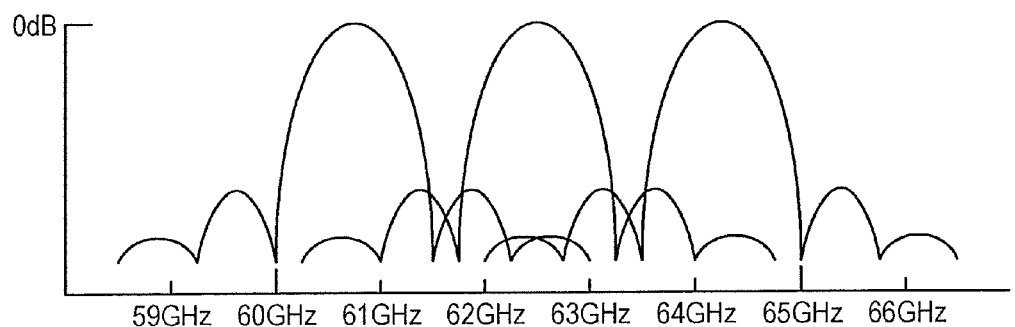
FIG. 36 illustrates spectra for 1080i/60fps/8-bit.
Figure 37:
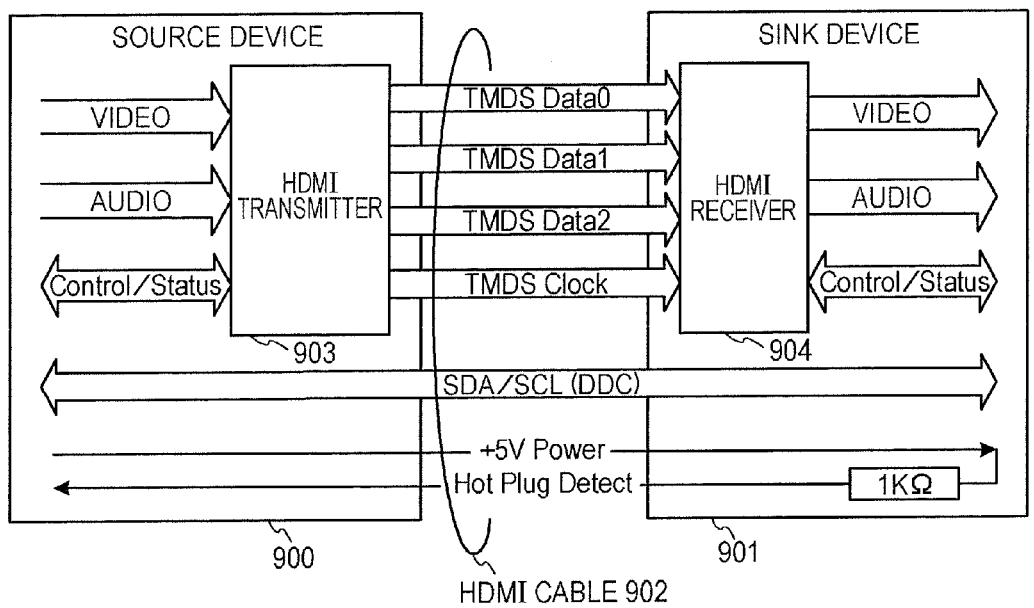
FIG. 37 is a block diagram outlining signals to be transmitted from a source device to a sink device in accordance with the HDMI standard.

Note that changing the plane of polarization of an antenna is not to be construed as being effective only for high-speed digital signals. FIG. 36 illustrates spectra for 1080i/60fps/8-bit. As shown in FIG. 36, in the case of 1080i/60fps/8-bit, main lobes for adjacent channels do not overlap with each other, but side lobes of adjacent channels are disturbing waves. Thus, setting the plane of polarization of an antenna to vary between adjacent channels leads to reduction of side lobe levels, resulting in improved reception and demodulation performance.

(Antenna Variant)

Instead of using 4×4 patch antennas, for example, 2×2 patch antennas may be used as transmission antennas. Furthermore, instead of using 4×4 patch antennas, other antennas may be used as reception antennas.

Furthermore, antennas other than patch antennas may be used.

Other Embodiments

Embodiments of the present invention are provided in various forms using semiconductor technology. For example, the wireless transmitter and the wireless receiver of the present invention may be provided as semiconductor chips or may be provided in the form of macros for use in designing semiconductor circuits. Moreover, the wireless communication method, the wireless transmission method, and the wireless reception method that are used in the embodiments of the present invention are also within the scope of the present invention.

Note that the embodiments encompass subject matters as follows.

The present invention is directed to a wireless transmission system including a first wireless device connected to a first electronic device via a first transmission path with one or more channels and a second wireless device connected to a second electronic device via a second transmission path with one or more channels, in which the first wireless device includes one or more carrier oscillators provided for their respective channels of the first transmission path to output carrier signals in a millimeter band, one or more OOK modulators provided so as to correspond to the one or more carrier oscillators and perform on-off keying modulation on the carrier signals outputted by the carrier oscillators, one or more input circuits provided for their respective channels of the first transmission path to input digital signals for one or more channels outputted by the first electronic device to the OOK modulators, and a transmission antenna portion for outputting millimeter-wave signals provided by the OOK modulators as radio signals, the one or more OOK modulators perform on-off keying modulation on the carrier signals outputted by the carrier oscillators on the basis of the digital signals inputted by the input circuits, the second wireless device includes a reception antenna portion for receiving the radio signals outputted by the transmission antenna portion, one or more local oscillators provided for their respective channels of the second transmission path to output local signals in a millimeter band, one or more mixers provided so as to correspond to the one or more local oscillators and down-convert the radio signals using the local signals outputted by the local oscillators, and one or more detector portions provided so as to correspond to the one or more mixers and reproduce the digital signals by demodulating the signals down-converted by the mixers.

Furthermore, the present invention is directed to a wireless transmitter connected to an electronic device via a transmission path with one or more channels, including one or more carrier oscillators provided for their respective channels of the transmission path to output carrier signals in a millimeter band, one or more OOK modulators provided so as to correspond to the one or more carrier oscillators and perform on-off keying modulation on the carrier signals outputted by the carrier oscillators, and one or more input circuits provided for their respective channels of the transmission path to input digital signals for one or more channels outputted by the electronic device to the OOK modulators, in which the one or more OOK modulators perform on-off keying modulation on the carrier signals outputted by the carrier oscillators based on the digital signals inputted by the input circuits.

Preferably, each of the one or more input circuits may include a low-pass filter for removing harmonic components from the digital signals, and the one or more OOK modulators may perform on-off keying modulation on the carrier signals outputted by the carrier oscillators, on the basis of the digital signals with the harmonic components removed by the low-pass filter.

Preferably, the one or more carrier oscillators and the one or more OOK modulators may be made of CMOS, and each of the one or more input circuits may include a level conversion circuit for converting the digital signals into a CMOS level.

Preferably, the number of the one or more carrier oscillators may be plural, and an interval between carrier frequencies of the carrier oscillators may be greater than or equal to a bandwidth twice the bit rate of the digital signals.

Preferably, further included may be one or more frequency adjustment portions for adjusting oscillation frequencies of the one or more carrier oscillators only at predetermined times.

Preferably, the one or more frequency adjustment portions may be PLL circuits.

Preferably, the one or more frequency adjustment portions may measure and compare output frequencies of the carrier oscillators to defined values, and may adjust control voltages to be inputted to the carrier oscillators on the basis of results of comparison.

Preferably, the transmission path may transmit HDMI-conforming signals, and the carrier oscillators, the OOK modulators, and the input circuits may be provided so as to correspond to digital signals HDMI0, HDMI1, and HDMI2.

Preferably, further included may be a carrier oscillator, an OOK modulator, and an input circuit provided so as to correspond to a clock signal HDMI CLK.

Preferably, the transmission path may transmit control signals DDC at a lower bit rate than that of the digital signals, and the wireless transmitter may further include a DDC transceiver for transmitting/receiving the control signals DDC as radio signals with a wavelength longer than a millimeter wave.

Preferably, before transmission/reception of the control signal DDC, the DDC transceiver may transmit an HPD confirmation packet to confirm whether an HPD state on a sink device side is high or not.

Preferably, the DDC transceiver may transmit an HPD confirmation packet to monitor an HPD state on the sink device side when transmission/reception of the control signal DDC is idle.

Preferably, further included may be a reception portion provided so as to share transmission and reception frequencies with a transmission portion consisting of a set of the carrier oscillator, the OOK modulator, and the input circuit, and an antenna portion for transmitting radio signals modulated by the OOK modulator and receiving millimeter-wave radio signals, in which the reception portion includes a local oscillator for outputting local signals with the transmission and reception frequencies in a millimeter band, a mixer for down-converting received radio signals using the local signals outputted by the local oscillator, and a detector portion for reproducing baseband signals by demodulating the signals down-converted by the mixer, and the wireless transmitter further includes a shared circuit for transmitting the baseband signals reproduced by the detector portion to the transmission path and inputting the digital signals outputted from the transmission path to the input circuit.

Preferably, further included may be a reception portion utilizing a millimeter-wave reception frequency different from a transmission frequency used by a transmission portion consisting of a set of the carrier oscillator, the OOK modulator, and the input circuit, and a reception antenna portion for receiving radio signals with the reception frequency, in which the reception portion includes a local oscillator for outputting local signals with the reception frequency in a millimeter band, a mixer for down-converting received radio signals using the local signals outputted by the local oscillator, and a detector portion for reproducing baseband signals by demodulating the signals down-converted by the mixer, and the wireless transmitter transmits the baseband signals reproduced by the detector portion to the transmission path.

Furthermore, the present invention is directed to a wireless receiver connected to an electronic device via a transmission path with one or more channels, including one or more local oscillators provided for their respective channels of the transmission path to output local signals in a millimeter band, one or more mixers provided so as to correspond to the one or more local oscillators and down-convert received millimeter-wave radio signals subjected to OOK modulation using the local signals outputted by the local oscillators, and one or more detector portions provided so as to correspond to the one or more mixers and reproduce baseband signals by demodulating the signals down-converted by the mixers.

Preferably, each of the one or more detector portions may include a channel selection filter for passing the signals outputted by the mixer within a predetermined band, an amplifier for amplifying the signals passed by the channel selection filter, a detector circuit for demodulating the signals amplified by the amplifier using envelope detection or square-law detection, a limiter circuit for reproducing the baseband signals from the signals detected by the detector portion, and an offset canceller for canceling an offset caused between the amplifier and the limiter circuit.

Preferably, the one or more local oscillators, the one or more mixers, and the one or more detector portions may be made of CMOS, and each of the one or more detector portions may include a level conversion circuit for converting the baseband signals from a CMOS level to a voltage level for use with the transmission path.

Preferably, the number of the one or more local oscillators may be plural, and local frequencies of the local oscillators may be frequencies allowing downconversion of the radio signals into IF signals.

Preferably, further included may be one or more frequency adjustment portions for adjusting oscillation frequencies of the one or more local oscillators only at predetermined times.

Preferably, the one or more frequency adjustment portions may be PLL circuits.

Preferably, the one or more frequency adjustment portions may measure and compare output frequencies of the local oscillators to defined values, and may adjust control voltages to be inputted to the local oscillators on the basis of results of comparison.

Preferably, the transmission path may transmit HDMI-conforming signals, and the local oscillators, the mixers, and the detector portions may be provided so as to correspond to digital signals HDMI0, HDMI1, and HDMI2.

Preferably, further included may be a clock data recovery circuit for reproducing a clock signal TMDS CLK from any of the digital signals HDMI0, HDMI1, and HDMI2.

Preferably, further included may be a local oscillator, a mixer, and a detector portion provided so as to correspond to the clock signal HDMI CLK where a radio signal corresponding to the clock signal TMDS CLK is transmitted.

Preferably, the transmission path may transmit control signals DDC at a lower bit rate than that of the digital signals, and the wireless receiver may further include a DDC transceiver for transmitting/receiving the control signals DDC as radio signals with a wavelength longer than a millimeter wave.

Preferably, before transmission/reception of the control signal DDC, the DDC transceiver may receive an HPD confirmation packet and transmit a response packet to return an HPD state, the HPD confirmation packet being intended to confirm whether the HPD state on a sink device side is high or not.

Preferably, when transmission/reception of the control signal DDC is idle, the DDC transceiver may receive an HPD confirmation packet and transmit a response packet to return an HPD state, the HPD confirmation packet being intended to monitor the HPD state on the sink device side.

Preferably, further included may be a transmission portion provided so as to share transmission and reception frequencies with a reception portion consisting of a set of the local oscillator, the mixer, and the detection portion, and an antenna portion for receiving the radio signals and transmitting millimeter-wave radio signals, in which the transmission portion includes a carrier oscillator for outputting carrier signals with the transmission and reception frequencies in a millimeter band, an OOK modulator for performing on-off keying modulation on the carrier signals outputted by the carrier oscillator, and an input circuit for inputting digital signals outputted by the electronic device to the OOK modulator, the OOK modulator performs on-off keying modulation on the carrier signals outputted by the carrier oscillator on the basis of the digital signals inputted by the input circuit, and the wireless receiver further includes a shared circuit for transmitting the baseband signals reproduced by the detector portion to the transmission path and inputting the digital signals outputted from the transmission path to the input circuit.

Preferably, further included may be a transmission portion utilizing a millimeter-wave transmission frequency different from a reception frequency used by a reception portion consisting of a set of the local oscillator, the mixer, and the detection portion, and a transmission antenna portion for transmitting radio signals with the transmission frequency, in which the transmission portion includes a carrier oscillator for outputting carrier signals with the transmission frequency in a millimeter band, an OOK modulator for performing on-off keying modulation on the carrier signals outputted by the carrier oscillator, and an input circuit for inputting digital signals outputted by the electronic device to the OOK modulator, and the OOK modulator performs on-off keying modulation on the carrier signals outputted by the carrier oscillator on the basis of the digital signals inputted by the input circuit.

Preferably, the wireless transmitter or receiver may have a flexible structure allowing a change of antenna direction.

Furthermore, the present invention is directed to a wireless transmission method for use with a wireless transmitter connected to an electronic device via a transmission path with one or more channels, in which a carrier frequency of a carrier signal in a millimeter band is set for each of the channels of the transmission path, and a millimeter-wave radio signal is transmitted for each of the channels by performing on-off keying modulation on a carrier signal on the basis of a digital signal outputted by the electronic device via the transmission path, the carrier signal corresponding to the channel of the digital signal.

Furthermore, the present invention is directed to a wireless reception method for use with a wireless receiver connected to an electronic device via a transmission path with one or more channels, in which a local frequency of a local signal in a millimeter band is set for each of the channels of the transmission path, and received radio signals subjected to OOK modulation are down-converted on a channel-by-channel basis and then demodulated to reproduce baseband signals for their respective channels.

Furthermore, the present invention is directed to a wireless communication method for use with a wireless transmission system including a first wireless device connected to a first electronic device via a first transmission path with one or more channels and a second wireless device connected to a second electronic device via a second transmission path with one or more channels, in which a carrier frequency of a carrier signal in a millimeter band is set for each of the channels of the first transmission path, a millimeter-wave radio signal is transmitted for each of the channels by performing on-off keying modulation on a carrier signal on the basis of a digital signal outputted by the first electronic device via the first transmission path, the carrier signal corresponding to the channel of the digital signal, a local frequency of a local signal in a millimeter band is set for each of the channels of the second transmission path, and received radio signals subjected to OOK modulation are down-converted on a channel-by-channel basis and then demodulated to reproduce baseband signals for their respective channels.

Furthermore, the present invention is directed to a macro used a wireless transmitter connected to an electronic device via a transmission path with one or more channels, including one or more carrier oscillator portions provided for their respective channels of the transmission path to output carrier signals in a millimeter band, one or more OOK modulator portions provided so as to correspond to the one or more carrier oscillator portions and perform on-off keying modulation on the carrier signals outputted by the carrier oscillator portions, and one or more input portions provided for their respective channels of the transmission path to input digital signals for one or more channels outputted by the electronic device to the OOK modulator portions, in which the one or more OOK modulator portions perform on-off keying modulation on the carrier signals outputted by the carrier oscillator portions based on the digital signals inputted by the input portions.

According to the present invention, millimeter-wave carrier signals from carrier oscillators provided for their respective channels of a transmission path are subjected to on-off keying modulation on a channel-by-channel basis and then transmitted wirelessly. The radio signals subjected to on-off keying modulation are down-converted using millimeter-wave local signals from local oscillators provided for their respective channels and therefore demodulated into the original digital signals. In this manner, in the present invention, radio signals are modulated by on-off keying and demodulated simply on the basis of envelope information for the radio signals subjected to on-off keying modulation, and therefore unlike in the conventional art, high-quality demodulation can be achieved without carrier frequencies being accurately fixed on the transmission side and also without local frequencies being accurately fixed on the reception side. Accordingly, for on-off keying modulation and demodulation based on envelope information, carrier and local frequencies are not required to be fixed accurately, and therefore the need for PLL circuits is eliminated. Moreover, in the case of OOK modulation, it is possible to eliminate the need for high-speed processing circuits for parallel-serial conversion and look-up tables for serial-parallel conversion. Thus, the wireless transmitter and the wireless receiver make it possible to eliminate the need for PLL circuits, high-speed processing circuits, and look-up tables. Accordingly, it is possible to provide a wireless transmission system for wirelessly transmitting a digital signal from one device to another at low price and low power consumption without compromising transmission quality, along with a wireless transmitter, a wireless receiver, a wireless transmission method, a wireless reception method, and a wireless communication method for use with the same system.

By providing low-pass filters for removing harmonic components from digital signals and using the digital signals having their harmonic components removed therefrom to perform OOK modulation, sideband levels of modulated millimeter-wave signals are minimized, and therefore it is rendered possible to inhibit the millimeter-wave signals from disturbing their adjacent channels. Thus, it is possible to achieve signal transmission while maintaining its high quality.

Carrier oscillators and OOK modulators are made of CMOS, thereby making it possible to perform high-quality millimeter-wave communication. Accordingly, it is effective for level conversion circuits to perform conversion to a CMOS level.

By setting an interval between carrier frequencies to be greater than or equal to a bandwidth twice the bit rate of a digital signal, it is rendered possible to prevent sidebands from disturbing their adjacent channels, thereby realizing high-quality communication.

By adjusting carrier frequencies only at predetermined times, it is rendered possible to prevent any significant carrier frequency shift and furthermore allow high-quality communication. In addition, there is an effect in that carrier frequency adjustments do not lead to an increase in power consumption if such adjustments are made only at predetermined times. When the frequency adjustment portions are PLL circuits, the frequency adjustment portions can be readily designed. Furthermore, by designing the frequency adjustment portions to measure and compare frequencies to defined values, it is rendered possible to eliminate the need for PLL circuits. Thus, it is possible to provide a wireless transmitter with frequencies appropriately adjusted while realizing low power consumption.

An application example of the present invention is an HDMI system. Since HDMI systems are widespread, achieving wireless transmission increases the commercial value of HDMI systems. By using millimeter waves to transmit clock signals "HDMI CLK" as well, it is rendered possible to eliminate the need for clock recovery circuits in wireless receivers, reducing the cost of wireless receivers.

By transmitting a control signal DDC as a low bit-rate radio signal, it is rendered possible to facilitate DDC transmission/reception. HPD status confirmation is requisite for DDC transmission/reception, but in the case of wireless communication, no HDMI cable is directly connected to a source device and therefore there is a problem with recognition of the HPD status on the source device side. As in the present invention, by transmitting an HPD confirmation packet for HPD status confirmation based on a response packet thereto, it is rendered possible to realize DDC transmission/reception even if such transmission/reception is performed wirelessly. Moreover, it is necessary to make HPD status confirmation appropriately, and such appropriate HPD status confirmation is made possible by using an HPD confirmation packet when DDC transmission/reception is idle even if such transmission/reception is performed wirelessly. Thus, the present invention allows proper DDC transmission/reception even if such transmission/reception is to be performed wirelessly.

By providing a reception portion which uses a common transmission/reception frequency, the wireless transmitter can have a half-duplex transceiver function capable of utilizing millimeter-wave radio signals.

Furthermore, by providing a reception portion which uses a reception frequency different from a transmission frequency, the wireless transmitter can have a full-duplex transceiver function capable of utilizing millimeter-wave radio signals.

By including a channel selection filter, an amplifier, a detector circuit, a limiter circuit, and an offset canceller, the detector portion of the wireless receiver can accurately demodulate a received radio signal.

Local oscillators, mixers, and detector portions are made of CMOS, thereby making it possible to perform high-quality millimeter-wave communication. Thus, it is effective for level conversion circuits to perform conversion from a CMOS level to a voltage level for the second electronic device.

Radio signals are down-converted to IF signals, resulting in increased demodulation accuracy.

Local frequencies are adjusted only at predetermined times, making it possible to prevent any significant local frequency shift and furthermore allow high-quality communication. In addition, there is an effect in that local frequency adjustments do not lead to an increase in power consumption if such adjustments are made only at predetermined times.

When the frequency adjustment portions are PLL circuits, the frequency adjustment portions can be readily designed.

Furthermore, by designing the frequency adjustment portions to measure and compare frequencies to defined values, it is rendered possible to eliminate the need for PLL circuits. Thus, it is possible to provide a wireless transmitter with frequencies appropriately adjusted while realizing low power consumption. It is possible to eliminate the need for low-pass filters as required in PLL circuits intended for use as frequency adjustment portions, resulting in simplified circuit configurations, and therefore the frequency adjustment functions can be added at low cost.

In the case where either PLL circuits or frequency counters are used as frequency adjustment portions, the frequency adjustment portions can be constructed using CMOS technology, so that the frequency adjustment functions can be added without increasing the size of the wireless transmitter and the wireless receiver.

An application example of the present invention is an HDMI system. Since HDMI systems are widespread, achieving wireless transmission increases the commercial value of HDMI systems. By configuring clock recovery circuits to reproduce clock signals "HDMI CLK", it is rendered possible to construct an HDMI wireless transmission system even if a millimeter band for four channels is not available due to regulations on use of radio waves, for example.

Furthermore, in the case where a millimeter band for four channels is available, reproducing radio clock signals "HDMI CLK" transmitted from the transmission side can eliminate the need for clock recovery circuits in wireless receivers, reducing the cost of wireless receivers.

By transmitting a control signal DDC as a low bit-rate radio signal, it is rendered possible to facilitate DDC transmission/reception. HPD status confirmation is requisite for DDC transmission/reception, but in the case of wireless communication, no HDMI cable is directly connected to a source device and therefore there is a problem with recognition of the HPD status on the source device side. Therefore, when an HPD confirmation packet is transmitted from the transmission side, the wireless receiver returns a response packet describing the HPD status. Thus, the HPD status can be confirmed, making it possible to realize DDC transmission/reception even if such transmission/reception is performed wirelessly. Moreover, it is necessary to make HPD status confirmation appropriately, and such appropriate HPD status confirmation is made possible by the wireless receiver returning a response packet to an HPD confirmation packet transmitted at the time of DDC transmission/reception being idle even if such transmission/reception is performed wirelessly. Thus, the present invention allows proper DDC transmission/reception even if such transmission/reception is to be performed wirelessly.

By providing a transmission portion which uses a common transmission/reception frequency, the wireless transmitter can have a half-duplex transceiver function capable of utilizing millimeter-wave radio signals.

Furthermore, by providing a transmission portion which uses a transmission frequency different from a reception frequency, the wireless receiver can have a full-duplex transceiver function capable of utilizing millimeter-wave radio signals.

By providing a flexible structure(s) allowing a change of antenna direction to a wireless transmitter and/or a wireless receiver, it is rendered possible to change the antenna direction to increase transmission/reception sensitivity, resulting in improved transmission quality.

While the present invention has been described in detail above, the foregoing provides mere illustrations of the present invention in every aspect and is not construed as limiting the scope of the invention. It is understood that various other improvements and modifications can be made without departing from the scope of the present invention.

INDUSTRIAL APPLICABILITY

The present invention is industrially applicable to wireless transmission systems, along with wireless transmitters, wireless receivers, wireless transmission methods, wireless reception methods, and wireless communication methods for use therewith.

DESCRIPTION OF THE REFERENCE CHARACTERS 1 wireless transmission system
2 source device
3 sink device
100 wireless HDMI transmitter
200 wireless HDMI receiver
2a, 3a HDMI interface
101, 401, 409 millimeter-wave transmitter
102, 202 DDC transceiver
201, 501, 509 millimeter-wave receiver
203 CDR circuit
107a to 107c TMDS transmitter
103a to 103c CML circuit
104a to 104c low-pass filter
105a to 105c OOK modulation portion
106a to 106c VCO
ANT1 to ANT3 millimeter-wave antenna
130a to 130b input circuit
207a to 207c TMDS receiver
ANT11 to ANT31 millimeter-wave antenna
202a to 202c LNA
203a to 203c mixer
204a to 204c VCO
205a to 205c channel selection filter
206a to 206c VGA
208a to 208c detector circuit
209a to 209c limiter circuit
210a to 210c offset canceller
211a to 211c CML circuit
108, 212 level conversion and input protection circuit
109, 213 MCU
110, 214 RF transceiver
111, 215 antenna
408a to 408c, 508a to 508c PLL circuit
410a to 410c, 510a to 510c frequency adjustment portion
700 wireless transmission system
701 USB host
702 wireless USB transceiver 703 USB device
704 wireless USB transceiver
705 shared circuit
706 millimeter-wave receiver
707 millimeter-wave transmitter
708 coupler
709 antenna
800 wireless transmission system
801 USB host
802 wireless USB transceiver
803 UDB device
804 wireless USB transceiver
805a millimeter-wave transmitter
806a millimeter-wave receiver
807a antenna
808a antenna
805b millimeter-wave transmitter
806b millimeter-wave receiver
807b antenna
808b antenna
810 wireless transmission system
811 wireless HDMI transmitter
812 wireless HDMI receiver
820 wireless transmission system
821 first wireless device
822 second wireless device
22 first electronic device
23 first transmission path
33 second electronic device
34 second transmission path

The invention claimed is:

1. A wireless transmitter connected to an electronic device via a transmission path with two or more channels, comprising:
   two or more carrier oscillators provided for their respective channels of the transmission path to output carrier signals in a millimeter band;
   two or more on-off keying (OOK) modulators provided so as to correspond to the carrier oscillators and perform on-off keying modulation on the carrier signals outputted by the carrier oscillators; and
   two or more input circuits provided for their respective channels of the transmission path to input digital signals for two or more channels outputted by the electronic device to the OOK modulators; and
   two or more transmission antennas provided so as to correspond to the OOK modulators and output millimeter-wave signals provided by the OOK modulators as radio signals, wherein,
   the OOK modulators perform on-off keying modulation on the carrier signals outputted by the carrier oscillators based on the digital signals inputted by the input circuits, and
   any of the two or more transmission antennas that use adjacent channels transmit the radio signals with different planes of polarization.

2. The wireless transmitter according to claim 1, wherein,
   the transmission path transmits High-Definition Multimedia Interface (HDMI)-conforming signals,
   the carrier oscillators, the OOK modulators, and the input circuits are provided so as to correspond to digital signals HDMI0, HDMI1, and HDMI2,
   a radio signal transmitted by the transmission antenna that corresponds to the digital signal HDMI0 and a radio signal transmitted by the transmission antenna that corresponds to the digital signal HDMI1 have different planes of polarization, and
   the radio signal transmitted by the transmission antenna that corresponds to the digital signal HDMI1 and a radio signal transmitted by the transmission antenna that corresponds to the digital signal HDMI2 have different planes of polarization.

3. The wireless transmitter according to claim 1, further comprising:
   a first reception portion provided so as to share transmission and reception frequencies with a first transmission portion consisting of a set of the carrier oscillator, the OOK modulator, and the input circuit;
   a second reception portion utilizing a millimeter-wave reception frequency different from a transmission frequency used by a second transmission portion consisting of a set of the carrier oscillator, the OOK modulator, and the input circuit; and
   a reception antenna intended for use by the second reception portion, wherein,
   the two or more transmission antennas include:
   a first transmission antenna intended for use by the first transmission portion and the first reception portion; and
   a second transmission antenna intended for use by the second transmission portion, and
   a radio signal transmitted by the second transmission antenna and a radio signal received by the reception antenna have different planes of polarization.

4. A wireless receiver connected to an electronic device via a transmission path with two or more channels, comprising:
   two or more reception antennas provided so as to correspond to carrier frequencies of received millimeter-wave radio signals subjected to OOK modulation;
   two or more local oscillators provided for their respective channels of the transmission path to output local signals in a millimeter band;
   two or more mixers provided so as to correspond to the local oscillators and down-convert the received radio signals using the local signals outputted by the local oscillators; and
   two or more detector portions provided so as to correspond to the mixers and reproduce baseband signals by demodulating the signals down-converted by the mixers, wherein,
   any of the two or more reception antennas that use adjacent channels accept the received radio signals with different planes of polarization.

5. The wireless receiver according to claim 4, wherein,
   the transmission path transmits HDMI-conforming signals,
   the reception antennas, the local oscillators, the mixers, and the detector portions are provided so as to correspond to digital signals HDMI0, HDMI1, and HDMI2,
   a radio signal received by the reception antenna that corresponds to the digital signal HDMI0 and a radio signal received by the reception antenna that corresponds to the digital signal HDMI1 have different planes of polarization, and
   the radio signal received by the reception antenna that corresponds to the digital signal HDMI1 and a radio signal received by the reception antenna that corresponds to the digital signal HDMI2 have different planes of polarization.

6. The wireless receiver according to claim 4, further comprising:
   a first transmission portion provided so as to share transmission and reception frequencies with a first reception portion consisting of a set of the local oscillator, the mixer, and the detector portion;

a second transmission portion utilizing a millimeter-wave transmission frequency different from a reception frequency used by a second reception portion consisting of a set of the local oscillator, the mixer, and the detector portion; and a transmission antenna intended for use by the second transmission portion, wherein, the two or more reception antennas include:

a first reception antenna intended for use by the first reception portion and the first transmission portion; and a second reception antenna intended for use by the second reception portion, and a radio signal received by the second reception antenna and a radio signal transmitted by the transmission antenna have different planes of polarization.

7. A wireless transmission system comprising a first wireless device connected to a first electronic device via a first transmission path with two or more channels and a second wireless device connected to a second electronic device via a second transmission path with two or more channels, wherein, the first wireless device includes:

two or more carrier oscillators provided for their respective channels of the first transmission path to output carrier signals in a millimeter band;

two or more OOK modulators provided so as to correspond to the carrier oscillators and perform on-off keying modulation on the carrier signals outputted by the carrier oscillators;

two or more input circuits provided for their respective channels of the first transmission path to input digital signals for two or more channels outputted by the first electronic device to the OOK modulators; and two or more transmission antennas for outputting millimeter-wave signals provided by the OOK modulators as radio signals, the OOK modulators perform on-off keying modulation on the carrier signals outputted by the carrier oscillators on the basis of the digital signals inputted by the input circuits, any of the two or more transmission antennas that use adjacent channels transmit the radio signals with different planes of polarization, the second wireless device includes:

two or more reception antennas provided so as to correspond to the transmission antennas;

two or more local oscillators provided for their respective channels of the second transmission path to output local signals in a millimeter band;

two or more mixers provided so as to correspond to the local oscillators and down-convert the radio signals using the local signals outputted by the local oscillators; and two or more detector portions provided so as to correspond to the mixers and reproduce the digital signals by demodulating the signals down-converted by the mixers, and the two or more reception antennas receive the radio signals with the same planes of polarization as their corresponding transmission antennas.

8. A wireless transmission method for use with a wireless transmitter connected to an electronic device via a transmission path with two or more channels, the method comprising:

setting a carrier frequency of a carrier signal in a millimeter band for each of the channels of the transmission path, and transmitting a millimeter-wave radio signal for each of the channels by performing on-off keying modulation on a carrier signal on the basis of a digital signal outputted by the electronic device via the transmission path, the carrier signal corresponding to the channel of the digital signal, and the radio signals have different planes of polarization from their adjacent channels.

9. A wireless reception method for use with a wireless receiver connected to an electronic device via a transmission path with two or more channels, the method comprising:

setting a local frequency of a local signal in a millimeter band for each of the channels of the transmission path, and down-converting received radio signals subjected to OOK modulation on a channel-by-channel basis and then demodulated to reproduce baseband signals for their respective channels, and the radio signals have different planes of polarization from their adjacent channels.

10. A wireless communication method for use with a wireless transmission system including a first wireless device connected to a first electronic device via a first transmission path with one or more channels and a second wireless device connected to a second electronic device via a second transmission path with one or more channels, the method comprising:

setting a carrier frequency of a carrier signal in a millimeter band for each of the channels of the first transmission path, transmitting a millimeter-wave radio signal for each of the channels by performing on-off keying modulation on a carrier signal on the basis of a digital signal outputted by the first electronic device via the first transmission path, the carrier signal corresponding to the channel of the digital signal, setting a local frequency of a local signal in a millimeter band for each of the channels of the second transmission path, down-converting received radio signals subjected to OOK modulation on a channel-by-channel basis and then demodulated to reproduce baseband signals for their respective channels, and the radio signals have different planes of polarization from their adjacent channels.

* * * * *